US009107430B2

(12) United States Patent
Dumarche et al.

(10) Patent No.: US 9,107,430 B2
(45) Date of Patent: Aug. 18, 2015

(54) PROCESS FOR PRODUCING RED OR PURPLE COCOA-DERIVED MATERIAL

(71) Applicant: Barry Callebaut AG, Zurich (CH)

(72) Inventors: Arnaud Dumarche, Louviers Cedex (FR); Philippe Troplin, Louviers Cedex (FR); Herwig Bernaert, Lebbeke-Wieze (BE); Paul Lechevalier, Louviers Cedex (FR); Herve Beerens, Lebbeke-Wieze (BE); Alex Landuyt, Lebbeke-Wieze (BE)

(73) Assignee: BARRY CALLEBAUT AG, Zurich (CH)

( * ) Notice: Subject to any disclaimer, the term of this patent is extended or adjusted under 35 U.S.C. 154(b) by 0 days.

(21) Appl. No.: 13/898,217

(22) Filed: May 20, 2013

(65) Prior Publication Data
US 2013/0251858 A1    Sep. 26, 2013

Related U.S. Application Data

(63) Continuation of application No. 12/456,971, filed on Jun. 25, 2009, now Pat. No. 8,460,739, which is a continuation of application No. PCT/GB2009/000177, filed on Jan. 22, 2009.

(30) Foreign Application Priority Data

Jan. 22, 2008    (GB) .................................. 0801119.9

(51) Int. Cl.
A23G 1/00    (2006.01)
A21D 2/36    (2006.01)
A23C 9/13    (2006.01)
A23G 1/32    (2006.01)
A23G 3/36    (2006.01)

(52) U.S. Cl.
CPC ................ *A23G 1/002* (2013.01); *A21D 2/364* (2013.01); *A23C 9/1307* (2013.01); *A23G 1/0006* (2013.01); *A23G 1/0016* (2013.01); *A23G 1/32* (2013.01); *A23G 3/36* (2013.01)

(58) Field of Classification Search
None
See application file for complete search history.

(56) References Cited

U.S. PATENT DOCUMENTS

| 1,892,449 | A | 12/1932 | Dengler |
|---|---|---|---|
| 2,275,835 | A | 3/1942 | Balmert et al. |
| 2,380,158 | A | 7/1945 | Burrenmatt et al. |
| 2,397,402 | A | 3/1946 | Benedict |
| 2,512,663 | A | 6/1950 | Masurovsky |
| 2,812,663 | A | 11/1957 | Schonewald |
| 2,835,585 | A | 5/1958 | Rusoff |
| 2,957,769 | A | 10/1960 | Rusoff |
| 2,965,490 | A | 12/1960 | Rusoff |
| 4,331,692 | A | 5/1982 | Drevici et al. |
| 4,352,746 | A | 10/1982 | Bracco et al. |
| 4,435,436 | A | 3/1984 | Terink et al. |
| 4,704,292 | A | 11/1987 | Kattenberg |
| 4,784,866 | A | 11/1988 | Wissgott |
| 4,970,090 | A | 11/1990 | Zeiger et al. |
| 5,009,917 | A | 4/1991 | Wiant et al. |
| 5,026,482 | A | 6/1991 | Sircar |
| 5,075,102 | A | 12/1991 | Hubaud et al. |
| 5,114,730 | A | 5/1992 | Ellis |
| 5,342,632 | A | 8/1994 | Bangerter et al. |
| 5,395,635 | A | 3/1995 | Yanamoto et al. |
| 5,470,579 | A | 11/1995 | Bonte et al. |
| 5,554,645 | A | 9/1996 | Romanczyk, Jr. et al. |
| 5,888,562 | A | 3/1999 | Hansen et al. |
| 6,015,913 | A | 1/2000 | Kealey et al. |
| 6,265,593 | B1 | 7/2001 | Best et al. |
| 6,312,753 | B1 | 11/2001 | Kealey et al. |
| 6,399,139 | B2 | 6/2002 | Myers et al. |
| 6,403,133 | B1 | 6/2002 | Barfuss et al. |
| 6,426,080 | B1 | 7/2002 | Golz-Berner et al. |
| 6,524,595 | B1 | 2/2003 | Coleman et al. |
| 6,582,747 | B2 | 6/2003 | Myers et al. |
| 6,610,320 | B2 | 8/2003 | Schmitz et al. |
| 6,627,232 | B1 | 9/2003 | Hammerstone, Jr. et al. |
| 6,905,715 | B1 | 6/2005 | Kealey et al. |
| 7,115,656 | B2 | 10/2006 | Romanczyk, Jr. et al. |
| 7,368,144 | B2 | 5/2008 | Lecoupeau et al. |
| 8,460,739 | B2 * | 6/2013 | Dumarche et al. ............. 426/631 |
| 8,603,946 | B2 * | 12/2013 | Bernaert et al. ............... 504/163 |
| 8,709,524 | B2 * | 4/2014 | Miller et al. ................... 426/631 |
| 2001/0007693 | A1 | 7/2001 | Myers et al. |
| 2002/0022040 | A1 | 2/2002 | Robinson et al. |

(Continued)

FOREIGN PATENT DOCUMENTS

| CA | 840382 | 4/1970 |
|---|---|---|
| DE | 2055030 | 5/2009 |

(Continued)

OTHER PUBLICATIONS

Pettipher, G. 1986. J. Sci. Food Agric. 37:289.*
Niemenak, N. 2006. Journal of Food Composition and Analysis 19:612.*
Adamson et al., HPL Method for the Quantification of Procyanidins in Cocoa and Chocolate Samples and Correlation to Total Antioxidant Capacity, J. Agric Food Chem., 1999, 47: 4184-88.
Ahmad et al., "Insulin Like Activity in (-) Epicatechin"; Acta Diabetologica Latina; pp. 291-300; vol. 26; No. 4; 1989; Abstract.
Ardhana et al., "The Microbial Ecology of Cocoa Bean Fermentations in Indonesia"; International Journal of Food Microbiology; vol. 86; Nos. 1-2; pp. 87-99; 2003.

(Continued)

*Primary Examiner* — Carolyn Paden
(74) *Attorney, Agent, or Firm* — Hoxie & Associates LLC

(57) ABSTRACT

The invention relates to acidified cocoa nibs, wherein the nibs comprise at least 20 mg/g of polyphenols, preferably more than 30 mg/g of polyphenols, most preferably from 40 to 60 mg/g of polyphenols, cocoa refiner or expeller flakes, liquor, cakes, and cocoa powder obtainable from the nibs and a process for producing cocoa-derived material, comprising the steps of: (i) treating cocoa nibs obtained from beans or seeds which have a higher polyphenol content than fermented cocoa beans with an acid; and (ii) optionally drying the nibs.

4 Claims, 21 Drawing Sheets

(56) References Cited

U.S. PATENT DOCUMENTS

| | | |
|---|---|---|
| 2002/0034579 A1 | 3/2002 | Biehl et al. |
| 2002/0081363 A1 | 6/2002 | Zapp et al. |
| 2002/0098213 A1 | 7/2002 | Bonte et al. |
| 2002/0106388 A1 | 8/2002 | Pugliese |
| 2002/0132018 A1* | 9/2002 | Kealey et al. ............ 424/757 |
| 2002/0136819 A1* | 9/2002 | Myers et al. ............ 426/631 |
| 2003/0129276 A1 | 7/2003 | Hansen et al. |
| 2003/0215558 A1 | 11/2003 | Kealey et al. |
| 2004/0166142 A1 | 8/2004 | Chevaux et al. |
| 2004/0191403 A1 | 9/2004 | Hansen et al. |
| 2005/0031762 A1 | 2/2005 | McCarthy et al. |
| 2005/0244544 A1 | 11/2005 | Lloyd et al. |
| 2007/0254068 A1 | 11/2007 | Nair et al. |
| 2007/0258920 A1 | 11/2007 | Lecoupeau et al. |
| 2008/0089997 A1* | 4/2008 | Kealey et al. ............ 426/631 |
| 2008/0107783 A1 | 5/2008 | Anijs et al. |
| 2008/0193595 A1 | 8/2008 | De Vuyst et al. |
| 2008/0268097 A1 | 10/2008 | Hurst et al. |
| 2008/0317891 A1* | 12/2008 | Anderson et al. ............ 424/776 |
| 2009/0130284 A1 | 5/2009 | Miller et al. |
| 2010/0055248 A1* | 3/2010 | Woelfel et al. ............ 426/72 |
| 2010/0062138 A1* | 3/2010 | Cienfuegos-Jovellanos Fernandez et al. ............ 426/631 |
| 2011/0064849 A1 | 3/2011 | Bernaert et al. |
| 2012/0128823 A1 | 5/2012 | Camu et al. |

FOREIGN PATENT DOCUMENTS

| | | |
|---|---|---|
| EP | 0187415 | 7/1986 |
| EP | 0344728 | 5/1989 |
| EP | 0393362 | 3/1990 |
| EP | 0614613 | 9/1994 |
| EP | 0906761 | 4/1999 |
| EP | 0943675 | 9/1999 |
| EP | 1026164 | 8/2000 |
| EP | 1106073 | 6/2001 |
| EP | 1346640 | 6/2003 |
| EP | 1121020 | 7/2004 |
| EP | 1946643 | 7/2008 |
| ES | 2099676 | 5/1997 |
| FR | 2609395 | 7/1998 |
| FR | 2818095 | 6/2002 |
| GB | 0014624 | 7/1897 |
| GB | 0341000 | 1/1931 |
| GB | 345250 | 3/1931 |
| GB | 0562123 | 6/1944 |
| GB | 0653240 | 5/1951 |
| GB | 0751121 | 6/1956 |
| GB | 1243909 | 8/1971 |
| GB | 2046 853 A | 11/1980 |
| GB | 2059243 | 4/1981 |
| GB | 2182538 | 5/1987 |
| GB | 2223944 | 4/1990 |
| GB | 2416106 | 1/2006 |
| GB | 0801119.9 | 1/2008 |
| JP | 57-206391 | 12/1982 |
| JP | S61-173745 | 8/1986 |
| JP | 61-239872 | 10/1986 |
| JP | 03-094640 | 4/1991 |
| JP | H05-038255 | 2/1993 |
| JP | 06-128164 | 5/1994 |
| JP | 07-016059 | 1/1995 |
| JP | 07-213251 | 8/1995 |
| JP | 07-274894 | 10/1995 |
| JP | 08-291018 | 11/1996 |
| JP | H09-156 | 1/1997 |
| JP | 09-224606 | 9/1997 |
| JP | 09-234018 | 9/1997 |
| JP | 11-308978 | 11/1999 |
| JP | 2004517641 A | 6/2004 |
| JP | 2005 151936 | 6/2005 |
| JP | 2005520505 A | 7/2005 |
| SU | 646254 | 2/1979 |
| WO | WO 96/10387 A3 | 4/1996 |
| WO | WO 96/10404 A1 | 4/1996 |
| WO | WO 97/33484 A1 | 9/1997 |
| WO | WO 97/36497 A2 | 10/1997 |
| WO | WO 97/36597 A1 | 10/1997 |
| WO | WO 98/09533 A1 | 3/1998 |
| WO | WO 98/47534 A1 | 10/1998 |
| WO | WO 99/45788 A1 | 9/1999 |
| WO | WO 99/65322 A1 | 12/1999 |
| WO | WO 00/01351 A1 | 1/2000 |
| WO | WO00/22935 * | 4/2000 |
| WO | WO 00/22935 A1 | 4/2000 |
| WO | WO 01/93690 A2 | 12/2001 |
| WO | WO 02/13838 A1 | 2/2002 |
| WO | WO02/063974 * | 8/2002 |
| WO | WO 02/063974 A1 | 8/2002 |
| WO | WO 2007/031186 A1 | 3/2007 |
| WO | WO 2007/106473 A2 | 9/2007 |
| WO | WO 2007/140770 A1 | 12/2007 |
| WO | WO 2008/043058 A1 | 4/2008 |
| WO | WO 2009/067533 A1 | 5/2009 |
| WO | WO 2009/093030 A1 | 7/2009 |
| WO | WO 2011/012680 A2 | 2/2011 |

OTHER PUBLICATIONS

Bastide et al, "Changes in Phenolic Compounds of the Theobroma Cacao Bean During Fruit Growth and Maluration"; Bulletin de Liaison—Groupe Polypheonls; pp. 425-427; vol. 13; 1986; Abstract.

Bernaert; "The Nutritional Aspects of Chocolate"; Food Science and Technology Today; vol. 20; No. 4; 2006.

Bhumibhamon et al., "Cocoa Fermentation I: Identification and Metabolites Study of Natural Cocoa Fermentation Microorganisms"; Kasetsart Journal: Natural Science: vol. 31, 1997.

Bhumibhamon et al., "Cocoa Fermentation II: Effect of Enzyme pectinase on Natural Cocoa Fermentation"; Kesetart Journal: Natural Science; vol. 31; 1997.

Bhumibhamon et al., "Cocoa Fermentation III: Improvement of Cocoa Fermentation by Inoculated with Selected Mixed Culture in Laboratory and Farm Trial"; Kesetsart Journal: Natural Science; 31: 327-341; 1997 (original and English translation).

Bhumibhamon et al., "Cocoa Fermentation IV: Chemical Properties and Sensory Evaluation in Mix-Culture Fermented Cocoa"; 31: 419-428; 1997 (original and English translation).

Bhumibhamon et al., "Cocoa Fermentation: Study of Microbiological, Physical and Chemical Changes During Cocoa Fermentation"; Kasetsart Journal: Natural Science; vol. 31; 1997.

Bispo, E.S., et al., Alkalinization Process for Cocoa (Theobroma Coco L.) Nibs and Quality Evaluation of the Powder by Response Surface Methodology, Journal of Food Science and Technology, Associateion of Food Scientists and Technologists, US, vol. 30, No. 1, 14-20, (2002).

Camu et al., "Dynamics and Biodiversity of Populations of Lactic Acid Bacteria and Acetic Acid Bacteria Involved in Spontaneous Heap Fermentation of Cocoa Beans in Ghana"; Applied and Environmental Microbiology; vol. 73, No. 6, pp. 1809-1824; 2007.

Chakraborty et al., "Evaluation of Biological Activities of Rhus Aromatica Extracts"; Pharmaceutical and Pharmacological Letters; pp. 76-81; vol. 10, No. 2; 2000; Abstract.

Chevaux et al., "Proximate, Mineral and Procyanidin Content of Certain Foods and Beverages Consumed by the Kuna Amerinds of Panama"; Journal of Food Composition and Analysis; pp. 553-563; vol. 14; No. 6; 2001; Abstract.

Cleenwerck et al., "Acetobacter Tropicalis 16S rRNA gene, Strain LMG 1663"; Database accession No. AJ419842; Oct. 8, 2002.

Da Costa et al., The Spectrophotomeric analysis of "cacao red", Estacao agron, Nacl., Sacavem, Port. Agronomia Lusitana (1952) 14: 59-93.

Fincke H., Zeitschrift fuer Untersuchung der Lebensmittel (1928) 55: 559-68.

Galvez et al., "Study on the Microflora and Biochemistry of Cocoa Fermentation in the Dominican Republic"; International Journal of Food Microbiology; Elseiver Science Pub.; vol. 114; No. 1; pp. 124-140: 2007.

Gebhardt et al., "Antioxidant and Hepatoproteetive Effects of Artichoke Extracts and Constituents in Cultured Rat Hepatocytes"; Toxicology in Vitro; pp. 669-672; vol. 11; No. 5; 1997; Abstract.

(56) References Cited

OTHER PUBLICATIONS

Halder et al., "Protective Role of Black Tea Against Oxidative Damage of Human Red Blood Cells"; Biochemical and Biophysical Research Communications; pp. 903-907; vol. 244, No. 3; 1998.
Heiduschka, A., The pigment "Cacao-Red",Journal fuer Praktisch Chemie (Leipzig) (1927) 117:262-72.
Heiduschka, A., Cacao Red. II., Tech. Hochschule, Dresden. Journal feur Praktische Chemie (Leipzig), (1928) vol. 119, pp. 199-208.
Hirano et al., "Antioxidant Effects of Polyphenols in Chocolate on Low-Density Lipoprotein Both in Vitro and Ex Vivo", Journal of Nutritional Science and Vitaminology, vol. 46, No. 4, pp. 199-204, (2000), (Abstract).
Holt et al; "The Shorter Bergey's Manual of Determinative Biology"; 8th Ed.: pp. 94-95 and 218-222; 1997.
International Search Report and Written Opinion of the International Searching Authority for PCT/GB2009/000177 mailed Apr. 24, 2009.
International Search Report from the International Searching Authority for PCT/EP2006/008377 mailed Jan. 2, 2007.
International Standard ISO 2451; "Cocoa Beans—Specification"; First edition; pp. 1-3; 1973.
Lecoq, R., Nte on the Roasting of Cacao, Journal de Pharmacie et de Chimie (1922) 26: 96-101 (Abstract only).
Lee, F. A. 1975. Basic Food Chemistry. The AVI Publishing Company, Inc., Westport, CT. p. 331-332.
Minifie, B., 1980. Chocolate, Cocoa and Confectionery: Science and Technology. 2nd edition. AVI Publishing Company, Inc., Westport. CT. p. 9, 13, 14, 15, 34, 35, 40, 41, 54.
Misnawi et al., "Activation of Remaining Key Enzymes in Dried Under-Fermented Cocoa Beans and its Effect on Aroma Precursor Formation", Food Chemistry, vol. 78, No. 4. pp. 407-417, (2002).
Mosimann, G., Organic Acids in the Cacao Bean, Mitteilungen aus dem Gebiete der Lebensmittelunterschuno unde Hygiene (1944) 35: 241-72.
Mosimann, G., The Question of the Uniform Designation of the Coloring Matters of Cacao:"Cacao-red" or "Cacao-Purple"?, Intern. Chocolate Rev. (Zurich) (1947) 2: 111-13 (Abstract only).
Neirinckx et at., Cacao Qualitie, Comparison of Various Methods of Fermentation and Drying, Lab rechercM Ministere colonies, Tervuren, Belg. Bulletin Agricole du Congo (1952) 42: 273-382.
Nielsen et al; "Acetobacter Syzygii Gene for 16S rRNA, strain:9H-2"; Database accession No. AB05712, Oct. 8, 2002.
Nielsen et al; "Acetobacter Syzygii Strain A265 16S Ribosomal RNA Gene, Partial Sequence"; Database Accession No. DQ523496, May 29, 2006.
Nielsen et al; "Acetobacter Tropicalis strain A77 16S Ribosomal RNA Gene, Partial Sequence"; Database Accession No. DQ523494, May 29, 2006.

Ogasawara et al; "The Role of Hydrogen Peroxide in Basohil Histamine Release and the Effect of Selected Flavonoids"; Journal of Allergy and Clinical Immunology; pp. 321-328: vol. 78, No. 2; 1986; Abstract.
Osakabe et al; "Effects of Polyphenol Substances Derived from Theobroma Cacao on Gastric Mucosal Lesion Induced by Ethanol"; Bioscience, Biotechnology and Biochemistry; pp. 1535-1538: vol. 62. No. 8; 1998.
Pettipher, G., (1986), J. Sci. Food Agric. vol. 37 . pp. 289-296.
Riedl; "Kakao aus Neuguinea [Cocoa Beans from New Guinea]"; Gordian, Fachverlag A. Gordian; vol. 71, No. 10; p. 297; 1971.
Samah et al; "Effect of Shortened Fermentation Time of Acid Development and Sugar Metabolism of Cocoa Beans"; Acta Alimentaria; Adademiai Krado; vol. 21, Nos. 3-4; pp. 285-291; 1992; Abstract.
Samah et al; "Fermentation Products in Cocoa Beans Inoculated with Acetobacter Xylinum"; Asean Food Journal; vol. 8, No. 1; pp. 22-25; 1993.
Sanz et al; "Influence of a Series of Natural Flavonoids on Free Radical Generating Systems and Oxidative Stress"; Xenobiotica; pp. 689-699; vol. 24; No. 7; 1994; Abstract.
Schwan et al; "The Microbiology of Cocoa Fermentation and Its Role"; Critical Reviews in Food Science and Nutrition; vol. 44, No. 4: pp. 205-221; 2004.
Schwan; "Cocoa Fermentations Conducted with a Defined Microbial Cocktail Inoculum"; Applied and Environmental Microbiology; vol. 64; No. 4; pp. 1477-1483; 1998.
Search Report for GB 0801119.9 dated May 8, 2008.
Steinmann, A., Java Cacao, the Coloring Substances of Cacao Beans, Zeitschrift fuer Untersuchuno der Lebensmittel ( 1933) 65:454-60.
Tomlins et al; "Effect of Fermentation and Drying Practices on the Chemical and Physical Profiles of Ghana Cocoa"; Food Chemistry; vol. 46; No. 3; pp. 253-263; 1993.
Wan et al., "Effects of Cocoa Powder and Dark Chocolate on LDL Oxidative Susceptibility and Prostagelandin Concentrations in Humans", American Journal of Clinical Nutrition, pp. 596-602, vol. 74, No. 5, (2001).
Yoneda et al; "Antioxidant Effects of 'beta catechin'" ; Biochemistry and Molecular Biology International; pp. 995-1008; vol. 35; No. 5;1995; Abstract.
Zhang et al; "Antioxidant Activities of Baicalin, Green Tea Polyphonols and Alizain in vitro and in vivo"; Journal of Nutritional & Environmental Medicine; pp. 79-90; vol. 7; No. 2; 1997; Abstract.
Zhang et al; "Inhibitory Effects of Jasmine Green Tea Epicatechin Isomers on Free Radical-Induced Lysis of Red Blood Cells"; Life Sciences; pp. 383-394; vol. 61; No. 4: 1997; Abstract.

\* cited by examiner

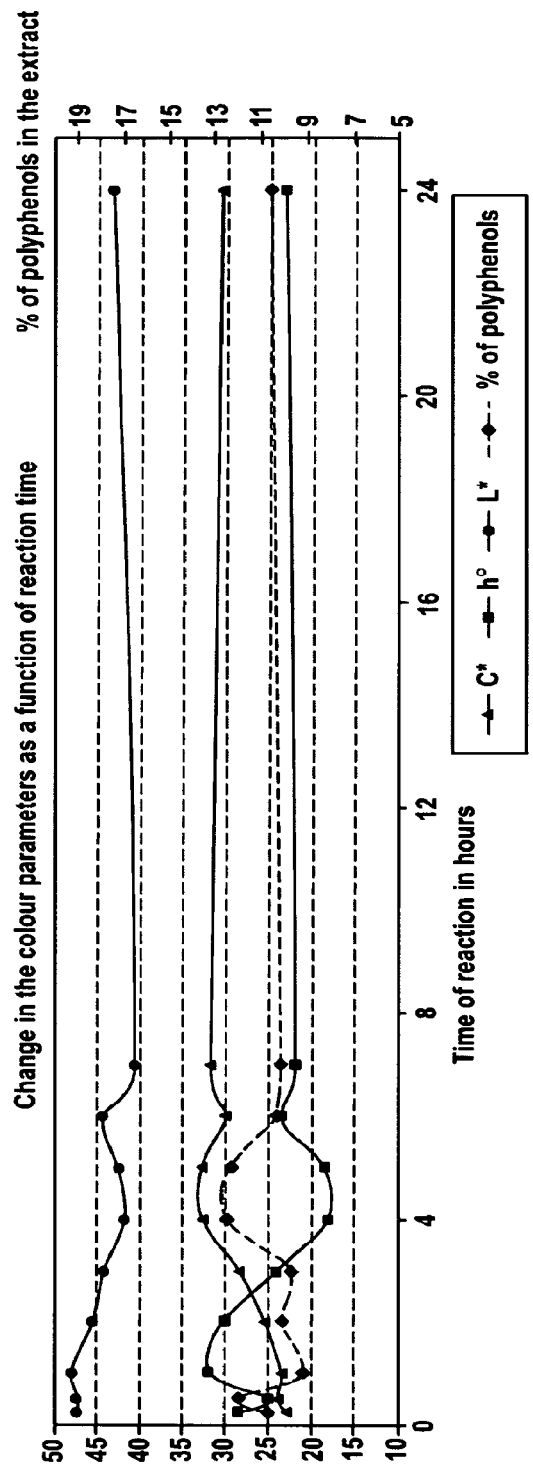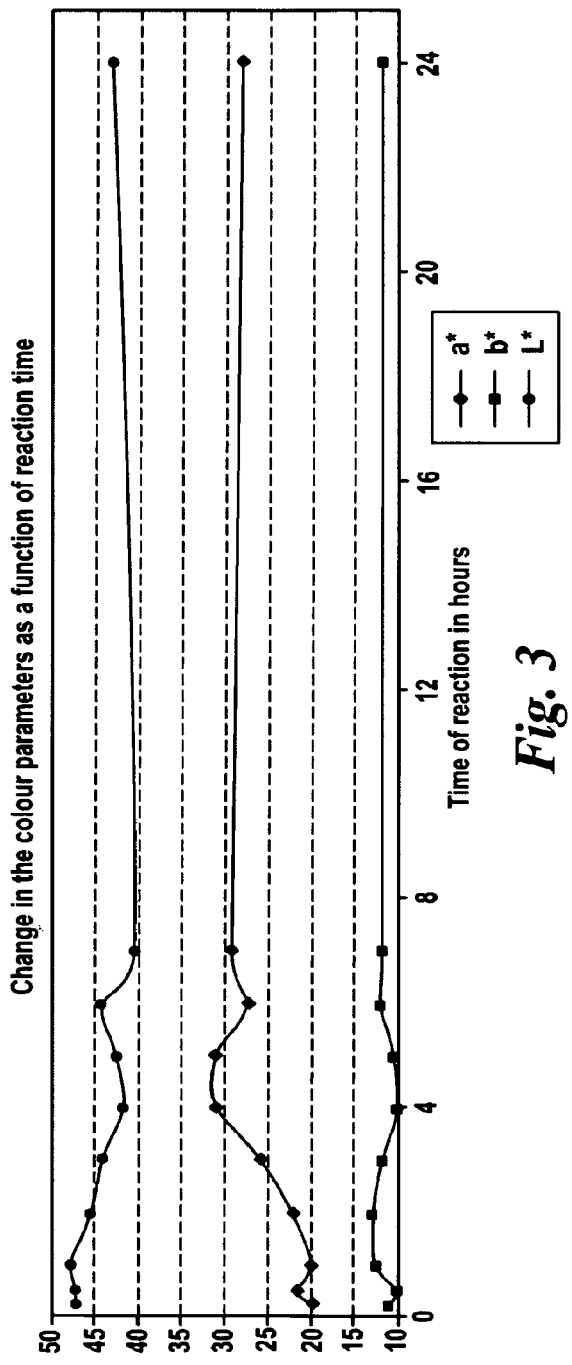
Fig. 3

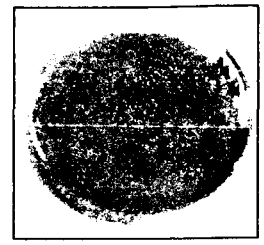
cocoa powder soaking 4h
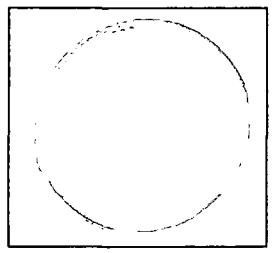
Yoghourt
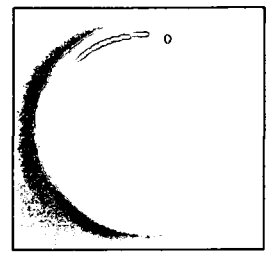
Yoghourt + 1%
of cocoa powder soaking 4h
cocoa powder soaking 4h
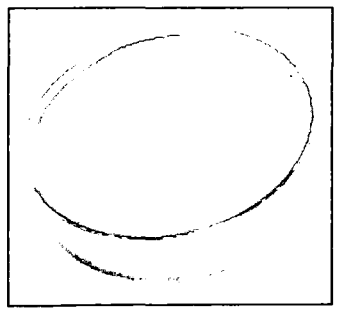
Yoghourt
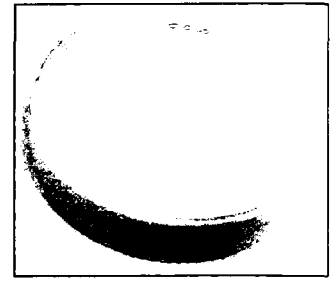
Yoghourt + 1%
of cocoa powder soaking 4h
*Fig. 7*

Fig. 19
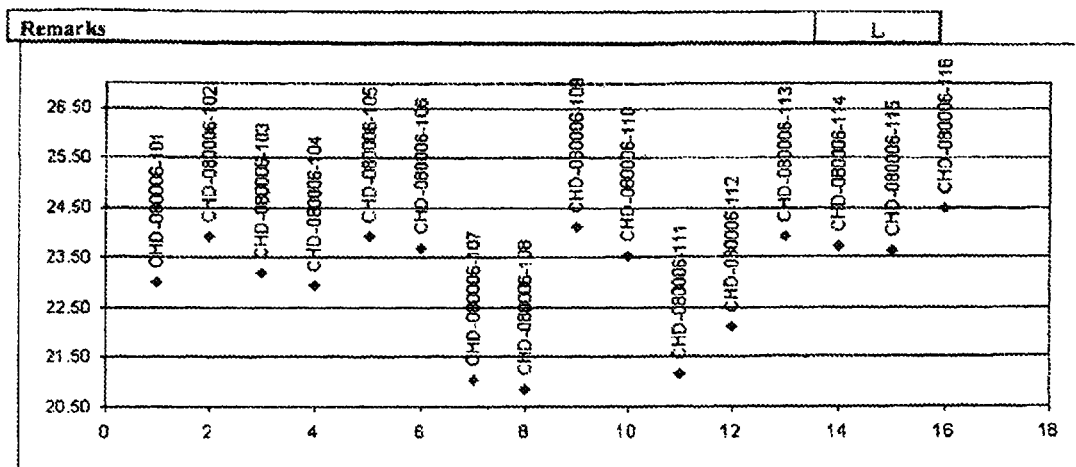
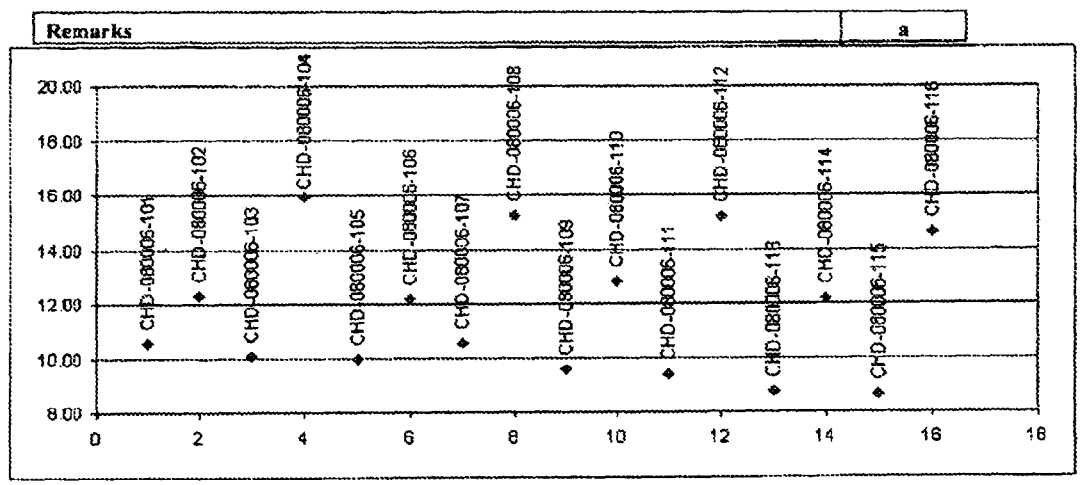

Fig. 20
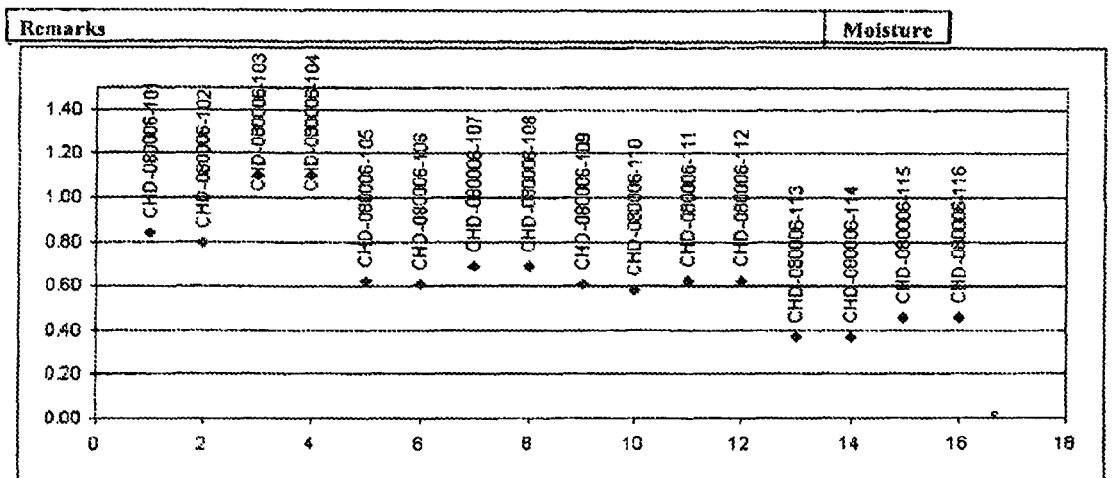
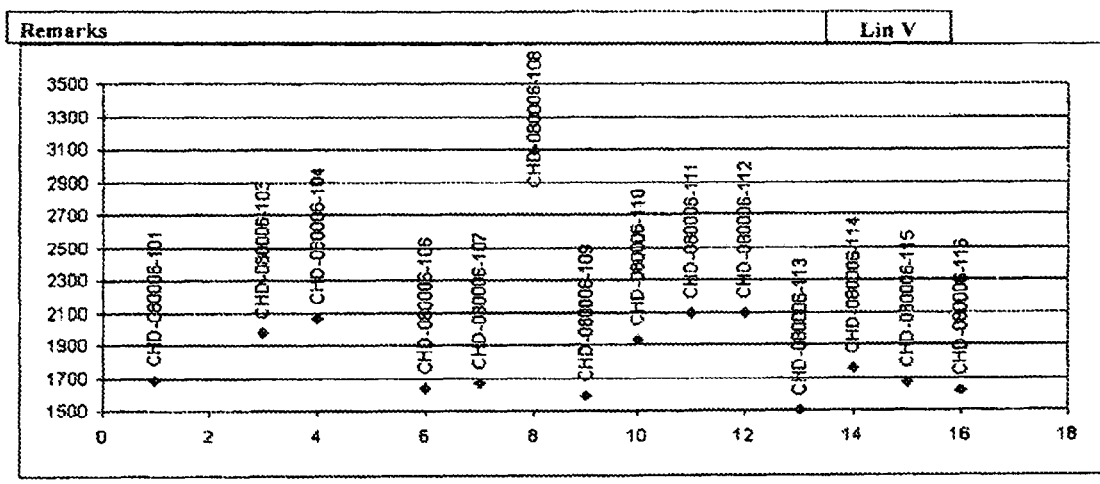

Fig. 21
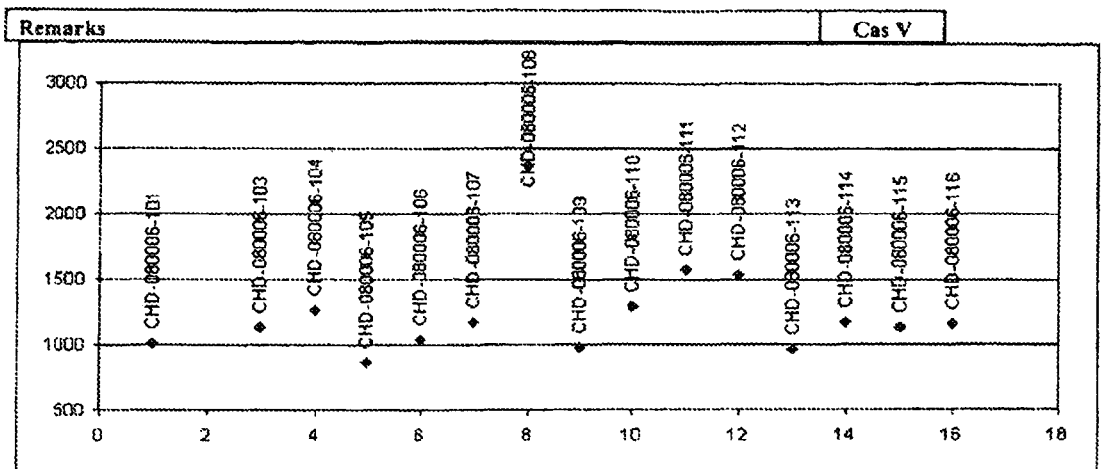
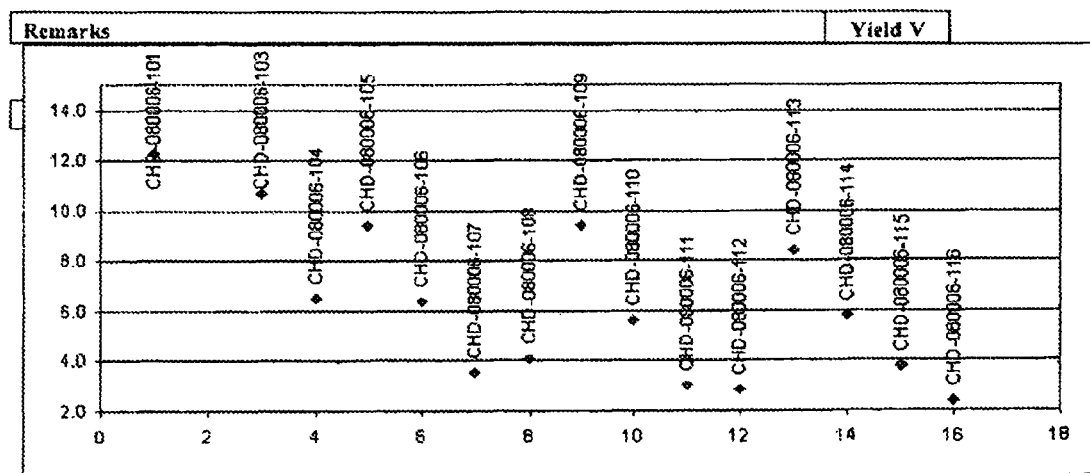

US 9,107,430 B2

PROCESS FOR PRODUCING RED OR PURPLE COCOA-DERIVED MATERIAL

Cross Reference to Related Applications

This application is a continuation U.S. application Ser. No. 12/456,971, filed Jun. 25, 2009 now U.S. Pat. No. 8,460,739, which is continuation of International Application No. PCT/GB2009/000177, filed Jan. 22, 2009, which claims priority to GB application No. 0801119.9, filed Jan. 22, 2008, the contents of each of which are incorporated herein by reference.

BACKGROUND OF THE INVENTION

This invention relates to acidified cocoa nibs comprising high levels of polyphenols, as well as refiner or expeller flakes, cocoa liquor, cocoa cake, and cocoa powder obtainable from the nibs and a process for the production of treated cocoa-derived material.

Cocoa products are often treated with a solution of alkalising agent e.g. a hydroxide or carbonate of sodium or potassium with the object of obtaining a product with a less astringent and richer taste and a deeper and more attractive colour. There is a desire amongst some consumers for cocoa products that have a different colour. The use of coloured cocoa products can restrict the use of artificial food colourings or allow the use of less colouring material, for example.

In order to obtain cocoa powders with different colours, alkalisation of cocoa products such as cocoa seeds, cocoa beans and cocoa nibs has been used as described in, for example, GB 1 243 909, U.S. Pat. Nos. 2,380,158 4,435,436, 4,704,292, 4,784,866 and 5,009,917. Roasting is also described in U.S. Pat. No. 4,704,292 and GB 2 416 106.

U.S. Pat. No. 5,114,730 discloses a method of making dark cocoa powder from cocoa powder in a water slurry at a temperature below 200° F. in less than about 60 minutes and spray drying the final product.

U.S. Pat. No. 2,957,769 describes the extraction of a fermented unroasted cocoa material and the treatment of both the extract and the residual material.

U.S. Pat. No. 2,965,490 discloses the hydrolysis of unfermented cocoa to produce chocolate flavour. US 2003/0129276 describes a treated cocoa liquor for making chocolate crumb. US 2005/0031762 discloses the production of a low fat cocoa extract by adding acetic acid to fresh seeds and/or underfermented seeds.

U.S. Pat. No. 2,512,663 describes the treatment of roasted cocoa nibs to produce flavour or essence constituents from the cocoa-bearing material.

US 2007/0254068 discloses a method of producing a cocoa beverage containing beneficial cocoa polyphenols. Such polyphenols are also described in U.S. Pat. No. 7,115,656.

GB 345,250 discloses the recovery and purification of alkaloids from cocoa products.

WO 2008/043058 and US 2008/107783 describe a method of producing high-brightness cocoa powder and related components.

WO 98/09533 discloses cocoa components, edible products having enhanced polyphenol content, methods of making the same and medical uses.

US 20080268097 describes cocoa ingredients having enhanced levels of stilbene compounds and methods of producing them.

EP 1946643 A1 discloses food ingredients with reduced sourness at low pH. U.S. Pat. No. 5,888,562 describes an enzymatic treatment of cocoa. US 2004/0191403 discloses chocolate flavour manipulation.

SUMMARY OF THE INVENTION

There remains a need for coloured cocoa-derived materials which can be produced conveniently and efficiently. Preferably such materials can provide health benefits and/or have properties suitable for use in a low pH environment, such as for example as colouring in yoghurt. Such materials may avoid the disadvantages associated with alkalisation and/or roasting.

According to the invention in a first aspect, there is provided acidified red or purple cocoa nibs, wherein the red or purple cocoa nibs comprise at least 20 mg/g of polyphenols, preferably more than 30 mg/g of polyphenols, most preferably from 40 to 60 mg/g of polyphenols. Preferably, the acidified cocoa nibs are red or purple as defined herein.

In a second aspect, the invention provides red or purple cocoa refiner or expeller flakes obtainable from the nibs according to the first aspect of the invention. Preferably, the refiner or expeller flakes are red or purple.

In a third aspect, the invention provides a red or purple cocoa liquor obtainable from the nibs according to the first aspect of the invention. The cocoa liquor is preferably red or purple In a fourth aspect, the invention provides a red or purple cocoa cake obtainable from the liquor according to the third aspect of the invention. The cake is preferably red or purple.

In a fifth aspect, the invention provides a red or purple cocoa powder obtainable from the cocoa liquor according to the third aspect of the invention or the cocoa cake according to the fourth aspect of the invention or from the expeller flakes according to the second aspect of the invention.

In a sixth aspect, the invention provides a cocoa-derived material in the form of a powder and having an $L^*$ value of from about 40 to 45, a $C^*$ value of from about 28 to 33, an $h°$ value of from about 17 to 25 and optionally an $a^*$ to $b^*$ ratio of from about 2.2 to 3.1. Alternatively, the $L^*$ value is from about 40 to 57, the $C^*$ value is from about 18 to 40, an $h°$ value of from about 7 to 40 and optionally an $a^*$ to $b^*$ ratio of from about 1 to 8.

In a seventh aspect, the invention provides a cocoa-derived material in the form of a powder and having an $L^*$ value of from about 47 to 57, a $C^*$ value of less than about 18, preferably from about 10 to 17, an $h°$ value of from about 20 to about 50, preferably from about 25 to 40 or 25 to 30, and optionally an $a^*$ to $b^*$ ratio of less than about 2.3, preferably from about 1 to 2.1.

It has been found that the colour parameters can be varied depending on the acidification reaction conditions.

The cocoa-derived material is preferably acidified and comprises at least 20 mg/g of polyphenols, preferably more than 30 mg/g of polyphenols, most preferably from 40 to 60 mg/g of polyphenols. The cocoa-derived material is an optionally defatted material. The cocoa-derived material is preferably as defined below.

In an eighth aspect, the invention provides a food, confectionery, dairy or bakery product comprising the cocoa refiner or expeller flakes according to the second aspect of the invention and/or the cocoa liquor according to the third aspect of the invention and/or the cocoa cake according to the fourth aspect of the invention and/or the red cocoa powder according to the fifth aspect of the invention and/or the cocoa-derived material according to the sixth or seventh aspects of the invention.

In a ninth aspect, the invention provides a process for producing red or purple cocoa-derived material, comprising the steps of:
(i) treating cocoa nibs obtained from cocoa beans or seeds which have a higher polyphenol content than fermented cocoa beans with an acid; and
(ii) optionally drying the nibs.

In a tenth aspect, the invention provides a process for producing red or purple cocoa-derived material, comprising the steps of:
(i) treating cocoa-derived material obtained from beans or seeds which have a higher polyphenol content than fermented cocoa beans with an acid; and
(ii) optionally drying the material.

The cocoa-derived material in the tenth aspect may be as defined below and is preferably selected from cocoa nibs, flakes, such as refiner flakes or expeller flakes, cocoa cakes, cocoa powder, cocoa liquor, more preferably, selected from flakes, cocoa powder and cocoa liquor. The cocoa-derived material is preferably red or purple after treating.

The term "cocoa-derived material" as used herein includes cocoa nib, refiner flakes, expeller flakes, cocoa cakes, cocoa powder, cocoa liquor and sweetened or unsweetened chocolate, milk chocolate or white chocolate. These are all terms well-known to a person skilled in the art (see Chocolate, Cocoa, and Confectionery: Science and Technology by Bernard W. Minifie Springer; 3 edition (Dec. 15, 1988)). The term "nib" refers to the cocoa bean without the shell and may comprise 54% fat and 46% non-fat solids on a dry weight basis. The term "cocoa liquor" refers to ground cocoa nibs and it can be separated into cocoa butter and cocoa solids. The term "cocoa flakes" refers to cocoa liquor in the form of solid flakes; they typically have a fat content of 54%. The term "expeller flakes" refers to flakes produced from an expeller press. The fat content of the expeller flakes is typically less than 20 wt. %.

Cocoa butter is the fat component of chocolate liquor, whereas the remaining part of the chocolate liquor is cocoa solids or cocoa mass. What remains after the removal of the cocoa butter through pressing are cocoa cakes, disks with a thickness of, for example, approximately five centimeters. These cakes can be broken up and ground into a fine cocoa powder. The term "cocoa cake" refers to the cocoa solids or cocoa mass remaining after extraction of fat by pressing; it can be pulverized to form cocoa powder and so can be considered to be a compressed form of cocoa powder. Cocoa powder refers to cocoa solids with, for example, a total of from 0.5 to 26 wt. % of fat where the fat is cocoa butter. Typically, cocoa powders comprise 20 to 22 wt. % fat. Defatted cocoa powders can be produced which comprise reduced (10 to 12 wt. % fat) or substantially no cocoa butter or cocoa fat.

The process of making chocolate is described in Industrial Chocolate Manufacture and Use, edited by S T Beckett ($3^{rd}$ Edition, 1999, Blackwell Science). Chocolate is generally obtained by mixing sugar and cocoa butter with cocoa liquor or cocoa nibs, followed by refining, conching and tempering. Milk chocolate is prepared in a similar way but with the addition of milk. White chocolate is prepared in a similar way to milk chocolate but without the addition of cocoa liquor.

BRIEF DESCRIPTION OF THE DRAWINGS

FIG. 3 shows the variation in colour parameters and polyphenol content with the length of time of the process according to the present invention, for a defatted cocoa liquor as powder.

FIG. 7 shows a coloured yoghurt produced using a cocoa powder according to the invention.

FIG. 19 demonstrates results of experiments using a "Stephan" mixer. Wherein the experiment was carried out with ventilation to evacuate the volatile components.

FIG. 20 demonstrates results of experiments using a "Stephan" mixer. Wherein the experiment was carried out with ventilation to evacuate the volatile components.

FIG. 21 demonstrates results of experiments using a "Stephan" mixer. Wherein the experiment was carried out with ventilation to evacuate the volatile components.

DETAILED DESCRIPTION OF THE INVENTION

Figure 1:
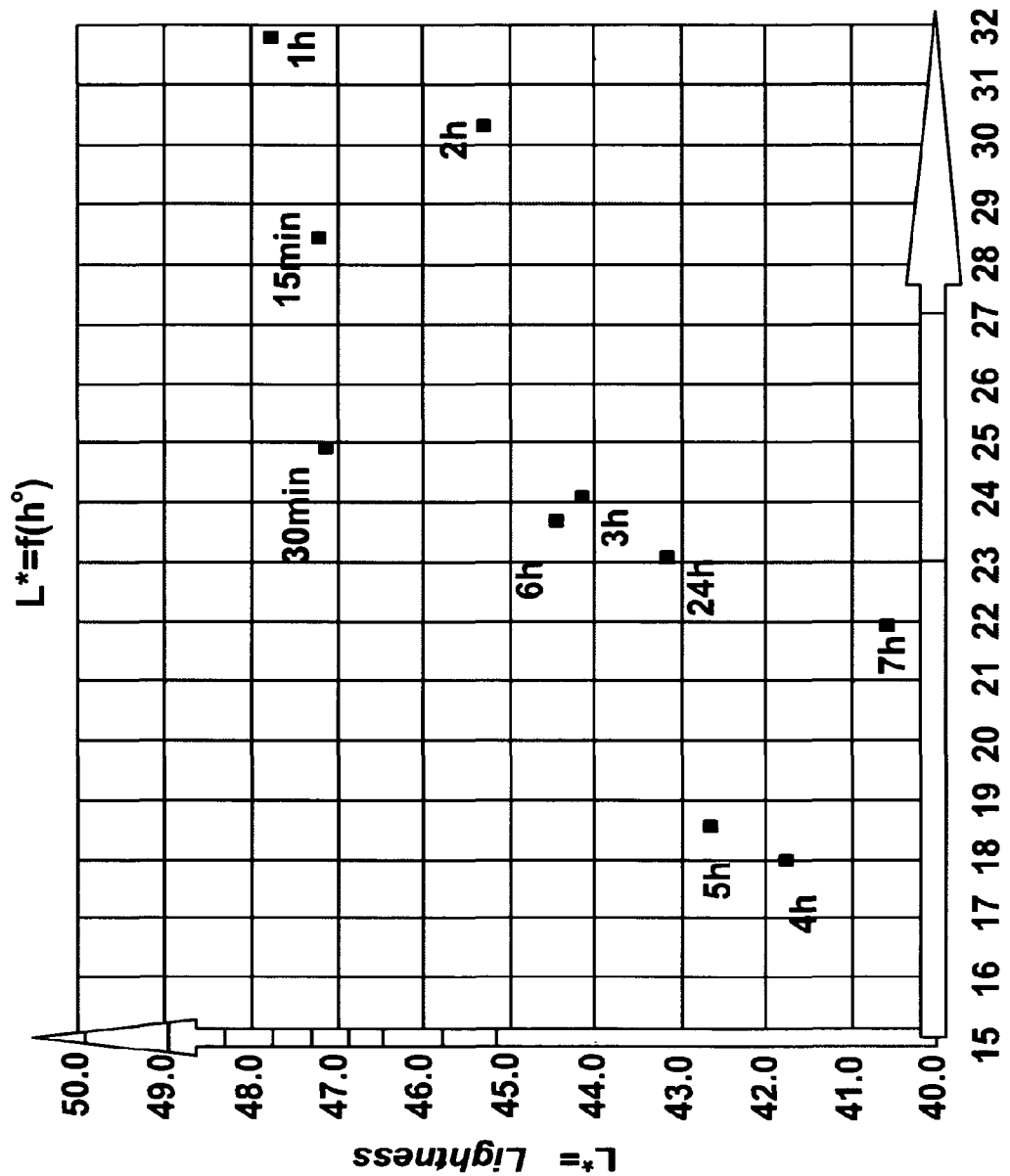
FIG. 1 shows the variation in colour parameters L* and h° with the length of time of the process according to the present invention, for a defatted cocoa liquor as powder.
Figure 2:
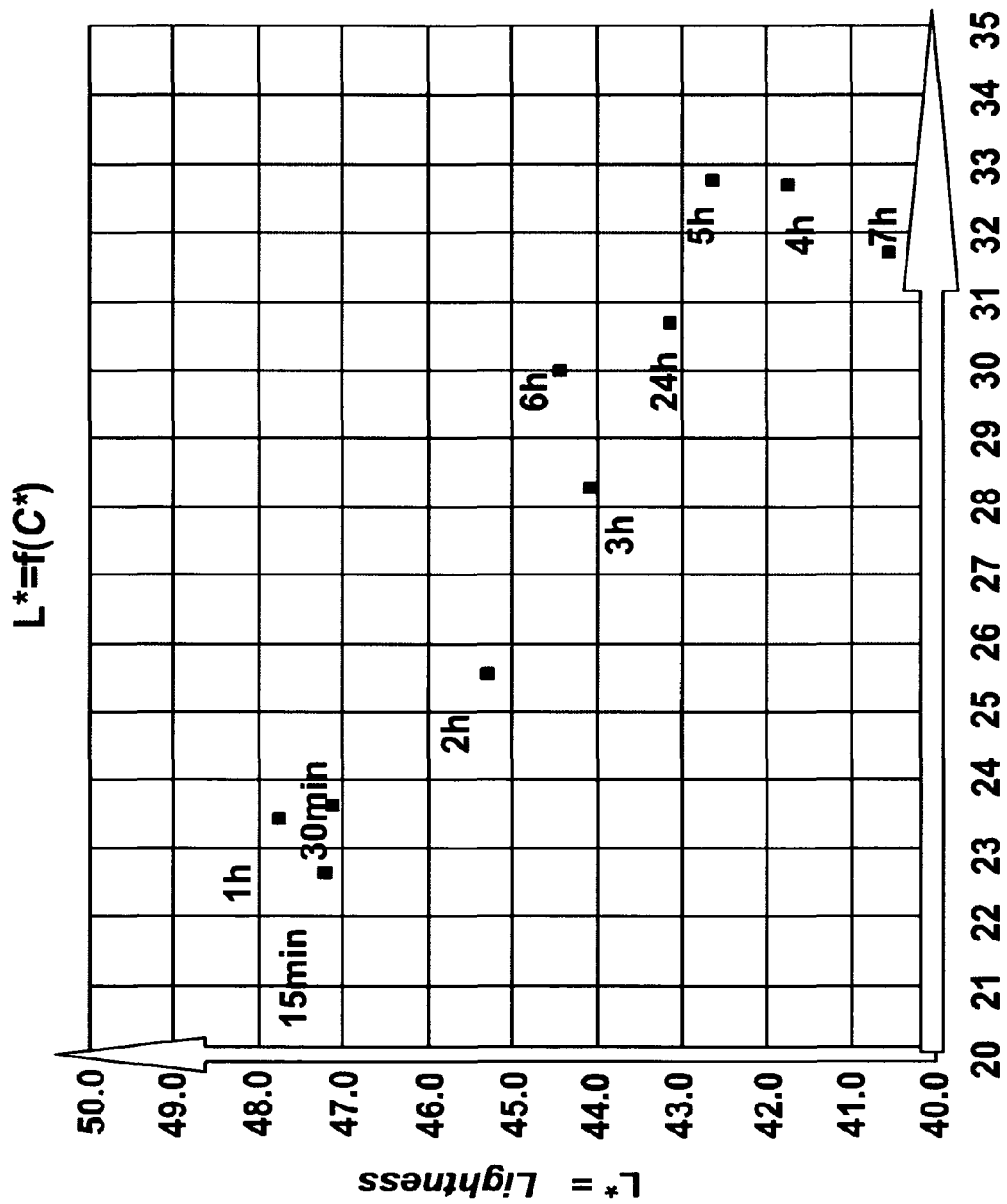
FIG. 2 shows the variation in colour parameters L* and C* with the length of time of the process according to the present invention, for a defatted cocoa liquor as powder.
Figure 4:
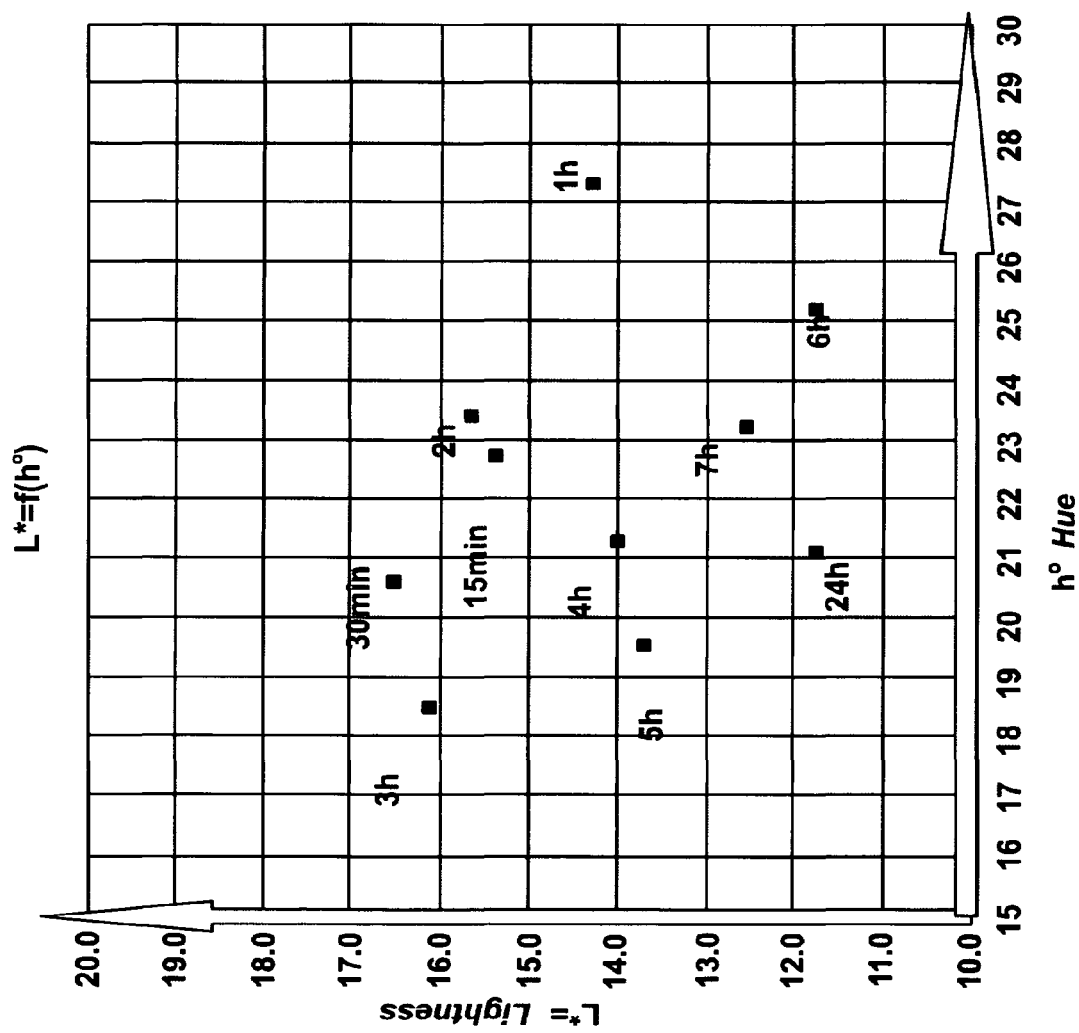
FIG. 4 shows the variation in colour parameters L* and h° with the length of time of the process according to the present invention, for a cocoa liquor melted and liquid and an external colour at 40° C.
Figure 5:
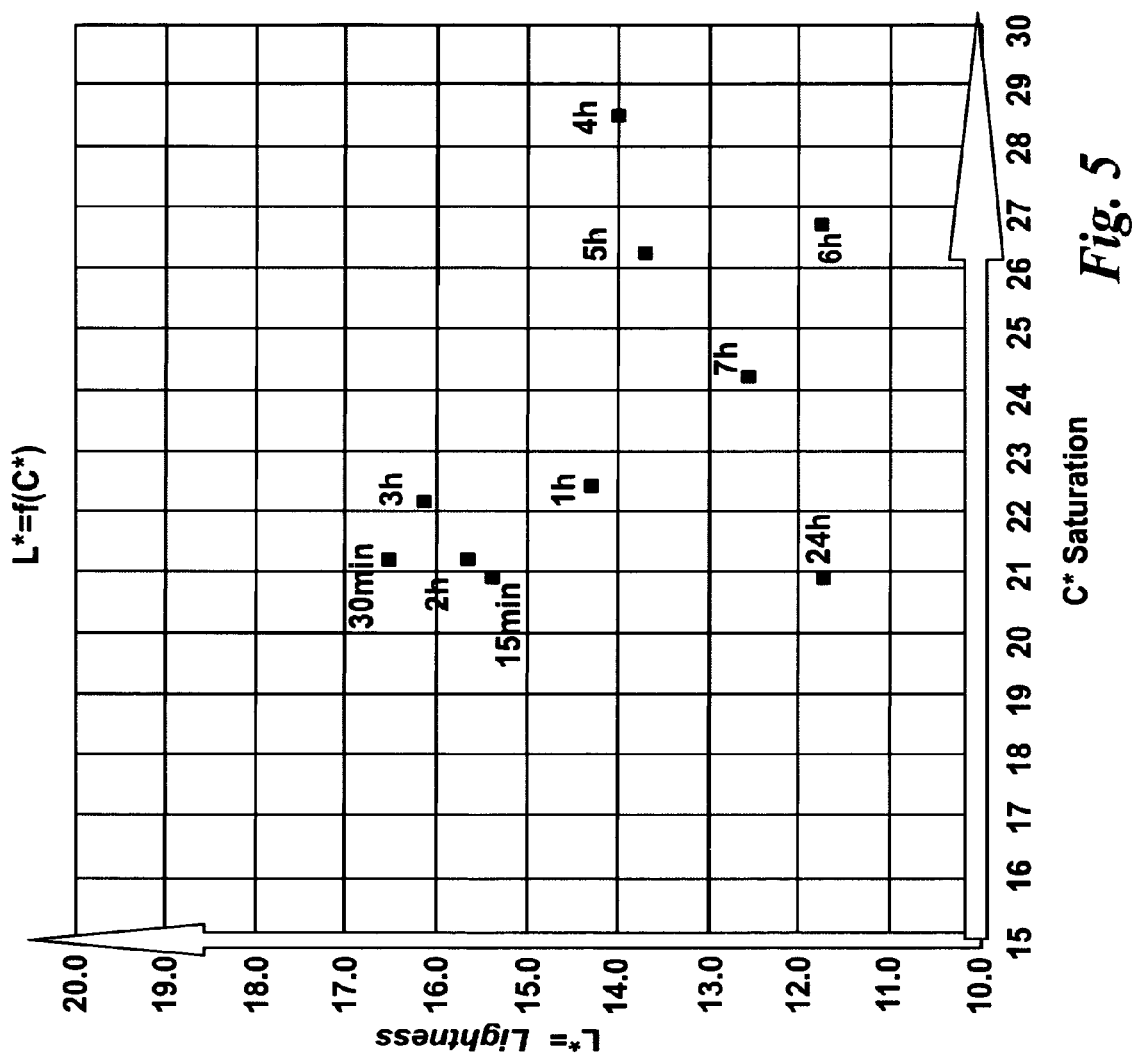
FIG. 5 shows the variation in colour parameters L* and C* with the length of time of the process according to the present invention, for a cocoa liquor melted and liquid and an external colour at 40° C.

The present invention can be considered to recognise that cocoa-based materials having a suitable combination of bacterial content, polyphenols content and colour can be produced.

The present invention can be considered to relate, at least in part, to the finding that red or purple cocoa-derived materials can be produced from cocoa nibs obtained from cocoa beans or seeds which have a higher polyphenol content than a fermented cocoa bean or seed, using an acid having a suitable $pK_a$. In addition, the present invention recognises that if the acidic conditions used to produce the red or purple cocoa-derived materials are controlled, in particular if the pH, water content, temperature and length of reaction are controlled, then the level of polyphenols present in a cocoa bean or seed can be preserved to a particular degree in the cocoa-derived material and particular colours can be produced.

The cocoa beans or seeds used in the present invention, as defined in any of the embodiments herein, may be any variety from *Theobroma cacao*, for example, *Forastero, Criollo*, or *Trinitario*, obtained from any suitable source such as, for example, the Ivory Coast, Brazil, Nigeria, Cameroon, Indonesia and Ghana. It is preferred, however, that the beans or seeds are unfermented and dried, preferably in the sun, or cocoa beans called "lavados" beans, such as from Brazil. These "lavados" beans are beans which are unfermented and washed.

The colour of cocoa powders can be specified by means of colour coordinates. A frequently used system has been developed by R. S. Hunter. In this system, the colour coordinates are denoted by the characters $L^*$, $a^*$ and $b^*$, $C^*$ and $h°$. These colour coordinates are described more fully in Hunter, R. S., *The Measurement of Appearance*, John Wiley and Sons, New York, 1975. The value of the colour coordinates can be determined with an appropriate measuring system.

The $L^*$-coordinate can assume values between 0 (black) and 100 (white). The closer $L^*$ gets to zero, the darker the cocoa. A high value of the $a^*$-coordinate indicates a pronounced red component in the colour of the cocoa powder; a high value of the $b^*$-coordinate points to the presence of a lot of yellow. So far as the red is concerned, the higher the ratio $a^*:b^*$, the more red the colour of the cocoa. $C^*$ refers to the saturation of colour and $h°=\arctan b^*/a^*$, is the hue value far from a standard cocoa powder.

The L-, a- and b- values of cocoa powder may be determined, for example, with the Hunterlab Digital Colour Difference Meter, type D 25 D 2 A.

A method for colour measurement, as described in U.S. Pat. No. 5,009,917, involves suspending cocoa powder at a 2.5% by weight level in an aqueous gelatin solution. The solution contains 5.0% gelatin and 0.06% of titanium dioxide which is used as a whitener in order to raise the L value of the suspension to a level where it is easier to differentiate similarly-coloured samples. The suspension is placed in a petri dish and quickly cooled to 60° F. (15.6° C.) to form a solid gelatin disk. Each sample is measured four times through the bottom of the dish using a colorimeter with the well-known Hunter L, a, b scale.

According to the present invention, the colour of the cocoa-derived material is preferably measured as follows. The cocoa-derived material, preferably cocoa liquor, comprising polyphenols is preferably defatted with, for example, petroleum-ether, followed by washing and centrifugation. By "defatted", we preferably mean that less than 5 wt. %, more preferably less than 1 wt. % fat is present, such as about 0 wt. % fat; preferably a powder is formed. After drying at room temperature, each sample is placed in a petri dish and measured four times through the bottom of the dish using a colorimeter with the well-known Hunter $L^*$, $a^*$, $b^*$ scale. The colorimeter used is the Minolta CM-2002 spectrophotometer. The conditions for colour measurement are: CIELAB Ill: D65, Obs: 10°, 3 flashes, mode: SCE and external colour at 20° C.

The term "red", as defined herein, preferably means that the cocoa-derived material, as defined above, when in the form of a powder (optionally after having been defatted), has an $L^*$ value of from about 39 to 48, preferably from about 40 to 45, more preferably from about 40 to 43, most preferably from about 40 to 42, an $a^*$ to $b^*$ ratio of greater than about 1.6, such as greater than about 1.8, more preferably greater than about 2.0, such as from about 2.2 to 3.2, most preferably from about 2.4 to 3.1, a $C^*$ value of greater than about 22, such as greater than about 25, preferably from about 25 to 34, more preferably from about 28 to 33, such as from about 30 to 33, and a $h°$ value of from about 16 to 32, preferably from about 17 to 30, more preferably from about 17 to 25, as measured according to the above method.

Alternatively, the term "red" preferably means that the $L^*$ value is from about 40 to 57, preferably from about 42 to 52 more preferably from about 44 to 48, the $C^*$ value is from about 18 to 40, preferably from about 25 to 35, more preferably greater than 18 or 30, an $h°$ value of from about 7 to 40, preferably from 10 to 35, more preferably greater than 7, and optionally an $a^*$ to $b^*$ ratio of from about 1 to 8, preferably from 3 to 6, more preferably from 4 to 5.

The term "purple", as defined herein, preferably means that the cocoa-derived material, as defined above, when in the form of a powder (optionally after having been defatted), has an $L^*$ value of greater than 46, preferably from about 47 to 57, more preferably from about 48 to 56, most preferably from about 50 to 56, such as from 52 to 56, optionally an $a^*$ to $b^*$ ratio of less than about 2.3, such as less than about 1.8, more preferably from about 1 to 2.1, such as from 1.5 to 2.1, a $C^*$ value of less than or about 18, preferably from about 10 to about 17, such as from 11 to 15, and a $h°$ value of from about 20 to about 50, preferably from about 25 to 40 or 25 to 30, as measured according to the above method.

The terms "red" and "purple" may also be considered to encompass other shades of these colours in substantially the same wavelength, such as pink, mauve, violet and parme.

In one embodiment of the invention, the optionally defatted cocoa-derived material, such as a defatted cocoa liquor, in the form of a powder, has an $L^*$ value of from about 40 to 45, a $C^*$ value of from about 28 to 33, an $h°$ value of from about 17 to 25 and optionally an $a^*$ to $b^*$ ratio of from about 2.2 to 3.1.

In another embodiment of the invention, as defined in any of the aspects herein, the optionally defatted cocoa-derived material, such as a defatted cocoa liquor in the form of a powder, has an $L^*$ value of from about 41 to 42, a $C^*$ value of from about 32 to 33, an $h°$ value of from about 17 to 19 and optionally an $a^*$ to $b^*$ ratio of from about 2.8 to 3.1, as measured according to the above method.

In one embodiment of the invention, as defined in any of the aspects herein, the term "purple" preferably means an $L^*$ value of from about 48 to 56, optionally an $a^*$ to $b^*$ ratio of from about 1 to 2.1, such as from 1.5 to 2.1, a $C^*$ value of from about 10 to about 17, such as from 11 to 15, and a $h°$ value of from about 25 to 40 or 25 to 30, as measured according to the above method.

The terms "red" or "purple" in relation to cocoa-nibs, refiner or expeller flakes, cocoa liquor and cocoa cake preferably refers to material which can be obtained from, or which produces, cocoa liquor which when defatted has the defined $L^*$ values, $C^*$ values, $h°$ values and $a^*$ to $b^*$ ratios, as measured by the specified method above.

Alternatively, the terms "red" or "purple" as used herein preferably refer to cocoa-derived material which has been acidified, or treated with an acid, such as according to the process of the invention as defined in any embodiment herein. In this embodiment, the acid preferably produces a colour change. The terms "red" and "purple" may or may not be synonymous with "acidified" or "treated with acid".

In a preferred embodiment of the invention, the external colour of chocolate is measured with spectrocolorimeter optionally after tempering, according to the method of the invention.

The acidified cocoa-derived materials as defined herein are preferably red or purple, such as defined above.

Acidified red or purple cocoa nibs are cocoa nibs which were not initially red or purple but which have been subjected to an acid for a sufficient amount of time to become red or purple, preferably as defined above. The nibs are preferably dried. In one embodiment, the moisture or water content of the nibs may be less than 15 wt. %, such as less than 10 wt. %, preferably less than 5 wt. %, for example from 1 to 4 wt. %.

Polyphenols are a diverse group of compounds (Ferriera et al., "Diversity of Structure and Function in Oligomeric Flavanoids, Tetrahedron, 48:10, 1743-1803, 1992). They occur widely in a variety of plants, some of which enter into the food chain. In some cases they represent an important class of compounds for the human diet.

By "polyphenol" we mean the well-known group of chemical substances that are found in plants, characterised by the presence more than one phenol group per molecule. Polyphenols are often present as monomers, dimers, trimers and other oligomers. Flavonoids are a subset of polyphenol. Cocoa contains polyphenols such as catechin, epicatechin, gallocatechin, epigallocatechin, epicatechin gallate, epigallocatechin gallate, procyanidins, prodelphinidins, and propelargonidine. Preferred polyphenols include catechin, epicatechin, procyanidins A2, B1 to B5, and C-1. Polyphenols with a molecular weight of less than 3000 are preferred.

Cocoa has been described as being rich in a particular subgroup of flavonoids named flavanols (flavan-3-ols). The flavanols are present as the monomers epicatechin and catechin or as oligomers of epicatechin and/or catechin called procyanidins. Epicatechin, catechin and the procyanidins, such as, for example, procyanidins B1, B2 and B3, are the predominant class of polyphenols in cocoa and in any embodiment of the invention, the term "polyphenols" is intended to include or mean these compounds.

The amount of polyphenols, measured as the epicatechin equivalent, can be determined using the Folin-Ciocalteu reagent (Singleton V L, Orthofer R, Lamuela-Raventos R M. Analysis of total phenols and other oxidation substrates and antioxidants by means of Folin-Ciocalteu reagent. Meth Enzymol 1999; 99: 152-178). The amount of polyphenols can also be determined using high performance liquid chromatography (HPLC).

The amount of polyphenols is provided as the epicatechin equivalent in mg/g in the present invention unless stated otherwise.

In one embodiment of the invention, the acidified, preferably red or purple cocoa nibs of the invention preferably comprise at least 3 wt. %, preferably about 5 wt. % based on the total weight of the nibs of polyphenols which are naturally present in the untreated, unfermented parent cocoa seeds or cocoa beans obtained directly from the pod. The amount of polyphenols, as measured by the Folin-Ciocalteu method in epicatechin equivalent, may be from 0 to 15 wt. %, preferably from 2 to 10 wt. %. The amount of polyphenols remaining in the cocoa nibs may be varied by controlling the conditions of acidification and can be measured using routine techniques.

The red or purple cocoa nibs of the invention preferably comprise about 50 mg of polyphenols per gram of nibs.

Acidified cocoa-derived materials, other than cocoa nibs, preferably comprise the amount of polyphenols set out above for cocoa nibs (by wt. % or gram of material).

The acidified cocoa nibs of the invention are preferably acidified cocoa nibs from cocoa seeds or cocoa beans that have a higher polyphenol content than a fermented cocoa bean. The fermented cocoa bean for comparison may be the parent cocoa bean or seed. The cocoa nibs which have the higher polyphenol content are preferably underfermented or unfermented cocoa beans or seeds. Unfermented and underfermented cocoa beans or seeds have a higher polyphenol content than fermented beans. Preferably, the cocoa beans or seeds are unfermented.

In one embodiment of the invention, the unfermented cocoa beans or seeds are beans or seeds which are obtained directly from cocoa pods and which have not been subjected to processing other than separation from the pulp.

In another embodiment of the invention, the unfermented cocoa beans or seeds are cocoa beans or seeds which have been depodded and have not been subjected to processing other than washing with, for example, water and optionally drying in the sun.

Cocoa beans or seeds which have been fermented can be distinguished from unfermented cocoa beans on the basis of their colour. Thus, fully fermented cocoa beans are predominantly brown. Unfermented cocoa beans or seeds are predominantly slaty and may have blue, purple or violet parts on their surface. It will be understood by a person skilled in the art that the cocoa materials derived from these beans will not be coloured, that is products obtained from the beans will not be coloured in the absence of the process of the invention.

Underfermented beans are beans which have been fermented for up to 3 days. These beans are usually purple, blue and/or violet and may also be slaty, but not predominantly. It will be understood by a person skilled in the art that the cocoa materials derived from these beans will not be coloured, that is products obtained from the beans will not be coloured in the absence of the process of the invention.

By "fermented beans" it is intended to mean beans which have been fermented for more than 3 days, such as between 3 and 7 days. The term "fermented beans" also includes beans which have been overfermented i.e., fermented for more than 7 days, for example up to 15 days.

Other cocoa-derived materials to be produced according to the invention are preferably derived from the cocoa beans or seeds described above. Thus, for example, cocoa powder or cocoa liquor derived from unfermented or underfermented cocoa beans or seeds (i.e. unfermented or underfermented cocoa powder or cocoa liquor) which have not previously been treated with an acid may be treated with an acid as described herein. Preferably red or purple cocoa liquor is produced. The acid treated cocoa liquor may then be used in the production of chocolate, in particular red or purple chocolate.

The acidified nibs of the invention are preferably further processed to produce red or purple cocoa refiner flakes or expeller flakes. The refiner or expeller flakes may be produced from the nibs using any means which does not substantially affect the polyphenol content of the flakes. It is preferred, for example, to avoid heating during the production of flakes, for example as in a pin mill. The flakes of the invention may, for example, be produced using a 3 roll refiner or other equivalent means or expeller, such as an expeller press well known in the art.

In one embodiment of the invention, a red or purple cocoa liquor is preferably obtained from the acidified cocoa nibs of the invention or by direct treatment of cocoa liquor with acid as defined herein. The cocoa liquor is typically a viscous pasty substance which can be used as the basic ingredient for chocolate. Preferably, the red or purple cocoa liquor is obtained by grinding the acidified cocoa nibs at a low temperature using, for example, a triple stone mill, or a 3, 4 or 5 rolls refiner. The temperature of the mill or refiner is preferably from 10 to 60° C., more preferably from 20 to 40° C., measured as the temperature set on the refiner or mill. Alternatively, the red or purple cocoa liquor may be obtained by gentle melting of the refiner flakes or expeller flakes of the invention. Thus, the refiner or expeller flakes may be melted at a temperature of from 40 to 60° C., preferably from 42 to 50° C.

Alternatively, cocoa liquor, or a composition comprising cocoa liquor such as chocolate, obtained from beans or seeds which have a higher polyphenol content than fermented cocoa beans (such as unfermented or underfermented cocoa beans or seeds) may be acidified or treated with an acid as described herein. In a preferred embodiment, the cocoa liquor may be acidified directly in the conche. In one embodiment, the cocoa liquor is red or purple, preferably as defined herein.

The red or purple cocoa liquor can be further processed by extraction and/or pressing or expelling to separate the cocoa butter and the cocoa powder. Thus, red or purple cocoa cake and cocoa powder can be obtained from the acidified cocoa nibs of the invention. Preferably the pressing is carried out at a temperature of from about 70 to 100° C., such as about 80° C. The red or purple cocoa cake or expeller flakes obtained by pressing or expelling can be ground to produce the cocoa powder according to known means.

Defatted cocoa powder may be prepared by a defatting treatment with a supercritical fluid. The supercritical fluid may comprise any solvent which will not leave a toxic residue. While cocoa powders defatted with solvents other than $CO_2$ may be used, such as hexane and propane, $CO_2$ is preferred. The latter is a substance present in ambient air, as well as body tissues and fluids. Hence it is ideal for food processing.

The red or purple refiner flakes, red or purple cocoa liquor and red or purple cocoa powder of the invention are acidified i.e., they are obtained or derived from acidified cocoa nibs or other suitable cocoa-derived material.

The red or purple cocoa powder of the invention preferably has a pH within the range of 2 to 8. More preferably, the pH of the cocoa powder is less than 7, such as, for example, from 2 to 5. The red or purple cocoa powder of the invention may therefore be compatible with an acidic environment such as that found in yoghurt.

The cocoa refiner or expeller flakes and/or the cocoa liquor and/or the cocoa cake and/or the cocoa powder, which are preferably red or purple, according to the invention may be incorporated into any one of food products, such as confectionery products, bakery products and dairy products in place of and/or in addition to traditional flakes, liquor, cake or powder. The amount of flakes, liquor, cake or cocoa powder according to the invention, incorporated into the food, confectionery, bakery or dairy products may, for example, be from 1 wt. % to 50 wt. % based on the total weight of the product, such as from 5 to 30 wt. %, more preferably from 10 to 20 wt. %.

In a preferred embodiment of the invention, the amount of flakes, liquor, cake or cocoa powder used is sufficient to impart a red or purple colour to the product.

In one embodiment of the invention, the food product is a liquid e.g., a beverage or a solid which is packaged or labelled for use as a foodstuff. The food product may be savoury i.e., comprise meat and/or fish and/or vegetables and/or eggs and/or dairy products and/or be sweet i.e., comprise sugar and/or butter and/or fruit.

In one embodiment of the invention, the confectionery product is selected from the group consisting of cooked candies, chocolate, chocolate-like products, fat continuous fillings and water-based fillings. The chocolate or chocolate-like product is preferably red or purple.

Chocolate-like products are materials in which at least a part of the cocoa butter in chocolate is replaced by another fat, such as butterfat or a vegetable fat such as a cocoa butter equivalent (CBE).

A preferred process for producing a chocolate or chocolate-like product comprises the steps of:
  (i) combining refiner flakes according to the invention or cocoa liquor according to the invention, preferably red or purple, with sugar or a sugar substitute; and
  (ii) adding cocoa butter or a cocoa butter replacement to produce a chocolate or chocolate-like product.

Examples of cocoa butter replacements include, cocoa butter equivalents, butter fat or fractions thereof, palm oil or fractions thereof, coconut or fractions thereof, palm kernel oil or fractions thereof, liquid vegetable oils, interesterified mixtures of the above fats or fractions or hardened components thereof, or mixtures thereof.

The chocolate or chocolate-like product is preferably red or purple.

When refiner or expeller flakes are used in the process, it is preferred that they are melted gently, for example at a temperature of from 40 to 50° C., more preferably from 42 to 48° C. in order to obtain a paste. The cocoa liquor may also be heated, if necessary, to produce a paste. The paste/cocoa liquor may be fatted or defatted. The paste/cocoa liquor is combined with sugar or a sugar substitute. Suitable examples of sugar substitutes include sweeteners, fructooligosaccharides and polyols, such as, for example, fructose, lactose and dextrose. The weight ratio of paste/cocoa liquor to sugar or sugar substitute is preferably from 3:1 to 1:3, more preferably from 2:1 to 1:2, such as about 1:1.

The mixture of paste/cocoa liquor and sugar or sugar substitute may be refined, preferably after combination with the cocoa butter or replacement, using any of the known techniques in the art. It is preferred that the refining conditions are selected such that any red or purple colour is maintained.

The cocoa butter, which may be obtained from any source, but preferably is cocoa butter obtained from red or purple cocoa liquor according to the invention, may be added to the mixture in order to liquefy it and achieve a total fat content of, for example, less than 60 wt. %, preferably from 30 to 40 wt. %, based on the total weight of the chocolate or chocolate-like product.

Flavourings may optionally be added to the chocolate or chocolate-like material. Suitable flavourings include natural vanilla or those indicated below.

The process for producing chocolate preferably also comprises the steps of conching, tempering and optionally molding. The chocolate may be produced according to the well-known methods in the art.

Suitable dairy products include, for example, milk. The milk is preferably obtained from cows. The milk may alternatively be soya milk. In addition, the milk may be low-fat, skimmed or powdered milk. Other dairy products include ice-cream, such as low-fat and low-sugar ice-cream, cream, yoghurt, and dessert. Bakery products include, for example, breads, cakes and biscuits.

In a preferred embodiment of the invention, the confectionery product comprises a fat continuous filling. This filling typically comprises solid particles (preferably in the form of fine particles) dispersed in a fat phase. The filling may be a reduced fat and/or a reduced sucrose filling.

The filling comprises one or more cocoa based materials. The cocoa based materials may be selected from the group consisting of cocoa powder (preferably defatted cocoa powder), chocolate powder, cocoa mass, cocoa liquor and mixtures thereof produced according to the invention. In a particular embodiment, the filling comprises from 5 to 40% by weight of cocoa powder (preferably defatted cocoa powder), more preferably from 10 to 30% by weight or from 12 to 23% by weight, most preferably from 15 to 20% by weight of cocoa powder (preferably defatted cocoa powder).

The filling may constitute from 30 to 85% by weight of the confectionery product, preferably from 45 to 80% by weight, such as from 55 to 75% by weight of the confectionery product.

The confectionery product, such as chocolate, optionally comprises one or more flavourings. Suitable flavourings include, but are not limited to, fruit, nut, and vanilla flavourings, fruit powder and pieces, nuts, vanilla, herbs, herb flavourings, caramel and caramel flavourings, spices and extracts from flowers, such as rose. Those skilled in the art are familiar with numerous flavourings that can be selected for use in this invention.

The red or purple cocoa powder according to the invention can also be used as a natural colouring or flavouring agent, such as, for example, in food, confectionery, baking or dairy products and so reduce the need for artificial colourings. The powder may be used as a colouring or flavouring agent in the domestic or industrial kitchen. The powder may be sprinkled over foods, confectionery, baking or dairy products or be used in beverages. The powder may be packaged in sachets, for multiple or single use, for example.

The confectionery products may each take any suitable form. For example, they may each (separately) be packaged and sold as a block or bar.

The confectionery product may take any suitable form. In a preferred embodiment, the confectionery product is chocolate. The confectionery products are preferably bite-sized and generally weigh from 2 to 40 g, such as from 3 to 20 g. The confectionery products are typically packaged and sold in a box, generally comprising more than one confectionery product.

The confectionery product of the invention may comprise one or more food additives such as biscuit, nuts (whole or pieces), crispies, sponge, wafer or fruit, such as cherries, ginger and raisins or other dried fruit. These are typically embedded in the product. Optionally, the confectionery product is dusted with additives (as above) or flavourings such as cocoa powder and/or sugar.

The present invention provides a process for producing red or purple cocoa-derived material, comprising the steps of:
(i) treating cocoa nibs obtained from cocoa beans or seeds which have a higher polyphenol content than fermented cocoa beans with an acid to form red or purple nibs;
(ii) optionally expelling the nibs to form flakes and/or
(iii) optionally extruding the flakes and/or
(iv) optionally treating the flakes to produce red or purple cocoa powder The nibs may be dried such that the moisture or water content of the nibs is preferably less than 15 wt. %, such as less than 10 wt. %, preferably less than 5 wt. %, for example from 1 to 4 wt. %. The treated nibs are preferably dried by being extruded so as to reduce the moisture level and optionally microbial content. The temperature in the extruder may suitably be from 50 to 200° C., preferably from 70 to 150° C., such as from 90 to 130° C. The temperature within the extruder may also vary within these ranges. It has been found that such conditions can provide dried flakes which are coloured and have an acceptable microbial count and polyphenol content.

The treatment in step (i) may, for example, comprise soaking or immersion of the nibs and/or spraying of the nibs with an acid/acidic solution and/or washing the nibs with an acid/acidic solution. The nibs may be added to an acid/acidic solution or vice versa.

The red or purple cocoa nibs produced according to the above process preferably comprise at least 3 wt. %, preferably about 5 wt. % based on the total weight of the nibs of polyphenols which are naturally present in the untreated, unfermented parent cocoa seeds or cocoa beans obtained directly from the pod. The amount of polyphenols, as measured by the Folin-Ciocalteu method in epicatechin equivalent, may be from 0 to 15 wt. %, preferably from 2 to 10 wt. %. The amount of polyphenols remaining in the cocoa nibs may be varied by controlling the conditions of acidification and can be measured using routine techniques. The acidity can be measured using routine techniques, for example with a pH meter.

The cocoa nibs used in the process of the invention or obtainable by the process of the invention are not obtained from fermented cocoa beans, nor are they already red or purple.

The cocoa nibs or other cocoa-derived materials used in the process of present invention or obtainable by the process of the invention are not roasted or treated with alkali prior to acid treatment. Preferably, the cocoa nibs used to obtain red or purple cocoa nibs are untreated, other than by washing with water, drying, size reduction, or limited fermentation, prior to treatment with acid. In particular, the process of the present invention preferably does not comprise any step of alkalisation or roasting i.e., before and after acidification.

The cocoa nibs are obtained from cocoa beans or seeds that have a higher polyphenol content than a fermented cocoa bean. The fermented cocoa bean for comparison may be the parent cocoa bean or seed. The cocoa nibs which have the higher polyphenol content are preferably obtained from underfermented and/or unfermented cocoa beans. Unfermented and underfermented cocoa beans, and their nibs, have a higher polyphenol content than fermented beans, and their nibs, and can be distinguished from fermented beans as explained above.

In one embodiment, the invention provides a process for producing red or purple cocoa-derived material, comprising the steps of:
(i) treating cocoa-derived material obtained from beans or seeds which have a higher polyphenol content than fermented cocoa beans with an acid to form red or purple cocoa-derived material, optionally having a polyphenol content as described above; and
(ii) optionally drying the material.

The cocoa-derived material produced is preferably chocolate or chocolate-like product or a precursor thereof, and the treated material is preferably cocoa liquor or a composition comprising cocoa liquor, preferably unfermented or underfermented, optionally acidified directly in the conche which optionally comprises other components. The cocoa liquor may be Acticoa™ cocoa liquor. The term "conch" or "conche" preferably refers to a composition comprising cocoa liquor. The conch may also comprise other components such as those typically used for making chocolate. Preferably, the conch has been, is being or will be treated with acid or has been, is being or will be subjected to the process of conching.

In one embodiment of the invention, the conching process or process of or comprising conching is continuous or batch-wise, preferably continuous.

In a preferred embodiment of the invention, the cocoa liquor or conch is treated with acid during conching.

The amount of polyphenols in the treated cocoa-derived material may be as described above for cocoa nibs. The acid treatment may be the same as for cocoa nibs.

The term "cocoa-derived material" is defined above and includes cocoa nibs, refiner or expeller flakes, cocoa liquor, cocoa cake, cocoa powder and chocolate. Clearly, where refiner or expeller flakes, cocoa liquor and chocolate are produced, additional steps, other than those defined above will be involved in order to obtain the specific product.

In one embodiment of the process, the cocoa-derived material is refiner or expeller flakes and the process preferably further comprises the step of:
(iii) breaking the nibs to form flakes, preferably as defined above for obtaining refiner flakes or expeller flakes.

In another embodiment of the process, the cocoa-derived material is cocoa liquor and the process preferably further comprises the step of:
(iv) treating the nibs to form a cocoa liquor, preferably as defined above for obtaining cocoa liquor.

In one embodiment of the process, the cocoa-derived material is red or purple chocolate or chocolate-like material and the process preferably further comprises the steps of:
(iv) treating the nibs to form a cocoa liquor preferably as defined above for obtaining cocoa liquor; and
(v) combining the cocoa liquor with cocoa butter or a replacement fat to form a red or purple chocolate product or chocolate-like product.

Additionally the process for producing red or purple chocolate may comprise the steps of conching, tempering and molding.

As described above, in one embodiment the process of the present invention comprises acidification or treatment with an acid of a cocoa liquor, which has not previously been treated with an acid, preferably directly or when present in the conche. The cocoa liquor is preferably unfermented or underfermented. In one embodiment, the cocoa liquor is Acticoa™ cocoa liquor.

In a preferred embodiment, the cocoa liquor, or a composition comprising the cocoa liquor such as chocolate or chocolate-like product, is treated with acid, preferably after the step of refining, and preferably before, during or after the process of conching, such as during conching. The acid may be added at any stage of the conching process. The treatment with acid may be as defined in any of the embodiments herein. Preferably the acid is citric acid, optionally in the form of citric acid such as powder or crystals.

In one embodiment of the invention, the conching time is preferably from 1 to 5 hours, such as from 2 to 4 hours. The temperature of the conching may be carried out from 40 to 80° C., such as from 50 to 70° C. The acid, such as citric acid, may be added in an amount of from 0.1 to 2 wt. % based on the weight of the composition to be treated. The composition to be treated may comprise other components typically used to produce chocolate, in addition to cocoa liquor. Water may optionally be added in an amount of 0.1 to 5 wt. %, preferably 1 to 2 wt. % based on the weight of the composition.

The process may produce red or purple chocolate. The chocolate preferably produced according to the process, without defatting, preferably comprises an L* value of from about 20 to 25, a C* value of from about 10 to 20, such as from 12 to 18, an h° value of less than about 1, preferably from about 0.5 to 0.8, and optionally an a* to b* ratio of from 0.5 to 2.0, such as from 0.9 to 1.6.

The red or purple cocoa nibs preferably produced according to the process of the invention may comprise at least 20 mg/g of polyphenols, preferably more than 30 mg/g of polyphenols, most preferably from 40 to 60 mg/g of polyphenols, measured as the epicatechin equivalent.

The acid for use in treating the cocoa nibs, or other cocoa-derived material such as cocoa powder and cocoa liquor, may be any acid which has a suitable $pK_s$ to produce the red or purple cocoa nibs or other treated cocoa-derived material. The acid may be a mineral acid, such as, for example, hydrochloric acid, phosphoric acid or sulphuric acid, or may be an organic acid, such as, for example, one or more of citric acid, lactic acid, tartaric acid, ascorbic acid and acetic acid. In a preferred embodiment of the invention, the acid is a food-grade acceptable acid. Optionally, the acid may be added to the cocoa-derived material, such as cocoa nibs, cocoa powder or cocoa liquor in the form of a solid, such as, for example, a powder. A suitable example of a powder could be, for example, citric acid or tartaric acid.

The acid used in the process is preferably a mineral acid, more preferably a food-grade mineral acid, such as phosphoric acid.

In one embodiment of the invention, the acid comprises one or more of phosphoric acid, lactic acid, citric acid, ascorbic acid or acetic acid. Preferably, the acid is phosphoric acid.

Typically in the process of the invention, the acid is in the form of an acidic aqueous solution, obtained by combining the acid and water, for example, and this is used for treating the cocoa nibs. The acid/acidic solution preferably does not comprise an alcohol such as ethanol. The acid/acidic solution may preferably comprise from 0.5 wt. % to 20 wt. % acid, more preferably from 1 to 10 wt. %, most preferably from 2 to 5 wt. % acid based on the weight of the solution.

In a preferred embodiment of the invention, the cocoa nibs are soaked or treated in an acidic solution. The nibs are treated, preferably in an aqueous solution, preferably at a pH of less than 6, more preferably at a pH of from about 1 to 4, such as from 2 to 3. Not all of the nibs may be submerged in the solution, but substantially all is preferred (such as, for example, greater than 70 wt. %, 80 wt. % or 90 wt. %). The nibs may be treated with the acid/acidic solution under agitation, for example by a magnetic stirrer or rod.

In one embodiment of the invention, the cocoa nibs are obtained from cocoa beans or seeds, such as Lavados beans, which are substantially unfermented. The beans are preferably not roasted since this can reduce the colouring potential. The preferred pH range for the acid treatment is from 2 to 4 and the particularly preferred acid is citric acid. The treated nibs are preferably dried by being extruded so as to reduce the moisture level and microbial content. The temperature in the extruder may suitably be from 50 to 200° C., preferably from 70 to 150° C., such as from 90 to 130° C. It has been found that such conditions can provide dried flakes which are coloured, contain levels of polyphenols as defined herein and have an acceptable microbial count.

In one embodiment of the invention, the production of red cocoa-derived material (preferably comprising a C* value of greater than about 18) may be obtained using a pH of less than 4, such as from 2 to 3.5, more preferably from 2 to 3.

In another embodiment of the invention, the production of purple cocoa-derived material (preferably comprising a C* value of less than about 18) may be obtained using a pH of greater than 4, such as from 4.2 to 6.6, more preferably from 4.5 to 6.0, particularly from 4.5 to 5.6.

The amount of water, such as in the aqueous solution, is preferably from about 1 to 1000 wt. % based on the weight of the cocoa-derived material, such as cocoa nibs, cocoa powder or cocoa liquor, more preferably from about 25 to 500 wt. %, particularly from about 100 to 300 wt. %.

In one embodiment of the invention, the nibs or other cocoa-derived material are treated with the acid for a period of up to about 24 hours, preferably up to 12 hours. The nibs may be treated with the acid for a period of from about 2 to 8 hours, preferably from about 3 to 6 hours. A period of from about 4 to 5 hours is particularly preferred. The soaking time may, however, be a few minutes, for example at least 5 minutes. Other preferred reaction times are from 20 to 60 minutes.

Without wishing to be bound by theory, it is believed that the reaction between the acid and the polyphenols in the cocoa nibs produces the redness or purpleness. The reaction can be instantaneous, although leaving the reaction mixture for longer can produce changes in the colour of the nib, such that the red deepens eventually to russet/bordeaux.

The nibs are preferably treated at a temperature of less than or about 50° C., most preferably at a temperature of from 5 to 30° C.

In a preferred embodiment of the invention, the cocoa nibs or other cocoa-derived material are treated with an acidic aqueous solution, preferably having a pH of from 1 to 3, for a period of from about 3 to 6 hours at a temperature of from 5 to 30° C. It has been unexpectedly found that controlling the reaction conditions in this way produces red cocoa nibs from nibs obtained from unfermented or underfermented cocoa beans and can also operate so as to substantially preserve the level of polyphenols present in the cocoa nibs.

In another embodiment of the process, the drying of the red or purple nibs in (ii) is carried out at a temperature such that the level of polyphenols in the nibs is substantially conserved (for example, greater than 80 wt. %, such as greater than 90 wt. % remains). The drying is preferably carried out at an ambient air temperature of less than about 115° C., more preferably at a temperature of from 40 to 100° C., such as from 60 to 80° C. The drying may be carried out using an infra-red heater such as that available from Micronizing Company, UK., or using an extruder device for drying and reducing the microbial content.

Optionally, the nibs may be dried in a tornado drier, preferably at about 105° C. for about 5 minutes.

In a preferred embodiment of the invention, the cocoa nibs are not roasted. The term "roasted" will be understood by a person skilled in the art.

In an embodiment of the invention, the process is a non-enzymatic process, that is the process does not comprise the addition of an enzyme.

In a preferred embodiment of the invention, the treating of the nibs with an acid is carried out when the nibs are in an expeller press. The temperature of the nibs is preferably below 40° C. Expeller presses are well known for extracting oil from raw materials. Preferably, the process of the invention comprises treating the nibs with an acid, wherein the nibs are in an expeller press. The process may be a continuous or batch process. Preferably, it is a continuous process. The nibs are preferably red or purple.

The nibs may be treated with the acid, as defined herein, in any part of an expeller apparatus, such as before flakes are formed. For example, the nibs may be acidified in a heating zone, such as a mixing heater, before pressing and preferably before inserting into a worm press. The amount of acid, such as citric acid, is preferably from about 1 to 20 wt. %, more preferably from 1.5 to 10 wt. % based on the weight of the nibs. The amount of water is preferably from about 1 to 20 wt. % based on the weight of the nibs, more preferably from about 2 to 10 wt. %. In a preferred embodiment, the nibs are treated with a 1 to 10%, such as from 3 to 7%, solution of acid, such as citric acid, in water. The nibs may be reacted with the acid for up to 24 hours, more preferably from 1 to 12 hours, such as from 2 to 4 hours.

In a preferred embodiment of the invention, the acid is in an aqueous solution at a concentration of acid of 2 to 20%. The pH of the solution may be less than 5, such as less than 4 and preferably from 3 to 4, for red flakes (a C* value of greater than about 18) and above 4 for purple flakes (a C* value of less than about 18).

In one embodiment, the nibs, optionally treated with acid as described above, may be fed into a press such as a worm press. The heater/feeding screw flow is preferably from 30 to 200 kg nibs/h, more preferably from 40 to 110 kg nibs/h. Following pressing, the nibs can be separated into expeller flakes and cocoa butter. The pressure in the expeller may be from 0 to 100 bar, more preferably from about 20 to 80 bar, such as about 75 bar. The temperature in the press is preferably below the melting range for flakes and is preferably less than or about 40° C. The speed of the press is preferably from 10 to 100 kg flakes/h, more preferably from 20 to 80 kg flakes/h.

The expeller flakes, optionally red or purple, may have a fat content of less than 20 wt. %, preferably less than 18 wt. %, such as less than 10 wt %. The moisture content of the expeller flake may be less than 15 wt. %, such as less than 11 wt. %, for example, from 5 to 11 wt. %.

The cocoa butter obtained may be further processed, for example by filtration and/or cetrifugation and/or sedimentation.

In another aspect, the invention relates to the coloured, preferably red or purple, flakes produced according to the process. In a preferred embodiment, the flakes have preferably been extruded and optionally sterilized. By "sterilized" we mean that the microbial content of the flakes after extrusion is less than the microbial content before extrusion. The microbial content may be reduced by greater than 90%, such as greater than 95%, for example, up to 99.99% following extrusion. The moisture content of the flakes may also be reduced by greater than 90%, such as greater than 95%, for example, up to 99.99% following extrusion.

The flakes obtained according to the invention, preferably from an expeller, may also be further processed. Thus, the flakes are preferably subjected to nibbling and/or extruding such as defined above. The extruded flakes may then be formed into red or purple cocoa powder by, for example, milling to form the powder and optionally sieving. The powder may be packaged and/or palettized to form packed red or purple cocoa powder.

In one embodiment, the flow in the extruder is from 100 to 300 kg flakes, optionally nibbled/h more preferably from 150 to 250 kg/h. The extruder may contain 10 to 20%, such as 15%, water. The temperature may vary within the extruder. Thus, in an initial stage the temperature may be lower, such as less than 100° C. than one or more later stages, which may be greater than 100° C. i.e. the temperature may be ramped.

The drying of the nibs as described in any of the above embodiments of the invention is preferably carried out for a period of at least 2 hours, more preferably for at least 4 hours, most preferably for a period of about 12 hours. In the case of extrusion, drying may only be required for a few minutes, for example, from 5 to 20 minutes.

Preferably, the cocoa nibs used in the process of the invention are obtained from washed unfermented cocoa seeds, such as those processed in Brazil and known as "lavados" beans.

The process of the invention, as described in any of the above embodiments, may further comprising predrying and/or heating of cocoa beans or seeds, prior to acid treatment, to produce the cocoa nibs. In particular, the conditions of the predrying and/or heating are preferably controlled in order to avoid damaging the natural polyphenols. The heating and/or predrying may assist in winnowing i.e., removing the shells from the cocoa beans.

In one embodiment of the invention, an additional step is carried out which comprises reducing the size of the cocoa nibs by mechanical means before treatment with the acid or acidic solution. For example, the nibs may be ground using a three roll refiner in order to expedite reaction and/or drying of the nibs following reaction. The temperature of the cooling jacket of the refiner is preferably set to 10 to 20° C.

The listing or discussion of an apparently prior-published document in this specification should not necessarily be taken as an acknowledgement that the document is part of the state of the art or is common general knowledge.

The following non-limiting examples illustrate the invention and do not limit its scope in any way. In the examples and throughout this specification, all percentages, parts and ratios are by weight unless indicated otherwise. It will be appreciated that the various percentage amounts of the different components that are present in the products of the invention, including any optional components, will add up to 100%.

EXAMPLES

Example 1

Unfermented cocoa seeds from Brazil were washed after depodding and dried. The depodded beans were then treated by predrying/heating (the conditions were such as to avoid damage of the natural pool of polyphenols in the beans) to ease removal of the shells.

After winnowing, 100 g nibs were soaked in a 3 wt. % phosphoric acid solution in water (200 g of water and 6 ml of phosphoric acid). No ethanol was used in the solution.

The nibs were soaked in the acidic solution for a period of up to 24 hours at ambient temperature. The colour of the nibs changed with the degree of soaking. Up to 24 hours the nibs have a reddish colour, comparable to raspberry red. If the reaction is allowed to continue, then the colour can become bordeaux/russet/red claret.

The nibs were then separated from the soaking solution by sieving and dried in a heating cabinet at a temperature of 100 to 110° C. for several hours. During the drying step, the colour of the nibs changed from reddish to russet.

The nibs were then broken up on a three roll refiner (to avoid heating as in a pin mill). The end result was refiner flakes, not a liquor. The refiner flakes can be used to make chocolate, as set out below.

Example 2

The refiner flakes produced according to Example 1 were melted gently at 45° C. to obtain a more or less liquid paste i.e., red cocoa liquor.

The cocoa liquor was mixed with sugar in a 50:50 weight ratio. This mixture was refined and liquefied by the addition of cocoa butter in order to increase the total fat content to 35% and produce red chocolate.

Natural vanilla was then added to the chocolate in order to mask the bitter taste.

The result of the taste test was: very fruity and pleasant.

Example 3

Determination of Total Polyphenols in a Chocolate or Cocoa Sample in Epicatechin Equivalent The Folin-Ciocalteu reagent is a mixture of phosphotungstic acid ($H_3PW_{13}O_{40}$) and phosphomolybdic acid ($H_3Pmo_{12}O_{40}$). Polyphenols are reduced by oxido-reduction to give a mix of blue oxides of tungsten ($W_8O_{23}$) and molybdenum ($MoO_{23}$). The intensity of the coloration is measured at 760 nm.

Equipment
Flask of 50 mL
Centrifugation tubes
pyrex Tubes Ø 18 mm
automatic Pipettes of 1000 and 5000 μL
Beakers of 50 and 100 mL
1 water bath (50° C.)
1 spectrophotometer (760 nm)
Sieve 200 μm
Reagents
Folin-Ciocalteu (diluted to $10^{-1}$)
sodium carbonate solution at 75 g/L
epicatechin (sigma reference: E-1753)
Protocol 5 grams of chocolate or cocoa sample are weighed. The fat is extracted with petroleum ether by centrifugation. The defatted part is sieved with a 200 μm sieve. 50 mg of the defatted extract is placed in a 50 ml flask and diluted with distilled water to provide solution A. The extract is dissolved using ultrasonic energy for 2 minutes.

0.5 ml of solution A is placed in a pyrex tube and 4.5 ml of distilled water added to provide solution B. 0.5 ml of solution B is placed in a pyrex tube and 2.5 ml of the Folin-Ciocalteu solution are added to provide solution C. After 3 minutes, 2 ml of sodium carbonate solution is added to solution C to provide solution D. Solution D is then heated in a water bath at 50° C. for 5 minutes. After 5 minutes, the tube is placed in an ice bath to stop the reaction. The absorbance of the solution is measured at 760 nm.

Results

| Polyphenol Concentration, P, (in mol/L) | Epicatechin content, Q, (in mg) | Polyphenols content, PT, in epicatechin equivalent (in %) |
| --- | --- | --- |
| P = UVabs/38741.8* | Q = P/6,897.10$^{-7}$** | PT = Q * (100 − MG)/m |

*Standard line (see the method of standardisation below)
**epicatechin equivalence coefficient
MG: Fat content in the sample (%)
m: Weight of the sample dried and defatted (≈50 mg)

Method Standardisation

The standards used for the Folin-Ciocalteu method are: Solution at 100 mg/L and 5 daughter solutions at 0, 5, 10, 15 and 20 mg/L.

An example is in the following table:

| | Mother solution of epicatechin 102.8 mg/L (concentration correct after weighing) | | | | |
| --- | --- | --- | --- | --- | --- |
| Volume of mother solution in mL | 0 | 0.5 | 1 | 1.5 | 2 |
| Volume of water in mL | 10 | 9.5 | 9 | 8.5 | 8 |
| [epicatechin] in mol/L | 0 | 1.77E−06 | 3.55E−06 | 5.32E−06 | 7.09E−06 |
| % in polyphenols | 0 | 10.28 | 20.56 | 30.84 | 41.12 |
| M$_{epicatechin}$ | 25.7 | Mg | | | |
| PM$_{epicatechin}$ | 290 | g/mol | | | |

The first dilution described in the protocol for this standard line is not used.

The polyphenol content of cocoa-derived material produced according to the process of the invention is provided in Table 1.

TABLE 1

| PRODUCT | REACTION TIME in hours | Polyphenol content % of defatterd cocoa liquor | Polyphenol content % of cocoa liquor | % Fat |
|---|---|---|---|---|
| MA | RC Mixer + tornado | 11.2 | 4.91 | 56.17 |
| MA | RC 15 minutes | 10.6 | 5.07 | 52.14 |
| MA | RC 30 minutes | 11.86 | 5.42 | 54.3 |
| MA | RC 1 hour | 9.06 | 4.71 | 47.97 |
| MA | RC 2 hours | 10 | 4.88 | 51.14 |
| MA | RC 3 hours | 9.65 | 5.04 | 47.76 |
| MA | RC 4 hours | 12.42 | 5.6 | 54.91 |
| MA | RC 5 hours | 12.31 | 5.4 | 56.13 |
| MA | RC 6 hours | 10.36 | 5.47 | 47.21 |
| MA | RC 7 hours | 10.05 | 5.45 | 45.75 |
| MA | RC 24 hours | 10.57 | 5.03 | 52.37 |

Example 4

HPLC Measurement of Polyphenol Content

The majority of the polyphenols contained in cocoa beans are from the flavonoid family: C6-C3-C6. The monomers that are commonly present include (−)-epicatechin and (+)-catechin.

The polyphenols contained in cocoa seeds include:
37% Flavan-3-ols (Epicatechins-Catechins)
4% Anthocyanes
58% Proanthocyanidins (or Procyanidins) or flavanol oligomers The cocoa seed is a reservoir of epicatechin (it constitutes about 35% of the total polyphenol content).

Principle

Epicatechin, catechin and the Procyanidins B1, B2, B3 can be analysed by HPLC using a fluorescence detector.

Before the HPLC analysis, epicatechin, catechin and the procyanidins are extracted from the cocoa with a solution of acidified water/actonitrile.

Materials
Ultrasonic bath
HPLC machine
Fluorescence detector
Column: Kromasil C18, 5 μm, 250×4.6 mm
Disposable syringe 2 ml
Filter syringe RC (regenerated Cellulose), 0.45 μm, diameter 25 mm
25 and 50 ml flasks
Vials 2 ml
Sieve 200 μm
Reagents
Acetonitrile HPLC grade
Water HPLC grade
Glacial acetic acid
Standard of Epicatechin: Sigma reference E1753-1G
Standard of Catechin: Sigma reference C0567
Standard of Procyanidin B1: Sigma reference 19542, 1 mg
Standard of Procyanidin B2: Sigma reference 42157, 1 mg
Standard of Procyanidin B3: Sigma reference P1066-1VL, 1 mg
Method
Preparation of Solvent for Extraction 90% water HPLC grade was acidified to pH=2.5 (2% glacial acetic acid) and combined with 10% acetonitrile HPLC grade.

Preparation of Sample

About 5 g of fatty product was weighed. The fatty material in the product was extracted by adding hexane (to determine MG: the percentage of fatty material in the sample) to the cocoa followed by centrifugation and dephasing. The defatted extract was then sieved. 200 mg of the sieved extract was weighed into a 50 ml flask.

The extract was dissolved in the extraction solvent in the ultrasonic bath for about 10 minutes and the extraction solvent used to make up the volume. The solution was filtered with a 0.45 μm filter syringe and placed in a vial.

Preparation of Standards

Weigh into a 25 ml flask, 5 to 6 mg of epicatechin, 2 to 3 mg of catechin, 1.5 to 2 mg of Procyanidin B1, 2 mg of Procyanidin B2 and 1 mg of Procyanidin B3. Dissolve in the ultrasonic bath for several minutes using the extraction solvent to dissolve and make up the volume. Carry out a dilution to $10^{-1}$. Filter with a 0.45 μm filter syringe and put in a vial.

Chromatography Conditions

Column: Kromasil C18; 5 μm; 250×4.6 mm
Detection: by Fluorescence: Excitation=274 nm; Emission=322 nm
Mobile phase:
  A: HPLC grade water acidified to a pH of 2.5
  B: Acetonitrile HPLC grade
Delivery of mobile phase: 1 mL/min.
loop injection 10 μl
Gradient:

| Time | A | B |
|---|---|---|
| 0 minute | 90% | 10% |
| 25 minutes | 90% | 10% |

Expression of Results
Example in the Case of Epicatechin:
Aet is the area of the epicatechin standard
Aech is the area of the epicatechin sample
A is the concentration of epicatechin in the standard in mg/l
B is the concentration of epicatechin in the sample in mg/l
m is the weight of the defatted sieved extract
MG is the percentage of the fatty material in the product
Interpretation of Results $$B=(A*Aech)/Aet \text{ in mg/l}$$

Concentration of epicatechin in the extract in mg/g:
$$E=B/(m/1000)$$

In the case of a fatty product (cocoa-derived material):

Concentration of epicatechin in the product in mg/g:
$$E*[(100-MG)/100]$$

Example 5

Colour Measurement for Cocoa-Derived Material

A cocoa liquor obtained according to the invention, as indicated below, comprising polyphenols was defatted with petroleum-ether followed by three washing steps and centrifugation. After drying at room temperature, each powder sample was placed in a petri dish and measured four times through the bottom of the dish using a colorimeter with the well-known Hunter L*, a*, b* scale. The colorimeter used was the Minolta CM-2002 spectrophotometer. The conditions for colour measurement were: CIELAB III: D65, Obs: 10°, 3 flashes, mode: SCE and external colour at 20° C.

The progress of a process carried out according to the invention is shown in Table 2 in terms of colour parameters and polyphenol content for a fully defatted cocoa liquor in the form of a powder, as measured according to the above method. The reaction was carried out using a mixer to acidify the nibs and was carried out on lab scale (½ kgs) except for the process mixer (pilot plant, 15 kgs).

TABLE 2

| Time of reaction in hours | L* | a* | b* | a*/b* | C* | h° | % of polyphenols in the defatted cocoa liquor |
|---|---|---|---|---|---|---|---|
| 0.25 | 47.18 | 19.92 | 10.78 | 1.85 | 22.65 | 28.42 | 10.60 |
| 0.5 | 47.1 | 21.44 | 9.98 | 2.15 | 23.65 | 24.96 | 11.86 |
| 1 | 47.75 | 19.92 | 12.34 | 1.61 | 23.43 | 31.78 | 9.06 |
| 2 | 45.28 | 22.08 | 12.9 | 1.71 | 25.57 | 30.29 | 10.00 |
| 3 | 44.08 | 25.83 | 11.55 | 2.24 | 28.29 | 24.08 | 9.65 |
| 4 | 41.72 | 31.11 | 10.1 | 3.08 | 32.71 | 17.98 | 12.42 |
| 5 | 42.61 | 31.08 | 10.44 | 2.98 | 32.78 | 18.57 | 12.31 |
| 6 | 44.42 | 27.46 | 12.05 | 2.28 | 29.99 | 23.69 | 10.36 |
| 7 | 40.54 | 29.43 | 11.87 | 2.48 | 31.73 | 21.96 | 10.05 |
| 24 | 43.12 | 28.24 | 12.03 | 2.35 | 30.7 | 23.07 | 10.57 |
| Process Mixer (pilot/15 kgs) | 44.61 | 21.77 | 10.62 | 2.05 | 24.22 | 26 | 11.20 |

For comparison, the progress of a process carried out according to the invention is shown in Table 3 in terms of colour parameters for a cocoa liquor melted and liquid.

TABLE 3

| Time of reaction in hours | L* | a* | b* | C* | h° | pH |
|---|---|---|---|---|---|---|
| 0.25 | 15.37 | | | 20.94 | 22.75 | 3.98 |
| 0.5 | 16.51 | | | 21.22 | 20.63 | |
| 1 | 14.28 | | | 22.47 | 27.31 | |
| 2 | 15.64 | | | 21.23 | 23.43 | |
| 3 | 16.1 | | | 22.14 | 18.51 | |
| 4 | 13.99 | | | 28.49 | 21.33 | |
| 5 | 13.69 | | | 26.27 | 19.58 | 2.93 |
| 6 | 11.75 | | | 26.67 | 25.23 | |
| 7 | 12.54 | | | 24.22 | 23.27 | |
| 24 | 11.72 | | | 20.96 | 21.12 | 2.66 |
| Process Mixer (pilot/15 kgs) | 15.62 | | | 17.02 | 17.37 | 3.69 |

Example 6

Yoghurt

A coloured yoghurt product was made by adding 1 wt. %, based on the total weight of the yoghurt, of the cocoa powder obtained from nibs soaked for 4 hours under the conditions described in Example 1 to a commercially available natural yoghurt (i.e., which is uncoloured).

Figure 6:
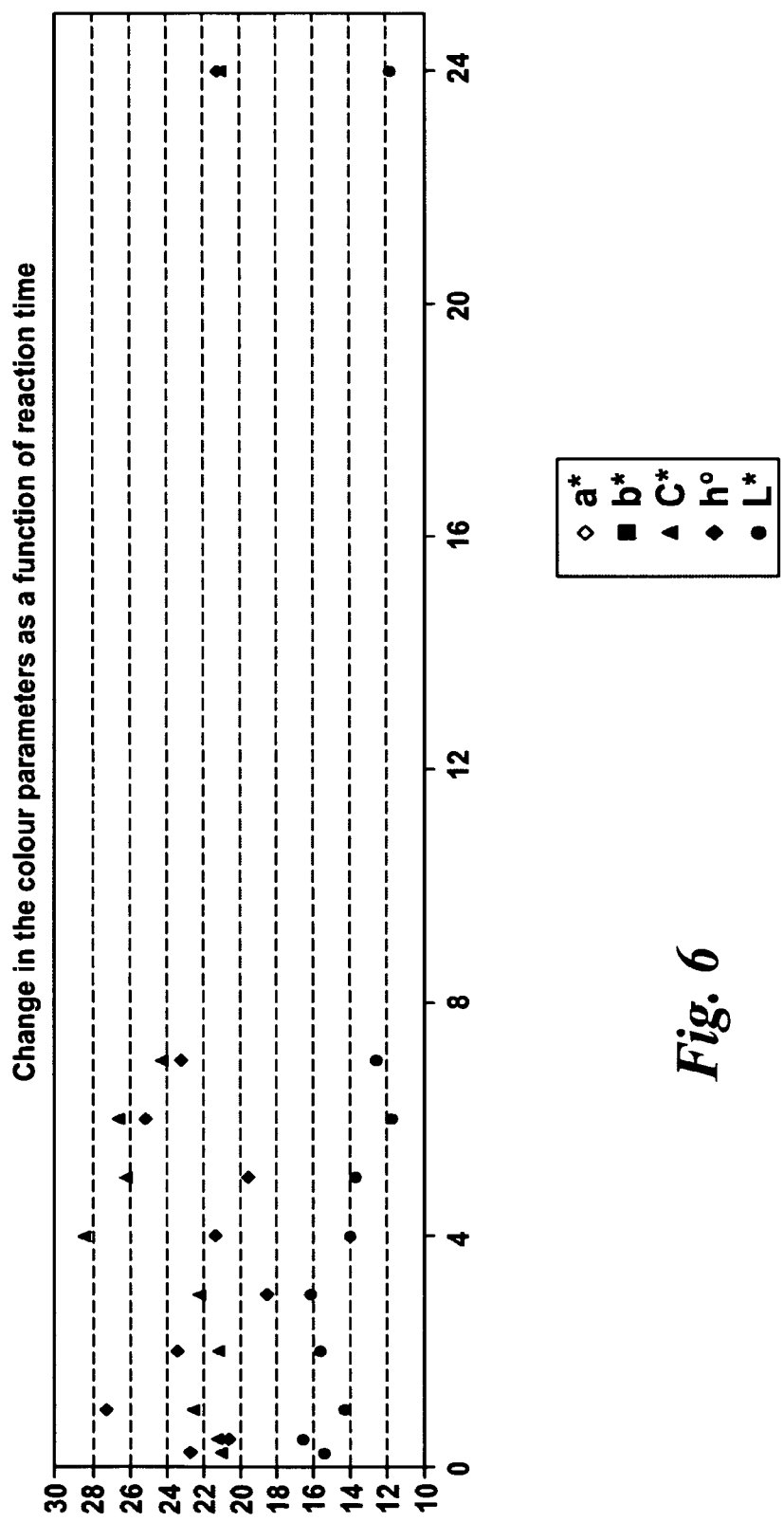
FIG. 6 shows the variation in colour parameters and polyphenol content with the length of time of the process according to the present invention, for a cocoa liquor.

The result of adding the red cocoa powder to the yoghurt was to provide the yoghurt with a pleasing red hue (see FIG. 6).

Example 7

Cooked Candies

A red cooked candy can be produced from:
50.00 g of isomalt
1.72 g of cocoa powder which has been acidified using 8.66% of ortho-phosphoric acid
5.00 g of a solution of ethanol-water (70-30%).
1.13 g citric acid.

The citric acid was dissolved in the mixture of ethanol and water. In order to limit loss of the product it was preferred to weigh the mixture of ethanol and water in a beaker containing citric acid. The acidified cocoa powder was then dissolved in the mixture of citric acid, ethanol and water to form a homogeneous solution with stirring (Mixture 1).

It may be necessary to combine a mixture of acidified cocoa powder, alcohol and water (Mixture 2) with the isomaltol (as produced below) within 30 seconds in order to prevent oxidation and change in colour.

The isomaltol was heated in a pan at thermostat 2 for 1 minute 30 seconds, thermostat 3 for 3 minutes and thermostat 4 for 4 minutes. The isomalt was completely melted and colourless at this stage. This was followed by further heating at thermostat 1 for about 6 minutes. The isomalt was approaching crystallization. At this moment Mixture 1 was added to prevent evaporation of the alcohol and spraying of the powder around the vessel.

After Mixture 1 was added to the heated isomalt, heating was continued at thermostat 2 for a further 50 seconds.

Mixture 1 was stirred with the heated isomalt to form a homogeneous mixture.

Aroma was then added—40 drops of aroma with a pasteur pipette. The mixture containing the aroma was heated at thermostat 3 for a further 1 minute to make the mixture as homogenous as possible.

Figure 8:
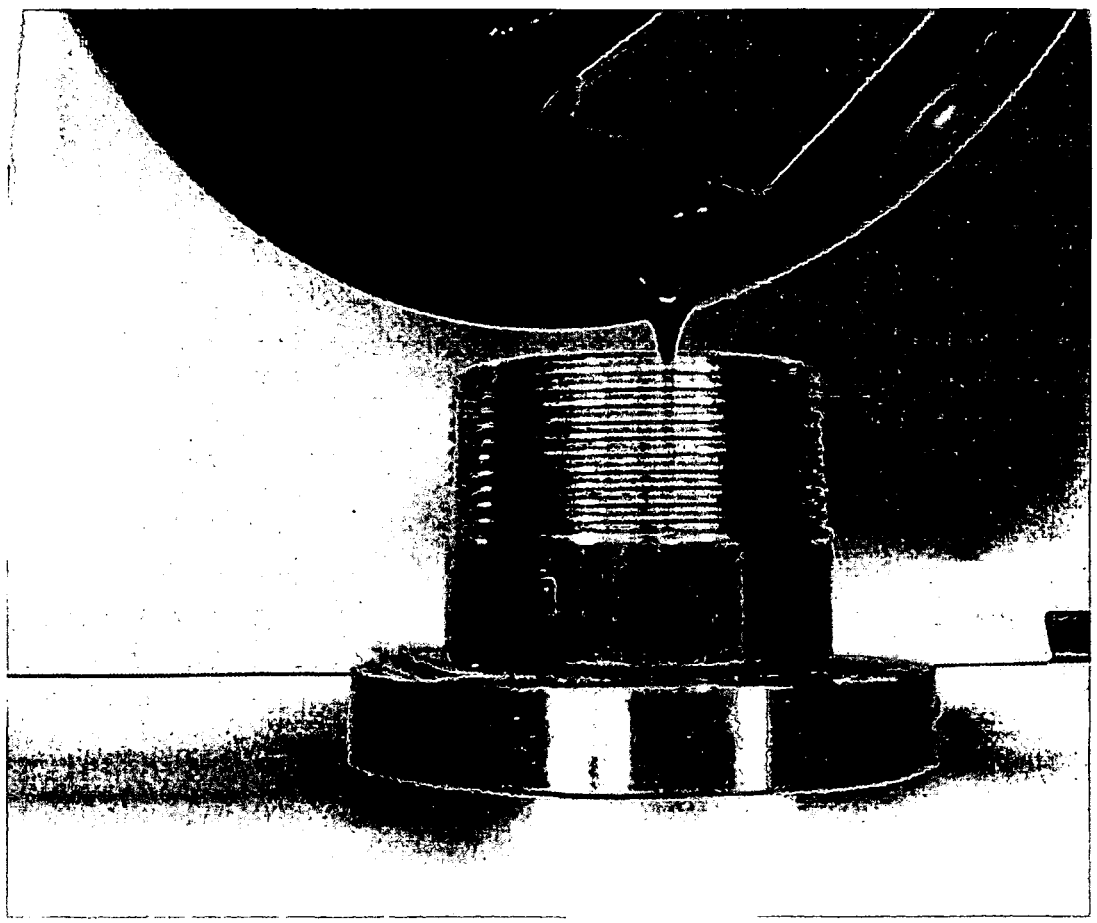
FIG. 8 shows a suitable mold for a cooked candy according to the invention.
Figure 9:
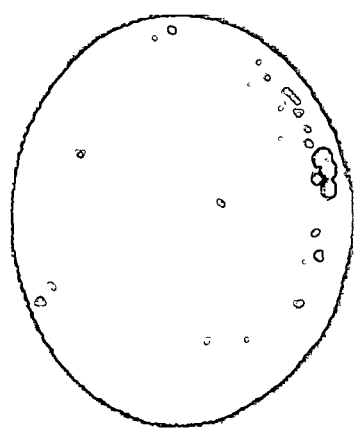
FIG. 9 shows a cooked candy disk for colorimetric analysis.

The mixture was then placed into a suitable mold. To obtain precise colour measurements using spectrocolorimetry, it is preferred to use a mold which produces disc-like products (see FIGS. 8 and 9).

Figure 10:
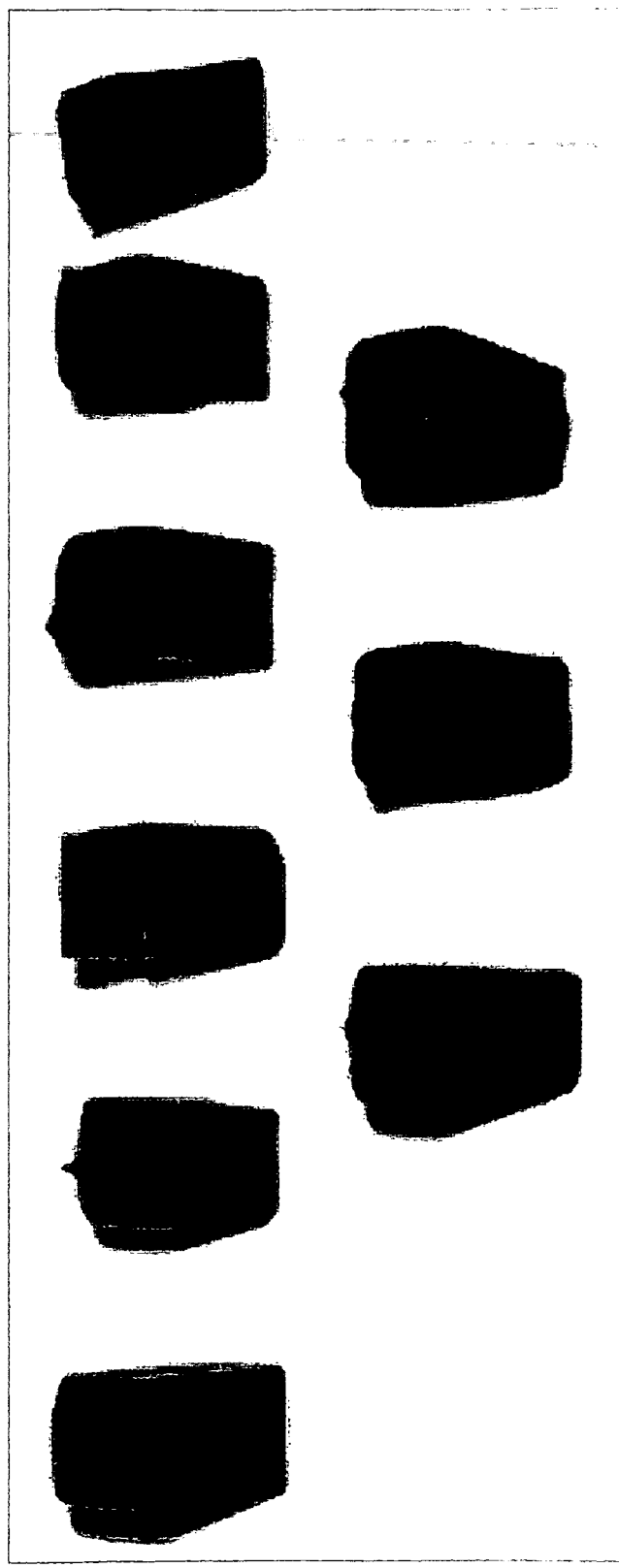
FIG. 10 shows cooked candies made with acidified cocoa powder (bottom three candies) and non-acidified cocoa powder (top six candies). The colours of the candies made with acidified cocoa powder are varying shades of red. The colours of the candies made with non-acidified cocoa powder are black to brown in appearance.

FIG. 10 shows the different colours for candies that it is possible to obtain using different cocoa powders. The following powders were used to produce the cooked candies in FIG. 10, according to the method set out above.
Powder Black Pearl (1)
Powder PZ 044 (2)
Powder DRT (sic) (3)
Powder N 102 C(SACO) (4)
Powder of Madagascar (5)
Powder of Java (6)
Powder acidified type Roland-Garros (7)
Powder acidified type rose bonbon (8)
Powder acidified type rose (9)

Example 8

"Red" cocoa powder was produced according to Example 1 using the following conditions. These conditions were particularly preferred for producing "red" powder.
5% acid phosphoric
200% water
soaking 4 hours
drying 24 h at 60° C.

All trials were carried out in small box (50×60×40) with 2 kilograms of lavados cocoa nibs.

Example 9

Effect of Reaction Parameters on Colour Parameters and Polyphenol Content

A: Matrix of the Trials

The 4 parameters studied were coded in 2 values (+1 for the high value, −1 for the low value)

| | | | |
|---|---|---|---|
| A = Concentration of Phosphoric Acid | +1 = 10% | −1 = 1% | 0 = 5.5% |
| B = % H$_2$O | +1 = 200% | −1 = 25% | 0 = 112.5% |
| C = Reaction time (min) | +1 = 300 | −1 = 20 | 0 = 160 |
| D = Temperature ° C. | +1 = 50° C. | −1 = 20° C. | 0 = 35° C. |

0 is the middle value to verify the repeatability of this process

The drying step was exactly the same for all trials and centre points (19 h in air oven)

Matrix of Trials

|  | 1 A | 2 B | 3 C | 4 D | 5 A,B | 6 A,C | 7 A,D | 8 B,C | 9 B,D | 10 C,D | 11 A,B,C | 12 A,B,D | 13 B,C,D | 14 A,C,D | 15 A,B,C,D |
|---|---|---|---|---|---|---|---|---|---|---|---|---|---|---|---|
| Trial n°1 | −1 | −1 | −1 | −1 | 1 | 1 | 1 | 1 | 1 | 1 | −1 | −1 | −1 | −1 | 1 |
| Trial n°2 | +1 | −1 | −1 | −1 | −1 | −1 | −1 | 1 | 1 | 1 | 1 | 1 | −1 | 1 | −1 |
| Trial n°3 | −1 | +1 | −1 | −1 | −1 | 1 | 1 | −1 | −1 | 1 | 1 | 1 | 1 | −1 | −1 |
| Trial n°4 | +1 | +1 | −1 | −1 | 1 | −1 | −1 | −1 | −1 | 1 | −1 | −1 | 1 | 1 | 1 |
| Trial n°5 | −1 | −1 | +1 | −1 | 1 | −1 | 1 | −1 | 1 | −1 | 1 | −1 | 1 | 1 | −1 |
| Trial n°6 | +1 | −1 | +1 | −1 | −1 | 1 | −1 | −1 | 1 | −1 | −1 | 1 | 1 | −1 | 1 |
| Trial n°7 | −1 | +1 | +1 | −1 | −1 | −1 | 1 | 1 | −1 | −1 | −1 | 1 | −1 | 1 | 1 |
| Trial n°8 | +1 | +1 | +1 | −1 | 1 | 1 | −1 | 1 | −1 | −1 | 1 | −1 | −1 | −1 | −1 |
| Trial n°9 | −1 | −1 | −1 | +1 | 1 | 1 | −1 | 1 | −1 | −1 | −1 | 1 | 1 | 1 | −1 |
| Trial n°10 | +1 | −1 | −1 | +1 | −1 | −1 | 1 | 1 | −1 | −1 | 1 | −1 | 1 | −1 | 1 |
| Trial n°11 | −1 | +1 | −1 | +1 | −1 | 1 | −1 | −1 | 1 | −1 | 1 | −1 | −1 | 1 | 1 |
| Trial n°12 | +1 | +1 | −1 | +1 | 1 | −1 | 1 | −1 | 1 | −1 | −1 | 1 | −1 | −1 | −1 |
| Trial n°13 | −1 | −1 | +1 | +1 | 1 | −1 | −1 | −1 | −1 | 1 | 1 | 1 | −1 | −1 | 1 |
| Trial n°14 | +1 | −1 | +1 | +1 | −1 | 1 | 1 | −1 | −1 | 1 | −1 | −1 | −1 | 1 | −1 |
| Trial n°15 | −1 | +1 | +1 | +1 | −1 | −1 | −1 | 1 | 1 | 1 | −1 | −1 | 1 | −1 | −1 |
| Trial n°16 | +1 | +1 | +1 | +1 | 1 | 1 | 1 | 1 | 1 | 1 | 1 | 1 | 1 | 1 | 1 |
| Center 1 | 0 | 0 | 0 | 0 | 0 | 0 | 0 | 0 | 0 | 0 | 0 | 0 | 0 | 0 | 0 |
| Center 2 | 0 | 0 | 0 | 0 | 0 | 0 | 0 | 0 | 0 | 0 | 0 | 0 | 0 | 0 | 0 |
| Center 3 | 0 | 0 | 0 | 0 | 0 | 0 | 0 | 0 | 0 | 0 | 0 | 0 | 0 | 0 | 0 |
| Center 4 | 0 | 0 | 0 | 0 | 0 | 0 | 0 | 0 | 0 | 0 | 0 | 0 | 0 | 0 | 0 |

B: Calculation of the Effects (=H)

1—Example

| Number of Trials | Factor 1 (Coded value) | Factor 2 (coded value) | Results of the measurement |
|---|---|---|---|
| 1 | −1 | −1 | A |
| 2 | +1 | −1 | B |
| 3 | −1 | +1 | C |
| 4 | +1 | +1 | D |
| 5 | 0 | 0 | E |
| 6 | 0 | 0 | F |
| 7 | 0 | 0 | G |

$H$ (factor 1)=1/4(−A+B−C+D)

$H$ (factor 2)=1/4(−A−B+C+D)

With these centre points (trials with the middle values), we calculate the standard deviation ($\sigma$) □□ of this experiment. So we are able to calculate the confidence interval (CI). (CI is the interval, in which the value of the effect will be with a probability of 95%)

$$H - \frac{t*\sigma}{n^{1/2}} < H < H + \frac{t*\sigma}{n^{1/2}}$$

n=number of trials (center point not included)
t=value for a risk of 5% and the degree of freedom is N−1, where N is the number of centre trials (see Table below)

|  | 0.50 | 0.20 | 0.10 | 0.05 | 0.02 | 0.01 | 0.005 | 0.002 | 0.001 | 0.0001 |
|---|---|---|---|---|---|---|---|---|---|---|
| 1 | 1.000 | 3.078 | 6.314 | 12.706 | 31.281 | 63.657 | 127.32 | 318.31 | 636.62 | 6366.2 |
| 2 | 0.816 | 1.886 | 2.920 | 4.303 | 6.965 | 9.925 | 14.089 | 22.327 | 34.599 | 99.992 |
| 3 | 0.765 | 1.638 | 2.353 | 3.182 | 4.541 | 5.841 | 7.453 | 10.215 | 12.924 | 28.000 |
| 4 | 0.741 | 1.533 | 2.132 | 2.776 | 3.747 | 4.604 | 5.598 | 7.173 | 8.610 | 15.544 |
| 5 | 0.727 | 1.476 | 2.015 | 2.571 | 3.365 | 4.032 | 4.773 | 5.893 | 6.869 | 11.178 |
| 6 | 0.718 | 1.440 | 1.943 | 2.447 | 3.143 | 3.707 | 4.317 | 5.208 | 5.959 | 9.082 |
| 7 | 0.711 | 1.415 | 1.895 | 2.365 | 2.998 | 3.499 | 4.029 | 4.785 | 5.408 | 7.885 |
| 8 | 0.706 | 1.397 | 1.860 | 2.306 | 2.896 | 3.355 | 3.833 | 4.501 | 5.041 | 7.120 |
| 9 | 0.703 | 1.383 | 1.833 | 2.262 | 2.821 | 3.250 | 3.690 | 4.297 | 4.781 | 6.594 |
| 10 | 0.700 | 1.372 | 1.812 | 2.228 | 2.764 | 3.169 | 3.581 | 4.144 | 4.587 | 6.211 |
| 11 | 0.697 | 1.363 | 1.796 | 2.201 | 2.718 | 3.106 | 3.497 | 4.025 | 4.437 | 5.921 |
| 12 | 0.695 | 1.356 | 1.782 | 2.179 | 2.681 | 3.055 | 3.428 | 3.930 | 4.318 | 5.694 |
| 13 | 0.694 | 1.350 | 1.771 | 2.160 | 2.650 | 3.012 | 3.372 | 3.852 | 4.221 | 5.513 |
| 14 | 0.692 | 1.345 | 1.761 | 2.145 | 2.624 | 2.977 | 3.326 | 3.787 | 4.140 | 5.363 |
| 15 | 0.691 | 1.341 | 1.753 | 2.131 | 2.602 | 2.947 | 3.286 | 3.733 | 4.073 | 5.239 |
| 16 | 0.690 | 1.337 | 1.746 | 2.120 | 2.583 | 2.921 | 3.252 | 3.686 | 4.015 | 5.134 |
| 17 | 0.689 | 1.333 | 1.740 | 2.110 | 2.567 | 2.898 | 3.222 | 3.646 | 3.965 | 5.044 |
| 18 | 0.688 | 1.330 | 1.734 | 2.101 | 2.552 | 2.878 | 3.197 | 3.610 | 3.922 | 4.966 |
| 19 | 0.688 | 1.328 | 1.729 | 2.093 | 2.539 | 2.861 | 3.174 | 3.579 | 3.883 | 4.897 |
| 20 | 0.687 | 1.325 | 1.725 | 2.086 | 2.528 | 2.845 | 3.153 | 3.552 | 3.850 | 4.837 |
| 21 | 0.686 | 1.323 | 1.721 | 2.080 | 2.518 | 2.831 | 3.135 | 3.527 | 3.819 | 4.784 |
| 22 | 0.686 | 1.321 | 1.717 | 2.074 | 2.508 | 2.819 | 3.119 | 3.505 | 3.792 | 4.736 |
| 23 | 0.685 | 1.319 | 1.714 | 2.069 | 2.500 | 2.807 | 3.104 | 3.485 | 3.768 | 4.693 |
| 24 | 0.685 | 1.318 | 1.711 | 2.064 | 2.492 | 2.797 | 3.091 | 3.467 | 3.745 | 4.654 |
| 25 | 0.684 | 1.316 | 1.708 | 2.060 | 2.485 | 2.787 | 3.078 | 3.450 | 3.725 | 4.619 |
| 30 | 0.683 | 1.310 | 1.697 | 2.042 | 2.457 | 2.750 | 3.030 | 3.385 | 3.646 | 4.482 |
| 35 | 0.682 | 1.306 | 1.690 | 2.030 | 2.438 | 2.724 | 2.996 | 3.340 | 3.591 | 4.389 |
| 40 | 0.681 | 1.303 | 1.684 | 2.021 | 2.423 | 2.704 | 2.971 | 3.307 | 3.551 | 4.321 |
| 45 | 0.680 | 1.301 | 1.679 | 2.014 | 2.412 | 2.690 | 2.952 | 3.281 | 3.520 | 4.269 |

|  | 0.50 | 0.20 | 0.10 | 0.05 | 0.02 | 0.01 | 0.005 | 0.002 | 0.001 | 0.0001 |
|---|---|---|---|---|---|---|---|---|---|---|
| 50 | 0.679 | 1.299 | 1.676 | 2.009 | 2.403 | 2.678 | 2.937 | 3.261 | 3.496 | 4.228 |
| 60 | 0.679 | 1.296 | 1.671 | 2.000 | 2.390 | 2.660 | 2.915 | 3.232 | 3.460 | 4.169 |
| 70 | 0.678 | 1.294 | 1.667 | 1.994 | 2.381 | 2.648 | 2.899 | 3.211 | 3.435 | 4.127 |
| 80 | 0.678 | 1.292 | 1.664 | 1.990 | 2.374 | 2.639 | 2.887 | 3.195 | 3.416 | 4.096 |
| 90 | 0.677 | 1.291 | 1.662 | 1.987 | 2.368 | 2.632 | 2.878 | 3.183 | 3.402 | 4.072 |
| 100 | 0.677 | 1.290 | 1.660 | 1.984 | 2.364 | 2.626 | 2.871 | 3.174 | 3.390 | 4.053 |
| 150 | 0.676 | 1.287 | 1.655 | 1.976 | 2.351 | 2.609 | 2.849 | 3.145 | 3.357 | 3.998 |
| 200 | 0.676 | 1.286 | 1.653 | 1.972 | 2.345 | 2.601 | 2.839 | 3.131 | 3.340 | 3.970 |
| 300 | 0.675 | 1.284 | 1.650 | 1.968 | 2.339 | 2.592 | 2.828 | 3.118 | 3.323 | 3.944 |
| 500 | 0.675 | 1.283 | 1.648 | 1.965 | 2.334 | 2.586 | 2.820 | 3.107 | 3.310 | 3.922 |
| 1000 | 0.675 | 1.282 | 1.646 | 1.962 | 2.330 | 2.581 | 2.813 | 3.098 | 3.300 | 3.906 |
| infini | 0.674 | 1.282 | 1.645 | 1.960 | 2.326 | 2.576 | 2.807 | 3.090 | 3.291 | 3.891 |

2—Interpretation of the Effects

When the confidence interval contains zero, the value of the effect is not very different from zero. We could then say that this effect is negligible and the parameter will not have any significant influence.

When the value of the effect is negative, the parameter has a negative influence on the measured value. If we increase the value of this parameter, the measured value, such as pH and colour will decrease.

When the value of the effect is positive, the parameter has a positive influence on the measured value. If we increase the value of this parameter, the measured value, such as pH and colour will increase.

C: Results of the Measurments

|  | pH | Polyphenols | Fat | Ashes | Moisture |
|---|---|---|---|---|---|
| trial n°1 | 5.01 | 9.69 | 47.24 | 7.10 | 3.06 |
| trial n°2 | 1.98 | 8.75 | 43.80 | 17.39 | 6.02 |
| trial n°3 | 3.05 | 12.46 | 47.21 | 8.87 | 2.95 |
| trial n°4 | 3.95 | 11.14 | 45.99 | 7.35 | 1.14 |
| trial n°5 | 5.23 | 12.28 | 47.29 | 7.25 | 3.21 |
| trial n°6 | 2.86 | 7.39 | 40.05 | 15.70 | 1.63 |
| trial n°7 | 4.91 | 10.33 | 43.75 | 5.28 | 3.58 |
| trial n°8 | 2.33 | 8.88 | 46.08 | 8.98 | 2.91 |
| trial n°9 | 4.59 | 12.37 | 47.79 | 7.62 | 3.04 |
| trial n°10 | 2.34 | 9.64 | 43.44 | 18.22 | 5.60 |
| trial n°11 | 5.58 | 12.79 | 46.67 | 5.15 | 3.03 |
| trial n°12 | 3.23 | 12.29 | 46.34 | 8.21 | 2.48 |
| trial n°13 | 4.66 | 12.95 | 43.25 | 6.56 | 2.20 |
| trial n°14 | 2.29 | 10.93 | 45.28 | 17.44 | 0.62 |
| trial n°15 | 5.06 | 11.91 | 48.95 | 5.63 | 1.72 |
| trial n°16 | 2.22 | 10.09 | 46.46 | 10.49 | 2.39 |
| Center 1 | 2.63 | 10.76 | 44.30 | 12.17 | 2.74 |
| Center 2 | 2.58 | 10.89 | 42.21 | 11.46 | 3.27 |
| Center 3 | 2.55 | 10.73 | 43.59 | 12.33 | 2.78 |
| Center 4 | 2.53 | 11.60 | 43.05 | 11.41 | 2.77 |

Figure 11:
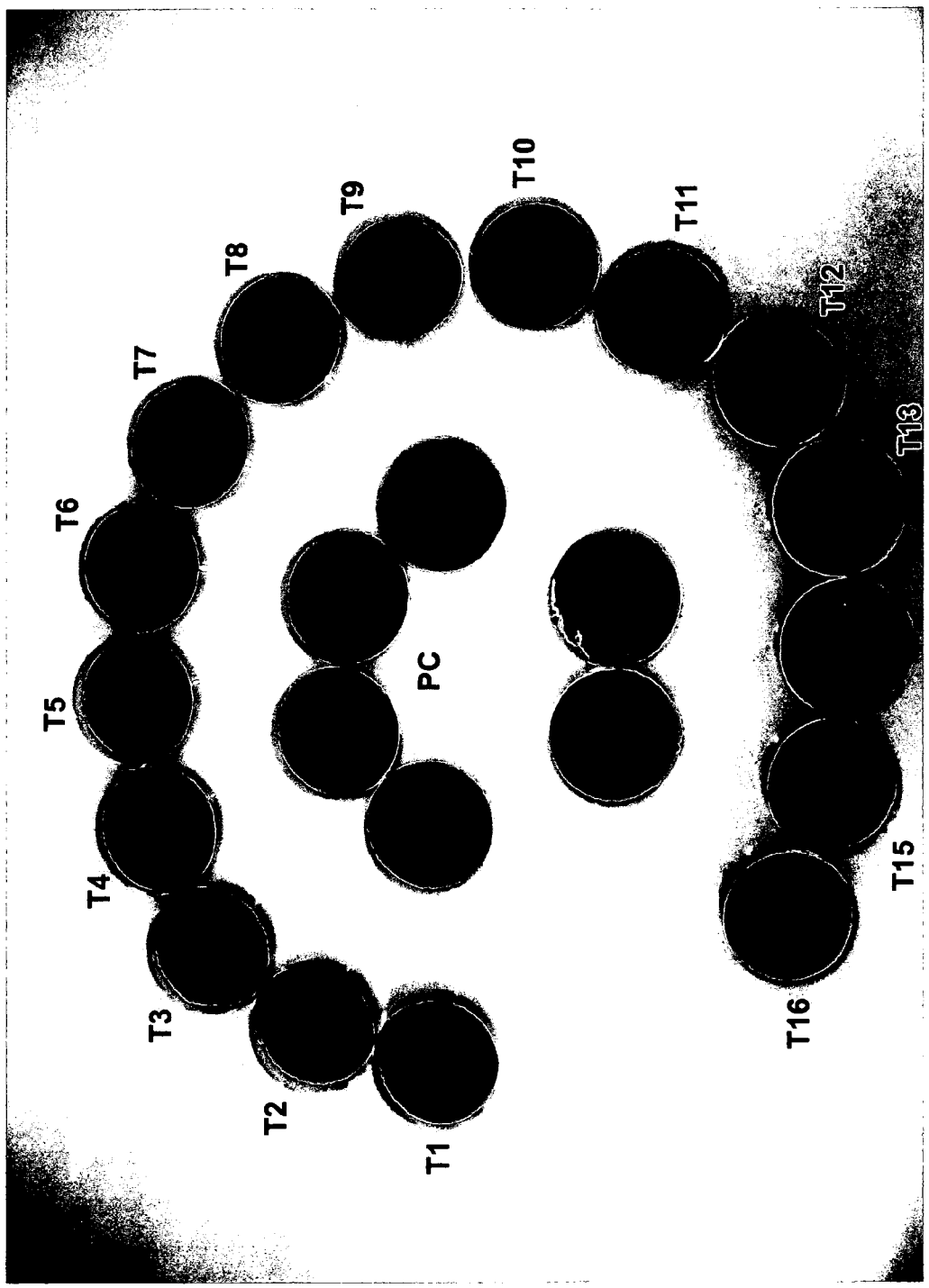
FIG. 11 shows the powders produced by the trials in Example 9.

Polyphenol contents are provided in % of epicatechin on dried and defatted cocoa according to Folin's method (see Example 4). The samples obtained are shown in FIG. 11. The trials with a C* value less than 18 are preferably considered to be non-limiting examples of purple. The trials with a C* value greater than 18 are preferably considered to be non-limiting examples of red.

All followed colours of these products are measured on dry and defatted material.

|  | Color | | | | |
|---|---|---|---|---|---|
|  | L* | C* | h° | a* | b* |
| Trial n°1 | 49.97 | 15.08 | 35.38 | 12.29 | 8.73 |
| Trial n°2 | 50.71 | 18.06 | 23.66 | 16.57 | 7.26 |
| Trial n°3 | 48.10 | 25.71 | 9.81 | 25.33 | 4.38 |
| Trial n°4 | 48.42 | 20.85 | 18.89 | 19.73 | 6.75 |
| Trial n°5 | 49.71 | 16.22 | 26.63 | 14.50 | 7.27 |
| Trial n°6 | 45.04 | 27.56 | 21.78 | 25.59 | 10.22 |
| Trial n°7 | 47.79 | 16.55 | 28.75 | 14.51 | 7.96 |
| Trial n°8 | 44.73 | 34.33 | 13.11 | 33.45 | 7.79 |
| Trial n°9 | 52.72 | 14.47 | 25.50 | 13.06 | 6.23 |
| Trial n°10 | 50.86 | 21.33 | 28.25 | 18.79 | 10.10 |
| Trial n°11 | 55.42 | 11.44 | 29.30 | 9.98 | 5.60 |
| Trial n°12 | 51.92 | 23.99 | 13.80 | 23.30 | 5.72 |
| Trial n°13 | 52.57 | 14.99 | 26.60 | 13.40 | 6.71 |
| Trial n°14 | 50.57 | 29.72 | 17.19 | 28.39 | 8.78 |
| Trial n°15 | 55.59 | 16.43 | 46.45 | 11.32 | 11.91 |
| Trial n°16 | 51.96 | 32.17 | 11.31 | 31.55 | 6.31 |
| Center 1 | 47.06 | 31.94 | 32.65 | 31.94 | 6.76 |
| Center 2 | 46.52 | 33.69 | 34.11 | 33.69 | 5.33 |
| Center 3 | 45.02 | 33.79 | 34.30 | 33.79 | 5.89 |
| Center 4 | 46.52 | 34.27 | 34.72 | 34.27 | 5.56 |

D: Analysis of the Effects (H)

1—Confidence Intervals and Interpretations, an Example: Ashes Value

|  | Parameters | CI Min | H | CI Max |
|---|---|---|---|---|
| Ashes | Quantity of acid | 2.388 | 3.145 | 3.902 |
|  | % Water | −3.089 | −2.333 | −1.576 |
|  | Time | −0.918 | −0.161 | 0.595 |
|  | Temperature | −0.669 | 0.088 | 0.844 |

In this case, the quantity of acid has a positive influence on the ash content. Thus, the more acid we use, the more ashes we will find in the final product.

On the contrary, the percentage of water has a negative influence on the ash content. The more water we include, the less ashes we will find.

For the parameters "Time" and "Temperature", zero is included in the confidence interval. These parameters did not have a significant influence on the ash content.

The table below provides a review of the confidence intervals and significance of the effects

|  | Parameters | CI Min | H | CI Max |
|---|---|---|---|---|
| pH | Quantity of acid | −1.125 | −1.056 | −0.986 |
|  | % Water | 0.016 | 0.086 | 0.155 |
|  | Time | −0.080 | −0.011 | 0.059 |
|  | Temperature | −0.029 | 0.041 | 0.110 |
| L* | Quantity of acid | −2.500 | −1.104 | 0.293 |
|  | % Water | −1.285 | 0.111 | 1.508 |

-continued

| | Parameters | CI Min | H | CI Max |
|---|---|---|---|---|
| | Time | −2.031 | −0.635 | 0.761 |
| | Temperature | 0.925 | 2.321 | 3.718 |
| C* | Quantity of acid | 3.197 | 4.820 | 6.443 |
| | % Water | −0.121 | 1.503 | 3.126 |
| | Time | 0.692 | 2.315 | 3.938 |
| | Temperature | −2.237 | −0.614 | 1.009 |
| h° | Quantity of acid | −6.459 | −5.027 | −3.595 |
| | % Water | −3.530 | −2.098 | −0.666 |
| | Time | −0.980 | 0.452 | 1.884 |
| | Temperature | −0.158 | 1.274 | 2.707 |
| Ashes | Quantity of acid | 2.388 | 3.145 | 3.902 |
| | % Water | −3.089 | −2.333 | −1.576 |
| | Time | −0.918 | −0.161 | 0.595 |
| | Temperature | −0.669 | 0.088 | 0.844 |
| Polyphenols | Quantity of acid | −1.631 | −0.979 | −0.328 |
| | % Water | −0.283 | 0.368 | 1.019 |
| | Time | −0.924 | −0.273 | 0.378 |
| | Temperature | 0.102 | 0.753 | 1.404 |
| a* | Quantity of acid | 3.563 | 5.186 | 6.809 |
| | % Water | 0.038 | 1.661 | 3.284 |
| | Time | 0.481 | 2.104 | 3.727 |
| | Temperature | −2.384 | −0.761 | 0.862 |
| b* | Quantity of acid | −0.739 | 0.259 | 1.256 |
| | % Water | −1.553 | −0.555 | 0.443 |
| | Time | −0.236 | 0.761 | 1.759 |
| | Temperature | −0.935 | 0.063 | 1.060 |

2—Review of the Effects

| | A Acid Concentration | B % Water | C Reaction time | D Temprature |
|---|---|---|---|---|
| pH | − | + | | |
| L* | | | | ++ |
| a* | ++ | + | + | |
| b* | | | | |
| C* | ++ | | + | |
| h° | −− | − | | |
| Ashes | ++ | − | | |
| Polyphenols | − | | | + |

Parameter with two signs has more influence (positive or negative) than parameter with only one sign.

3—Interactions Between the Parameters

| | AB Acid × Water | AC Acid × Time | AD Acid × Temperature | BC Water × Time | BD water × temperature | CD time × temperature |
|---|---|---|---|---|---|---|
| pH | + | | − | − | + | − |
| L* | | | | | | |
| a* | | ++ | | | | ++ |
| b* | | | | | | |
| C* | | ++ | | | | |
| h° | − | −− | − | + | + | |
| Ashes | − | | | | | |
| Polyphenols | | | | − | | |

Example 10

Use of a Weak Acid

Figure 12:
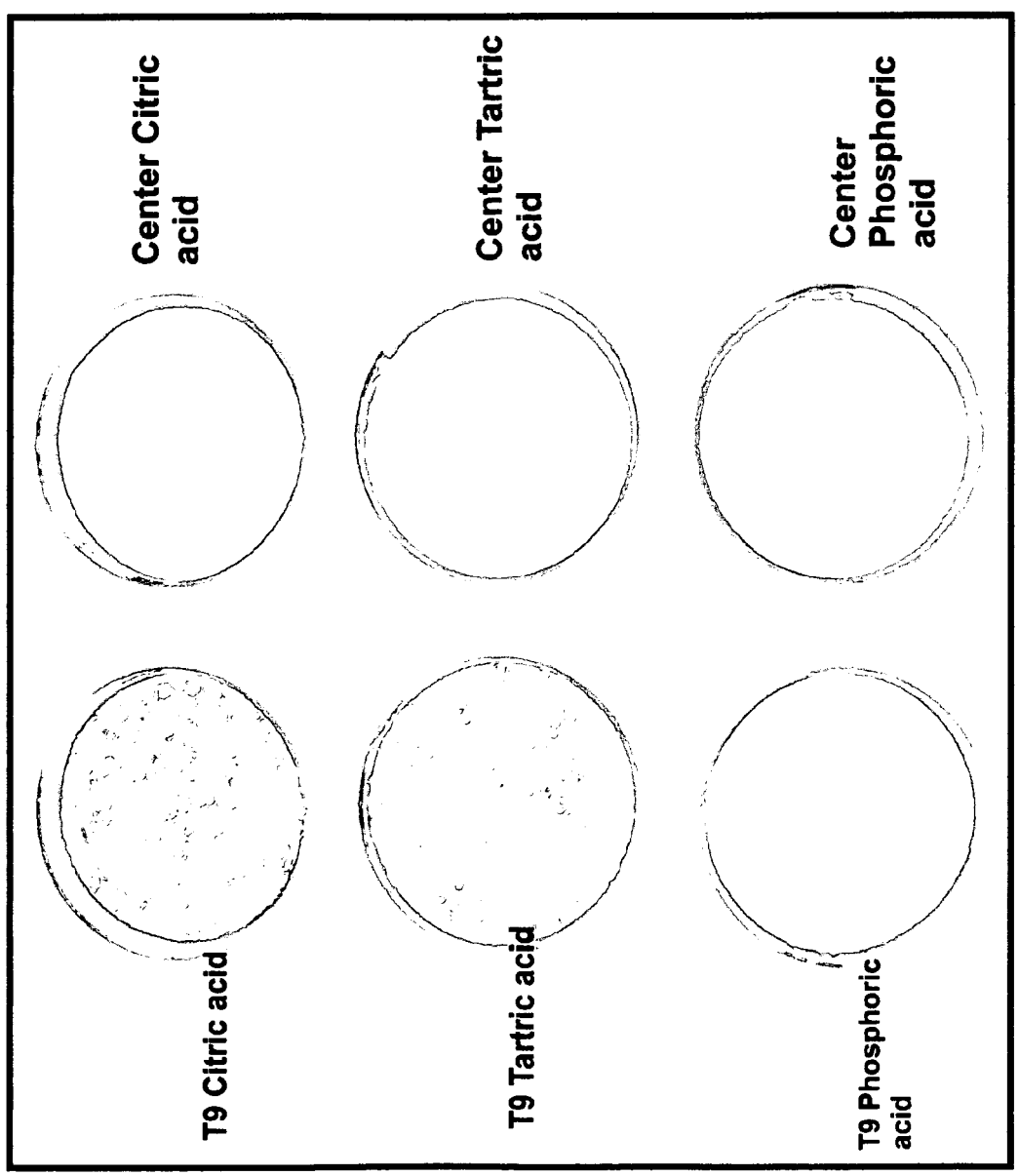
FIG. 12 shows the powders produced by the trials in Example 10.

To study the impact of different acids, we used the parameters of the trial n° 9 (one of the trials which can be considered to produce purple cocoa powder) and a centre point. The powders produced are shown in FIG. 12.

1—Parameters

Raw material: Lavados brazil cocoa beans

| | Acid | Water | Time | T° C. |
|---|---|---|---|---|
| Trial n°9 | −1 | −1 | −1 | +1 |
| Center 1 | 0 | 0 | 0 | 0 |

Trial 9:

Acid: citric acid or tartaric acid

Water 25%

Time: 20 min

Temperature: 50° C.

Centre

Acid: citric or tartaric acid

Water 112.5%

Time: 160 min

Temperature: 35° C.

2—Results

| | pH | L* | C* | h° | a* | b* | Polyphenols | Fat (%) | Ashes (%) | Moisture (%) |
|---|---|---|---|---|---|---|---|---|---|---|
| Trial n°9 Tartaric acid | 4.59 | 52.28 | 13.83 | 29.88 | 11.98 | 6.90 | 12.25 | 46.56 | 5.84 | 1.84 |
| Trial n°9 Citric acid | 4.79 | 52.79 | 12.31 | 28.75 | 10.80 | 5.92 | 13.90 | 43.19 | 5.47 | 1.74 |

-continued

|  | pH | L* | C* | h° | a* | b* | Polyphenols | Fat (%) | Ashes (%) | Moisture (%) |
|---|---|---|---|---|---|---|---|---|---|---|
| Trial n°9 Phosphoric acid | 4.59 | 52.72 | 14.47 | 25.50 | 13.06 | 6.23 | 12.37 | 47.79 | 7.62 | 3.04 |
| CP Tartaric acid | 3.45 | 45.87 | 29.96 | 9.61 | 29.54 | 5.00 | 9.50 | 47.15 | 5.36 | 1.84 |
| CP Citric acid | 4.22 | 46.72 | 24.00 | 12.96 | 23.39 | 5.37 | 10.72 | 43.71 | 4.97 | 1.45 |
| CP Phosphoric acid | 2.57 | 46.28 | 33.42 | 33.95 | 33.42 | 5.89 | 11.00 | 43.29 | 11.84 | 2.89 |

The colours and polyphenol content are provided for dried and defatted cocoa. The polyphenol is provided in % of epicatechin Folin's method.

In term of colour parameters, the results are not too different between the strong acid (phosphoric) and weaker acids (citric and tartaric).

As citric and tartaric acids are organic acids, we do not "find" them in the ashes anymore.

Polyphenol Content by Brunswick Lab (Orac Value Test and HPLC Condensed Tanins Method)

|  | Condensed tanins (%) Brunswick | ORAC (µmol TE/g) Brunswick |
|---|---|---|
| CP phosphoric acid | 14.61 | 3201 |
| CP citric acid | 16.55 | 3241 |
| CP tartric acid | 16.66 | 3125 |
| T9 Citric acid | 17.58 | 3330 |

3—Conclusion

The citric acid is suitable for use in the acidification process of the invention. It is more interesting for low supply in ashes and easy manipulation. Also it seems that citric acid, which is weaker than phosphoric acid, is particularly useful for preserving the polyphenol content.

Example 11

Scaling up Trials

The parameters from trial 9 (in Example 10) were applied for a semi-industrial trial on the pilot line.
Raw materials: Lavados Brazil nibs
Acid: 5% of citric acid
Water 25%
Reaction time: 20-40-60 min
Reaction temperature: Room temperature
Drying: in tornado at 100° C.
Grinding
LB01→Lavados Brazil reaction time 20 min
LB02→Lavados Brazil reaction time 40 min
LB03→Lavados Brazil reaction time 60 min 1. Trials A steam flow temperature of 70° C. was used to regulate the double jacket on the pilot line. The flow was cut off when the jacket was at 70° C.

The mixing time was slightly modified. To have a good moisture before drying, warm air was injected during the mixing step (5 min only mixing and the rest of time mixing and air injection).

Following these modifications the nibs could be dried in the Tornado (setting 105° C. during 5 min)

The cooling system and the door of the Tornado were abraded slightly by the acid, because these parts are not made from stainless steel.

2—Results

Figure 13:
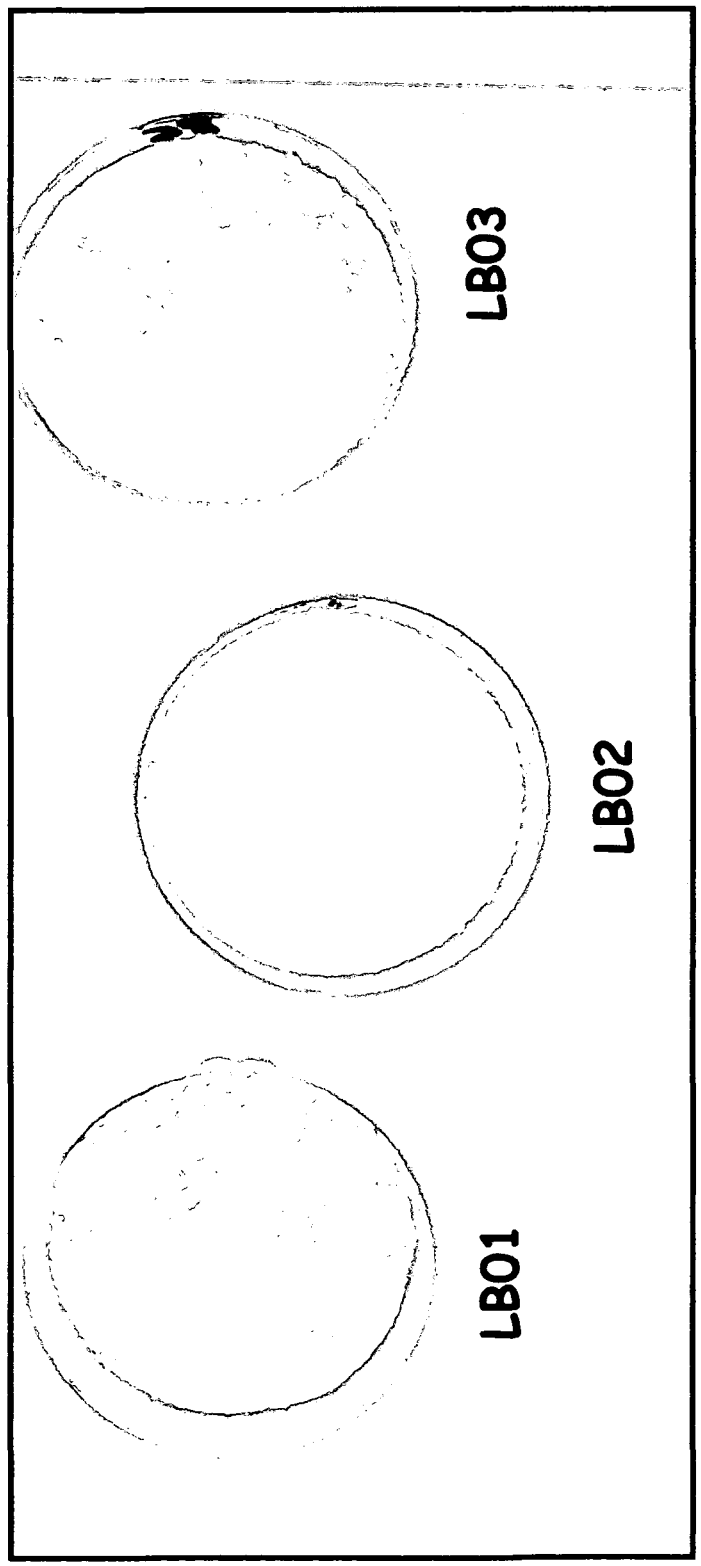
FIG. 13 shows the powder produced by the scale-up in Example 11.
Figure 14:
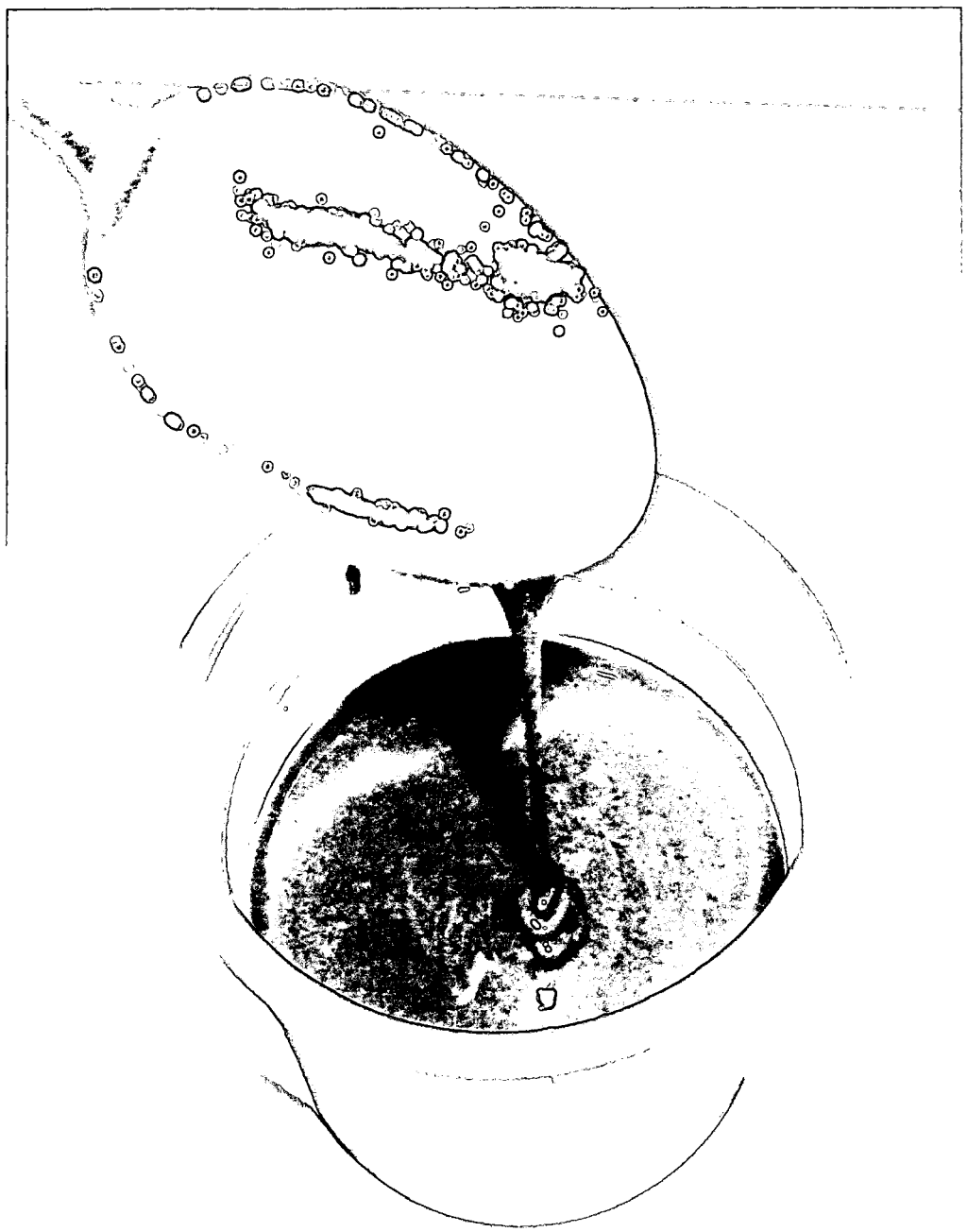
FIG. 14 shows the cocoa liquor from LB02 in Example 11.

|  | L* | a* | b* | C* | h° | Polyphenols | Fat % |
|---|---|---|---|---|---|---|---|
| LB01 81684 | 53.2 | 15.5 | 11.3 | 19.2 | 36.2 | 11.52 | 47.57 |
| LB02 81685 | 48.5 | 18 | 10.1 | 20.6 | 29.2 | 11.85 | 47.68 |
| LB03 81686 | 55.9 | 16 | 8.65 | 18.2 | 28.4 | 11.96 | 49.98 |
| OT01 81687 | 51.8 | 14.2 | 16.7 | 21.9 | 49.6 | 6.88 | 51.32 | polyphenol and colour were measured on dried and defatted cocoa—polyphenols in % of epicatechin: Folin's method (see FIGS. 13 and 14).

3—Conclusion

This process enables a correct colour and an acceptable polyphenol content to be obtained with a reaction time of 40 min.

The moisture of the nibs after the drying is about 2-3%. The cut grinding step is more difficult than "Ball Milling" step.

For all trials on the pilot line, the texture is very acceptable (pumpable).

Example 12

Expeller Process

A: Description

Expeller Press

Figure 15:
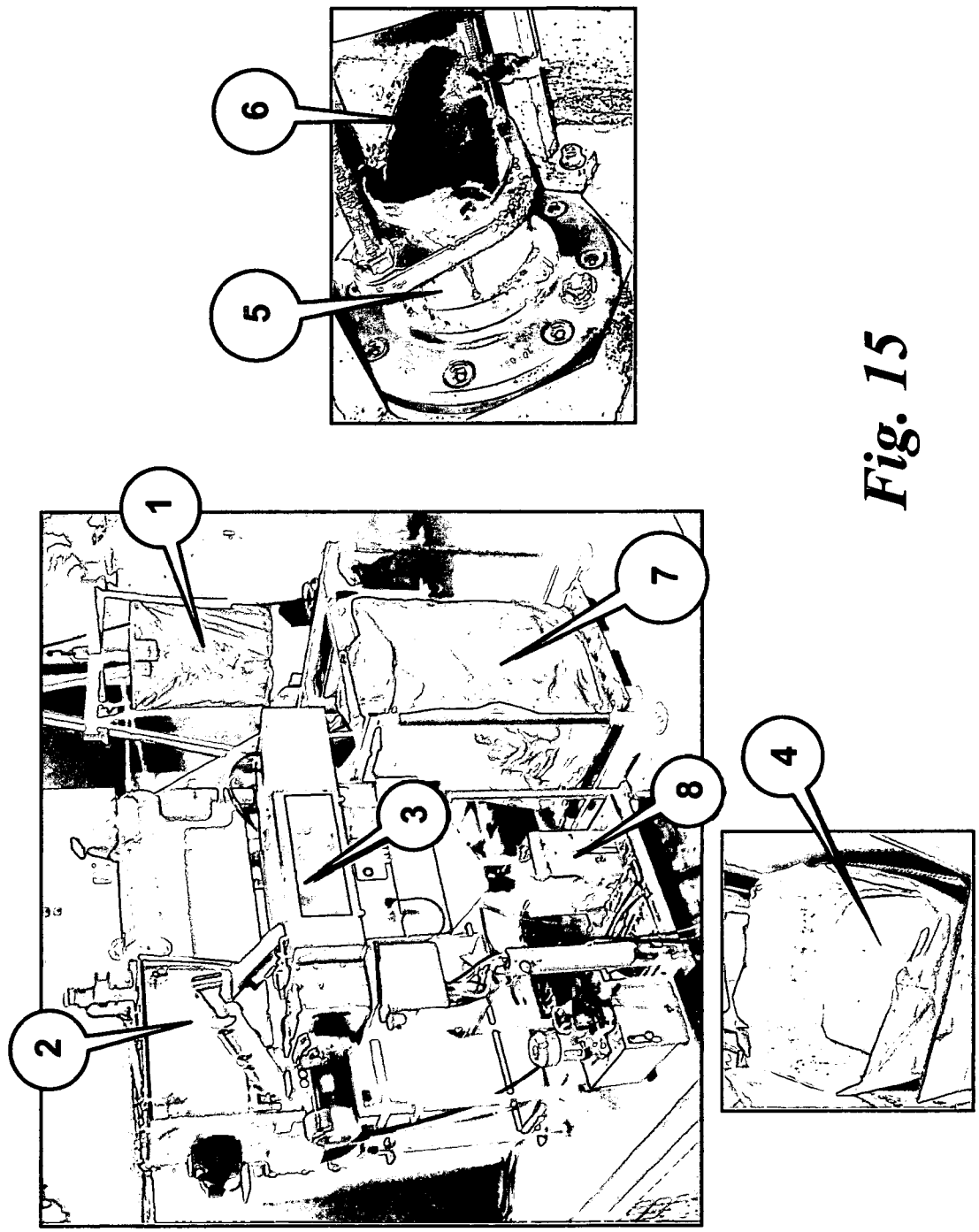
FIG. 15 shows the apparatus used for Example 12.
Figure 16:
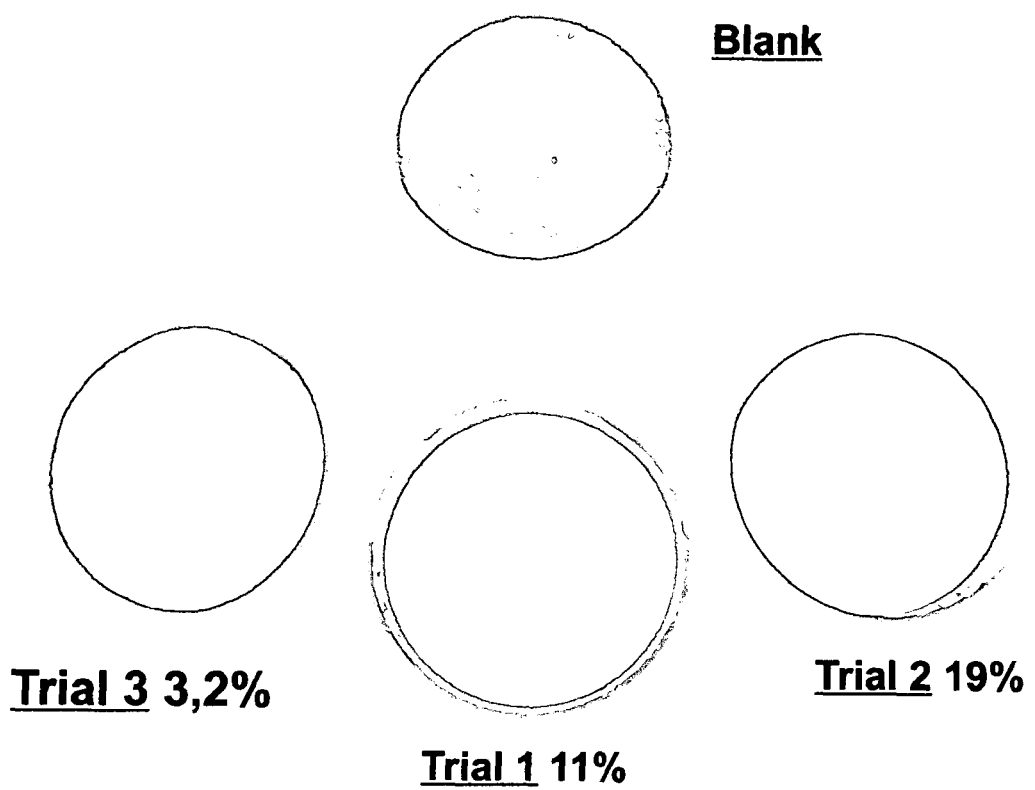
FIG. 16 shows the powders obtained from Example 12.
Figure 17:
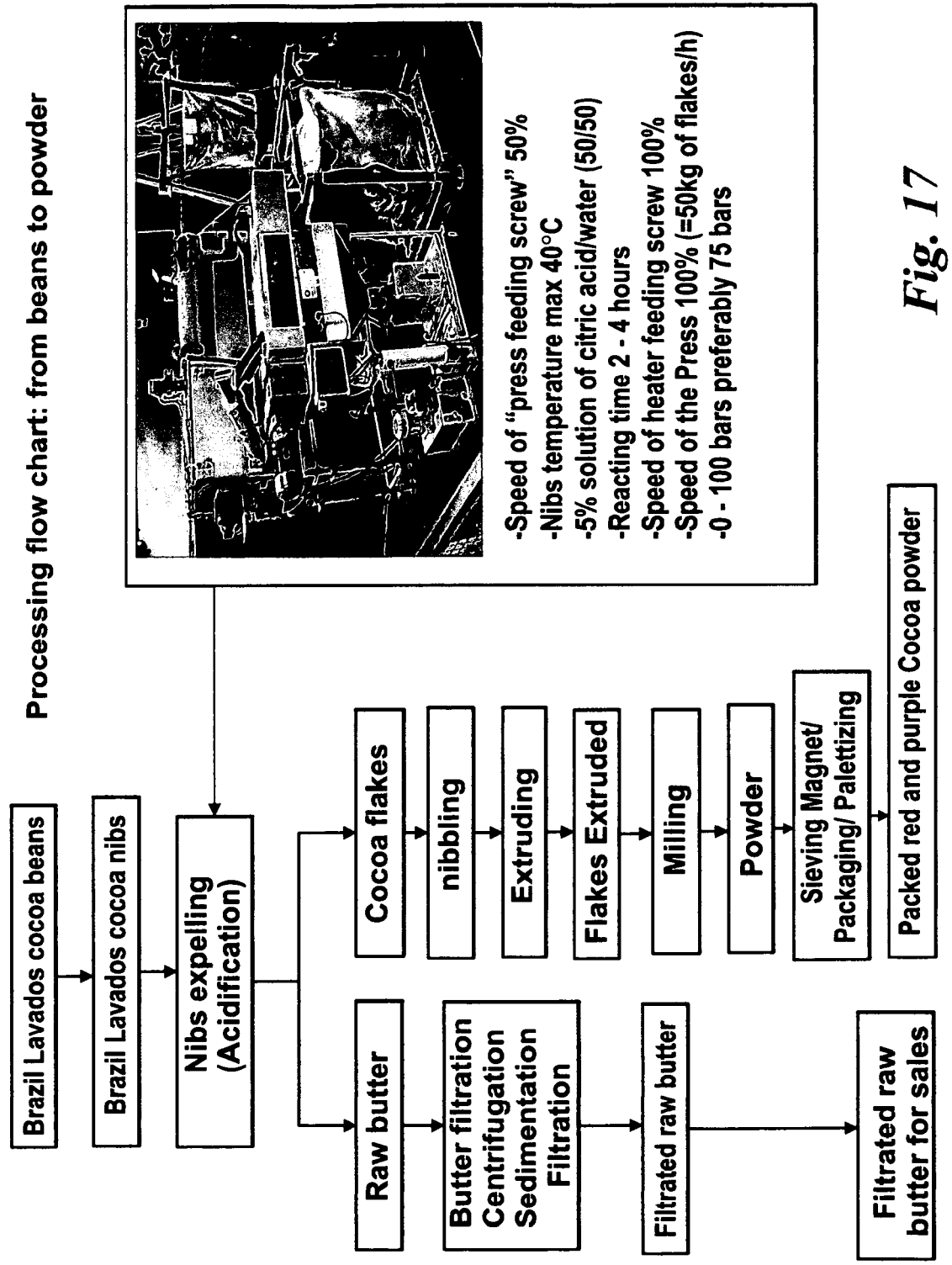
FIGS. 17 and 18 show a preferred process for producing powders according to the invention.
Figure 18:
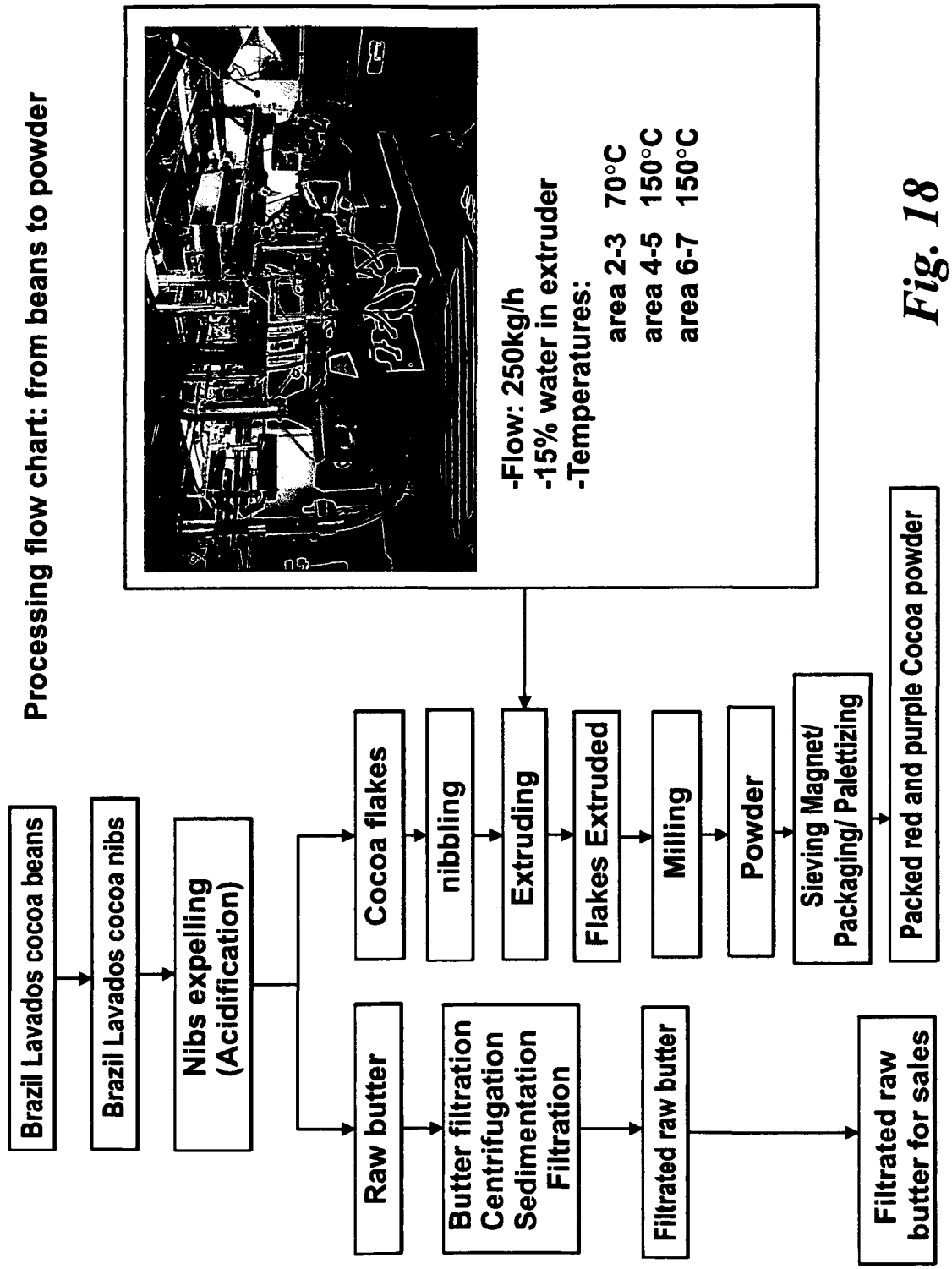

With reference to FIG. 15, using a hoist, the height of a bag containing cocoa nibs (1) is raised over a conveying screw. The nibs are carried to a mixing heater (2), wherein the nibs are acidified, heated (50° C.) and mixed. Then the red/purple nibs are inserted to a worm press (3). The screw is bound by a cage, that only lets the butter (4) go through. At the end, a screwplate (5) enables the flakes (6) to be expellled. The expeller flakes are picked up in a bag (7) and the butter is picked up in a box (8).

This equipment enables a product called "Flakes" to be obtained from cocoa nibs. In the end the fat content of the flakes is about 10%.

3 Trials and a Blank (Nibs Without Acid)
Parameters:
continuous acidification in the heating zone
acid: citric acid 1.6/5.5/9.5%
raw material: Lavados brazil cocoa nibs
water 1.6/5.5/9.5%

|  | Feeding screw flow Kg/h | citric acid in solution (50/50) % |
|---|---|---|
| Blank | 153.00 | 0.00 |
| Trial 3 | 104.30 | 3.20 |
| Trial 1 | 70.28 | 11.00 |
| Trial 2 | 41.12 | 19.00 |

B Results

| | fat (%) | Moisture (%) | pH | Colour | | | | |
|---|---|---|---|---|---|---|---|---|
| | | | | L* | C* | h° | a* | b* |
| Blank | 9.03 | 8.89 | 5.69 | 50.21 | 8.76 | 8.75 | 8.66 | 1.33 |
| Trial 3 (3.2%) | 11.68 | 10.06 | 4.70 | 48.55 | 13.95 | 7.49 | 13.84 | 1.82 |
| Trial 1 (11%) | 18.50 | 6.61 | 3.93 | 48.31 | 21.84 | 7.96 | 21.63 | 3.03 |
| Trial 2 (19%) | 18.21 | 8.29 | 3.61 | 44.18 | 26.62 | 9.23 | 26.28 | 4.27 |

The colour is measured on dried and defatted cocoa.

The analysis of an expeller product produced according to the invention, together with the conditions used, is set out in the table below.

| N° CRAQ | PRODUIT | DESIGNATION | N° LOT | CLT/ FOURN. | FABRIC/ SITE | Foiln % (EC) | Epicatéchine (mg/g) | catéchine mg/g | procyanidine B1 mg/g | procyanidine B2 mg/g |
|---|---|---|---|---|---|---|---|---|---|---|
| 83486 | PD | Red Expeller trial 4 | | | | 12.09 | 21.6 | 0.91 | 0.27 | 8.45 |

| N° CRAQ | % Fat | L* | a* | b* | C* | h° | a*/b* | pH | Ashes |
|---|---|---|---|---|---|---|---|---|---|
| 83486 | 13.94 | 41.05 | 18.4 | 2.44 | 18.56 | 7.55 | 7.54 | 4.16 | 6.65 |

Conditions:
75 bar;
Speed of press feeding screw 50%;
5% of citric acid;
Speed of heater feeding screw 100%;
T° = 40° C.;
Speed of the Press 100%

Microbiological Results

| DATE ANALYSES | TYPE PRODUIT | Flore totale/g | Levures- Moisissures/g | Dénombr E Coli/g | Dénombr Entéro/g | Salmonelles | Thermoresistant Thermophiles | Thermoresistant Mésophiles |
|---|---|---|---|---|---|---|---|---|
| 12 Nov. 2008 | GRAINS LAVADOS BRESIL ENTREE | 17 000 | 13300 | <10 | <10 | N/25 G | | |
| | GRAINS LAVADOS BRESILSORTIE CHAUFFOIR | 14 000 | 10350 | <10 | <10 | N/25 G | | |
| | FLAKES LAVADOS BRESIL SORTIE EXPELLER | 33 500 | 2150 | <10 | <10 | N/25 G | | |
| 20 Dec. 2008 | FLAKES LAVADOS BRESIL ENTREE EXTRUDEUR T020008 | 68 000 | 47 000 | <10 | <10 | N/25 g | <5 | <5 |
| 20 Dec. 2008 | FLAKES LAVADOS BRESIL SORTIE EXTRUDEURT0200013 | 700 | 5 | <10 | <10 | N/25 g | <5 | <5 |

The microbiological results show that the level of moisture can be reduced significantly following extrusion, while also reducing the microbial level. The extruder therefore provides a convenient method for drying and sterilizing the flakes.

The polyphenol content of the powder obtained from the flakes is as follows.

| Sample ID | Brunswick Lab ID | ORAC$_{hydro}$* (μmoleTE/g) |
|---|---|---|
| 100-F017906-AC-793 083408132 | 09-0001 | 1,493 |
| FR70620 T020008 | 09-0002 | 2,264 |
| Red Deep Purple CP T020008 | 09-0003 | 1,702 |

*The ORAC analysis provides a measure of the scavenging capacity of antioxidants against the peroxyl radical, which is one of the most common reactive oxygen species (ROS) found in the body. ORAC$_{hydro}$ reflects water-soluble antioxidant capacity. Trolox, a water-soluble Vitamin E analog, is used as the calibration standard and the ORAC result is expressed as micromole Trolox equivalent (TE) per gram.

The acceptable precision of the ORAC assay is 15% relative standard deviation.[i][ii]

[1] Ou, B; Hampsch-Woodill, M.; Prior, R. L.; Development and Validation of an Improved Oxygen Radical Absorbance Capacity Assay using Fluorescein as the Fluorescent Probe. Journal of Agricultural and Food Chemistry.; 2001; 49(10); 4619-4626

[1] Ou, B.; Huang, D.; Hampsch-Woodill, M.; Method for Assaying the Antioxidant Capacity of A Sample. *U.S. Pat. No. 7,132,296 B2*

The tannin content of the powder is provided in the following table (referring to Red Deep Purple CP).

Analysis: Condensed Tannins*

*We utilize the USDA method as published by Liwei Gu et al: Procyanidin and Catechin Contents and Antioxidant Capacity of Cocoa and Chocolate Products. Gu, L.; House, S. E.; Wu, X.; Ou, B.; Prior, R. L.; J. Agric. Food Chem.; (Article); 2006; 54(11); 4057-4061 It is a normal phase High Performance Liquid Chromatography method with fluorescence detection.

| Sample ID | BrunswickLab ID | 1mers | 2mers | 3mers | 4mers | 5mers | 6mers | 7mers | 8mers | 9mers | 10mers | >10mers | total mg/g |
|---|---|---|---|---|---|---|---|---|---|---|---|---|---|
| FR70620 | T020008 | 09-0002 | 18.73 | 16.43 | 14.66 | 13.95 | 11.67 | 10.88 | 7.44 | 9.33 | 9.81 | 0.00 | 24.29 | 141.20 |
| Red Deep Purple CP | T020008 | 09-0003 | 18.45 | 15.22 | 13.79 | 13.89 | 11.95 | 11.39 | 8.30 | 10.10 | 11.05 | 0.00 | 29.28 | 143.43 |

The acceptable precision of the PACs assay is ±15% Relative Standard Deviation

Example 13

Treating Cocoa Liquor in the Conche

The composition used in the experiments was as follows. All of the experiments were carried out using 1 kg of the composition (referred to as "conche" in the tables below). The composition used was:

| | |
|---|---|
| Sugar | 47.1 |
| Acticoa ® Mass | 37.7 |
| Cocoa butter | 9.2 |
| Butter oil | 5 |
| Lecithin | 0.65 |
| K-Bic | 0.3 |
| Nat Van | 0.05 |
| | 100 |

Acticoa® is a registered trademark of the Barry Callebaut Group.

The following parameters were used in the experiments:
Conching time: 1 h to 4 h
Conching temperature: 40° C. to 65° C.
Addition of citric acid (CA): 0.2% to 1%
Addition of water: 1% to 2%
Equipment A "Stephan"-mixer, at minimum mixing speed (mixing and scraping) was used. The experiments were carried out with ventilation to evacuate the volatile components.

The results of these experiments are in the tables below. The colour measurements refer to the colour of the chocolate produced and not defatted cocoa powder.

The polyphenol and fat content of the purple chocolate is as defined below.

| Date analysis | Reference | Description | Lab nr | Lab | Fat (%) | Folin GA (%) | Flavanols DP1-10 (%) |
|---|---|---|---|---|---|---|---|
| Jan. 12, 2009 | CHD-L080006-108 | Purple chocolate | 12/01 13a-13b | Wieze | 35.02 | 2.7 | 1.7 |
| Jan. 12, 2009 | CHD-L080006-103 | Purple chocolate | 12/01 2a-2b | Wieze | 37.11 | 2.7 | 1.7 |
| Jan. 12, 2009 | CHD-L080006-105 | Purple chocolate | 12/01 3a-3b | Wieze | 37.99 | 2.6 | 1.7 |
| Jan. 12, 2009 | CHD-L080006-101 | Purple chocolate | 12/01 1a-1b | Wieze | 37.48 | 2.6 | 1.7 |
| Jan. 12, 2009 | CHD-L080006-106 | Purple chocolate | 12/01 12a-12b | Wieze | 37.25 | 2.6 | 1.6 |
| Jan. 12, 2009 | CHD-L080006-102 | Purple chocolate | 12/01 10a-10b | Wieze | 36.93 | 2.6 | 1.6 |
| Jan. 12, 2009 | CHD-L080006-104 | Purple chocolate | 12/01 11a-11b | Wieze | 37.42 | 2.6 | 1.6 |
| Jan. 12, 2009 | CHID-L080006-107 | Purple chocolate | 12/01 4a-4b | Wieze | 37.59 | 2.5 | 1.8 |
| Jan. 12, 2009 | CHD-L080006-116 | Purple chocolate | 12/01 9a-9b | Wieze | 38.57 | 2.4 | 1.6 |
| Jan. 12, 2009 | CHD-L080006-112 | Purple chocolate | 12/01 7a-7b | Wieze | 36.91 | 2.3 | 1.4 |
| Jan. 12, 2009 | CLID-L080006-109 | Purple chocolate | 12/01 5a-5b | Wieze | 37.44 | 2.2 | 1.5 |
| Jan. 12, 2009 | CHD-L080006-114 | Purple chocolate | 12/01 8a-8b | Wieze | 37.20 | 2.2 | 1.3 |
| Jan. 12, 2009 | CHD-L080006-110 | Purple chocolate | 12/01 6a-6b | Wieze | 37.57 | 2.0 | 1.2 |
| Jan. 12, 2009 | CHD-L080006-101 | Purple chocolate | 12/01 1a-1b | Wieze | 37.48 | 2.6 | 1.7 |
| Jan. 12, 2009 | CHD-L080006-102 | Purple chocolate | 12/01 10a-10b | Wieze | 36.93 | 2.6 | 1.6 |
| Jan. 12, 2009 | CHD-L080006-103 | Purple chocolate | 12/01 2a-2b | Wieze | 37.11 | 2.7 | 1.7 |
| Jan. 12, 2009 | CHD-L080006-104 | Purple chocolate | 12/01 11a-11b | Wieze | 37.42 | 2.6 | 1.6 |
| Jan. 12, 2009 | CHD-L080006-105 | Purple chocolate | 12/01 3a-3b | Wieze | 37.99 | 2.6 | 1.7 |
| Jan. 12, 2009 | CHD-L080006-106 | Purple chocolate | 12/01 12a-12b | Wieze | 37.25 | 2.6 | 1.6 |
| Jan. 12, 2009 | CHD-L080006-107 | Purple chocolate | 12/01 4a-4b | Wieze | 37.59 | 2.5 | 1.8 |

-continued

| Date analysis | Reference | Description | Lab nr | Lab | Fat (%) | Folin GA (%) | Flavanols DP1-10 (%) |
|---|---|---|---|---|---|---|---|
| Jan. 12, 2009 | CHD-L080006-108 | Purple chocolate | 12/01 13a-13b | Wieze | 35.02 | 2.7 | 1.7 |
| Jan. 12, 2009 | CHD-L080006-109 | Purple chocolate | 12/01 5a-5b | Wieze | 37.44 | 2.2 | 1.5 |
| Jan. 12, 2009 | CHD-L080006-110 | Purple chocolate | 12/01 6a-6b | Wieze | 37.57 | 2.0 | 1.2 |
| Jan. 12, 2009 | CHD-L080006-112 | Purple chocolate | 12/01 7a-7b | Wieze | 36.91 | 2.3 | 1.4 |
| Jan. 12, 2009 | CHD-L080006-114 | Purple chocolate | 12/01 8a-8b | Wieze | 37.20 | 2.2 | 1.3 |
| Jan. 12, 2009 | CHD-L080006-116 | Purple chocolate | 12/01 9a-9b | Wieze | 38.57 | 2.4 | 1.6 |

| 1 kg conche | CA (g) A | H$_2$O (g) B | Time (h) C | T (°C) D | Colour L | a | b | C | h | Moisture % | Viscosity Lin V | Cas V | Yield v | Fat % | PF's Folin GA (%) | Flavanols DP1-10 (%) |
|---|---|---|---|---|---|---|---|---|---|---|---|---|---|---|---|---|
| CHD-080006-108 | 10 | 20 | 4 | 40 | 20.85 | 15.24 | 9.66 | 18.0 | 0.6 | 0.69 | 3090 | 2370 | 4.1 | 35.0 | 2.7 | 1.7 |
| CHD-080006-103 | 2 | 20 | 1 | 40 | 23.21 | 10.07 | 9.32 | 13.7 | 0.7 | 1.10 | 1980 | 1140 | 10.7 | 37.1 | 2.7 | 1.7 |
| CHD-080006-105 | 2 | 10 | 4 | 40 | 23.91 | 9.97 | 8.29 | 13.0 | 0.7 | 0.62 | 1380 | 862 | 9.4 | 38.0 | 2.6 | 1.7 |
| CHD-080006-101 | 2 | 10 | 1 | 40 | 23.01 | 10.57 | 8.69 | 13.7 | 0.7 | 0.84 | 1690 | 1010 | 12.3 | 37.5 | 2.6 | 1.7 |
| CHD-080006-106 | 10 | 10 | 4 | 40 | 23.69 | 12.16 | 8.73 | 15.0 | 0.6 | 0.61 | 1640 | 1040 | 6.4 | 37.3 | 2.6 | 1.6 |
| CHD-080006-102 | 10 | 10 | 1 | 40 | 23.93 | 12.31 | 8.87 | 15.2 | 0.6 | 0.80 | | | | 36.9 | 2.6 | 1.6 |
| CHD-080006-104 | 10 | 20 | 1 | 40 | 22.95 | 15.92 | 9.95 | 18.8 | 0.6 | 1.10 | 2070 | 1270 | 6.5 | 37.4 | 2.6 | 1.6 |
| CHD-080006-107 | 2 | 20 | 4 | 40 | 21.04 | 10.54 | 9.20 | 14.0 | 0.7 | 0.69 | 1670 | 1170 | 3.5 | 37.6 | 2.5 | 1.8 |
| CHD-080006-116 | 10 | 20 | 4 | 65 | 24.49 | 14.60 | 9.19 | 17.3 | 0.6 | 0.46 | 1620 | 1160 | 2.4 | 38.6 | 2.4 | 1.6 |
| CHD-080006-112 | 10 | 20 | 1 | 65 | 22.12 | 15.20 | 9.59 | 18.0 | 0.6 | 0.62 | 2100 | 1540 | 2.8 | 36.9 | 2.3 | 1.4 |
| CHD-080006-109 | 2 | 10 | 1 | 65 | 24.10 | 9.54 | 8.35 | 12.7 | 0.7 | 0.61 | 1590 | 980 | 9.4 | 37.4 | 2.2 | 1.5 |
| CHD-080006-114 | 10 | 10 | 4 | 65 | 23.74 | 12.20 | 8.73 | 15.0 | 0.6 | 0.37 | 1750 | 1170 | 5.8 | 37.2 | 2.2 | 1.3 |
| CHD-080006-110 | 10 | 10 | 1 | 65 | 23.55 | 12.82 | 8.87 | 15.6 | 0.6 | 0.58 | 1930 | 1290 | 5.6 | 37.6 | 2.0 | 1.2 |
| CHD-080006-111 | 2 | 20 | 1 | 65 | 21.16 | 9.40 | 8.98 | 13.0 | 0.8 | 0.62 | 2100 | 1570 | 3.0 | | | |
| CHD-080006-113 | 2 | 10 | 4 | 65 | 23.91 | 8.74 | 8.45 | 12.2 | 0.8 | 0.37 | 1500 | 960 | 8.4 | | | |
| CHD-080006-115 | 2 | 20 | 4 | 65 | 23.63 | 8.65 | 8.96 | 12.5 | 0.8 | 0.46 | 1670 | 1140 | 3.8 | | | |

| 1 kg conche | CA (g) A | H$_2$O (g) B | Time (h) C | T (°C) D | Colour L | a | b | C | h | Moisture % | Viscosity Lin V | Cas V | Yield v |
|---|---|---|---|---|---|---|---|---|---|---|---|---|---|
| CHD-080006-116 | 10 | 20 | 4 | 65 | 24.49 | 14.60 | 9.19 | 17.3 | 0.6 | 0.46 | 1620 | 1160 | 2.4 |
| CHD-080006-109 | 2 | 10 | 1 | 65 | 24.10 | 9.54 | 8.35 | 12.7 | 0.7 | 0.61 | 1590 | 980 | 9.4 |
| CHD-080006-102 | 10 | 10 | 1 | 40 | 23.93 | 12.31 | 8.87 | 15.2 | 0.6 | 0.80 | | | |
| CHD-080006-105 | 2 | 10 | 4 | 40 | 23.91 | 9.97 | 8.29 | 13.0 | 0.7 | 0.62 | 1380 | 862 | 9.4 |
| CHD-080006-113 | 2 | 10 | 4 | 65 | 23.91 | 8.74 | 8.45 | 12.2 | 0.8 | 0.37 | 1500 | 960 | 8.4 |
| CHD-080006-114 | 10 | 10 | 4 | 65 | 23.74 | 12.20 | 8.73 | 15.0 | 0.6 | 0.37 | 1750 | 1170 | 5.8 |
| CHD-080006-106 | 10 | 10 | 4 | 40 | 23.69 | 12.16 | 8.73 | 15.0 | 0.6 | 0.61 | 1640 | 1040 | 6.4 |
| CHD-080006-115 | 2 | 20 | 4 | 65 | 23.63 | 8.65 | 8.96 | 12.5 | 0.8 | 0.46 | 1670 | 1140 | 3.8 |
| CHD-080006-110 | 10 | 10 | 1 | 65 | 23.55 | 12.82 | 8.87 | 15.6 | 0.6 | 0.58 | 1930 | 1290 | 5.6 |
| CHD-080006-103 | 2 | 20 | 1 | 40 | 23.21 | 10.07 | 9.32 | 13.7 | 0.7 | 1.10 | 1980 | 1140 | 10.7 |
| CHD-080006-101 | 2 | 10 | 1 | 40 | 23.01 | 10.57 | 8.69 | 13.7 | 0.7 | 0.84 | 1690 | 1010 | 12.3 |
| CHD-080006-104 | 10 | 20 | 1 | 40 | 22.95 | 15.92 | 9.95 | 18.8 | 0.6 | 1.10 | 2070 | 1270 | 6.5 |
| CHD-080006-112 | 10 | 20 | 1 | 65 | 22.12 | 15.20 | 9.59 | 18.0 | 0.6 | 0.62 | 2100 | 1540 | 2.8 |
| CHD-080006-111 | 2 | 20 | 1 | 65 | 21.16 | 9.40 | 8.98 | 13.0 | 0.8 | 0.62 | 2100 | 1570 | 3.0 |
| CHD-080006-107 | 2 | 20 | 4 | 40 | 21.04 | 10.54 | 9.20 | 14.0 | 0.7 | 0.69 | 1670 | 1170 | 3.5 |
| CHD-080006-108 | 10 | 20 | 4 | 40 | 20.85 | 15.24 | 9.66 | 18.0 | 0.6 | 0.69 | 3090 | 2370 | 4.1 |

| 1 kg conche | CA (g) A | H$_2$O (g) B | Time (h) C | T (°C) D | Colour L | a | b | C | h | Moisture % | Viscosity Lin V | Cas V | Yield v |
|---|---|---|---|---|---|---|---|---|---|---|---|---|---|
| CHD-080006-116 | 10 | 20 | 4 | 65 | 24.49 | 14.60 | 9.19 | 17.3 | 0.6 | 0.46 | 1620 | 1160 | 2.4 |
| CHD-080006-109 | 2 | 10 | 1 | 65 | 24.10 | 9.54 | 8.35 | 12.7 | 0.7 | 0.61 | 1590 | 980 | 9.4 |
| CHD-080006-102 | 10 | 10 | 1 | 40 | 23.93 | 12.31 | 8.87 | 15.2 | 0.6 | 0.80 | | | |
| CHD-080006-105 | 2 | 10 | 4 | 40 | 23.91 | 9.97 | 8.29 | 13.0 | 0.7 | 0.62 | 1380 | 862 | 9.4 |
| CHD-080006-113 | 2 | 10 | 4 | 65 | 23.91 | 8.74 | 8.45 | 12.2 | 0.8 | 0.37 | 1500 | 960 | 8.4 |

| 1 kg conche | CA (g) A | H₂O (g) B | Time (h) C | T (°C.) D | Colour L | a | b | C | h | Moisture % | Viscosity Lin V | Cas V | Yield v |
|---|---|---|---|---|---|---|---|---|---|---|---|---|---|
| CHD-080006-114 | 10 | 10 | 4 | 65 | 23.74 | 12.20 | 8.73 | 15.0 | 0.6 | 0.37 | 1750 | 1170 | 5.8 |
| CHD-080006-106 | 10 | 10 | 4 | 40 | 23.69 | 12.16 | 8.73 | 15.0 | 0.6 | 0.61 | 1640 | 1040 | 6.4 |
| CHD-080006-115 | 2 | 20 | 4 | 65 | 23.63 | 8.65 | 8.96 | 12.5 | 0.8 | 0.46 | 1670 | 1140 | 3.8 |
| CHD-080006-110 | 10 | 10 | 1 | 65 | 23.55 | 12.82 | 8.87 | 15.6 | 0.6 | 0.58 | 1930 | 1290 | 5.6 |
| CHD-080006-103 | 2 | 20 | 1 | 40 | 23.21 | 10.07 | 9.32 | 13.7 | 0.7 | 1.10 | 1980 | 1140 | 10.7 |
| CHD-080006-101 | 2 | 10 | 1 | 40 | 23.01 | 10.57 | 8.69 | 13.7 | 0.7 | 0.84 | 1690 | 1010 | 12.3 |
| CHD-080006-104 | 10 | 20 | 1 | 40 | 22.95 | 15.92 | 9.95 | 18.8 | 0.6 | 1.10 | 2070 | 1270 | 6.5 |
| CHD-080006-112 | 10 | 20 | 1 | 65 | 22.12 | 15.20 | 9.59 | 18.0 | 0.6 | 0.62 | 2100 | 1540 | 2.8 |
| CHD-080006-111 | 2 | 20 | 1 | 65 | 21.16 | 9.40 | 8.98 | 13.0 | 0.8 | 0.62 | 2100 | 1570 | 3.0 |
| CHD-080006-107 | 2 | 20 | 4 | 40 | 21.04 | 10.54 | 9.20 | 14.0 | 0.7 | 0.69 | 1670 | 1170 | 3.5 |
| CHD-080006-108 | 10 | 20 | 4 | 40 | 20.85 | 15.24 | 9.66 | 18.0 | 0.6 | 0.69 | 3090 | 2370 | 4.1 |

| 1 kg conche | CA (g) A | H₂O (g) B | Time (h) C | T (°C.) D | Colour L | a | b | C | h | Moisture % | Viscosity Lin V | Cas V | Yield v |
|---|---|---|---|---|---|---|---|---|---|---|---|---|---|
| CHD-080006-104 | 10 | 20 | 1 | 40 | 22.95 | 15.92 | 9.95 | 18.8 | 0.6 | 1.10 | 2070 | 1270 | 6.5 |
| CHD-080006-108 | 10 | 20 | 4 | 40 | 20.85 | 15.24 | 9.66 | 18.0 | 0.6 | 0.69 | 3090 | 2370 | 4.1 |
| CHD-080006-112 | 10 | 20 | 1 | 65 | 22.12 | 15.20 | 9.59 | 18.0 | 0.6 | 0.62 | 2100 | 1540 | 2.8 |
| CHD-080006-116 | 10 | 20 | 4 | 65 | 24.49 | 14.60 | 9.19 | 17.3 | 0.6 | 0.46 | 1620 | 1160 | 2.4 |
| CHD-080006-110 | 10 | 10 | 1 | 65 | 23.55 | 12.82 | 8.87 | 15.6 | 0.6 | 0.58 | 1930 | 1290 | 5.6 |
| CHD-080006-102 | 10 | 10 | 1 | 40 | 23.93 | 12.31 | 8.87 | 15.2 | 0.6 | 0.80 | | | |
| CHD-080006-114 | 10 | 10 | 4 | 65 | 23.74 | 12.20 | 8.73 | 15.0 | 0.6 | 0.37 | 1750 | 1170 | 5.8 |
| CHD-080006-106 | 10 | 10 | 4 | 40 | 23.69 | 12.16 | 8.73 | 15.0 | 0.6 | 0.61 | 1640 | 1040 | 6.4 |
| CHD-080006-101 | 2 | 10 | 1 | 40 | 23.01 | 10.57 | 8.69 | 13.7 | 0.7 | 0.84 | 1690 | 1010 | 12.3 |
| CHD-080006-107 | 2 | 20 | 4 | 40 | 21.04 | 10.54 | 9.20 | 14.0 | 0.7 | 0.69 | 1670 | 1170 | 3.5 |
| CHD-080006-103 | 2 | 20 | 1 | 40 | 23.21 | 10.07 | 9.32 | 13.7 | 0.7 | 1.10 | 1980 | 1140 | 10.7 |
| CHD-080006-105 | 2 | 10 | 4 | 40 | 23.91 | 9.97 | 8.29 | 13.0 | 0.7 | 0.62 | 1380 | 862 | 9.4 |
| CHD-080006-109 | 2 | 10 | 1 | 65 | 24.10 | 9.54 | 8.35 | 12.7 | 0.7 | 0.61 | 1590 | 980 | 9.4 |
| CHD-080006-111 | 2 | 20 | 1 | 65 | 21.16 | 9.40 | 8.98 | 13.0 | 0.8 | 0.62 | 2100 | 1570 | 3.0 |
| CHD-080006-113 | 2 | 10 | 4 | 65 | 23.91 | 8.74 | 8.45 | 12.2 | 0.8 | 0.37 | 1500 | 960 | 8.4 |
| CHD-080006-115 | 2 | 20 | 4 | 65 | 23.63 | 8.65 | 8.96 | 12.5 | 0.8 | 0.46 | 1670 | 1140 | 3.8 |

| 1 kg conche | CA (g) A | H₂O (g) B | Time (h) C | T (°C.) D | Colour L | a | b | C | h | Moisture % | Viscosity Lin V | Cas V | Yield v |
|---|---|---|---|---|---|---|---|---|---|---|---|---|---|
| CHD-080006-103 | 2 | 20 | 1 | 40 | 23.21 | 10.07 | 9.32 | 13.7 | 0.7 | 1.10 | 1980 | 1140 | 10.7 |
| CHD-080006-104 | 10 | 20 | 1 | 40 | 22.95 | 15.92 | 9.95 | 18.8 | 0.6 | 1.10 | 2070 | 1270 | 6.5 |
| CHD-080006-101 | 2 | 10 | 1 | 40 | 23.01 | 10.57 | 8.69 | 13.7 | 0.7 | 0.84 | 1690 | 1010 | 12.3 |
| CHD-080006-102 | 10 | 10 | 1 | 40 | 23.93 | 12.31 | 8.87 | 15.2 | 0.6 | 0.80 | | | |
| CHD-080006-107 | 2 | 20 | 4 | 40 | 21.04 | 10.54 | 9.20 | 14.0 | 0.7 | 0.69 | 1670 | 1170 | 3.5 |
| CHD-080006-108 | 10 | 20 | 4 | 40 | 20.85 | 15.24 | 9.66 | 18.0 | 0.6 | 0.69 | 3090 | 2370 | 4.1 |
| CHD-080006-105 | 2 | 10 | 4 | 40 | 23.91 | 9.97 | 8.29 | 13.0 | 0.7 | 0.62 | 1380 | 862 | 9.4 |
| CHD-080006-112 | 10 | 20 | 1 | 65 | 22.12 | 15.20 | 9.59 | 18.0 | 0.6 | 0.62 | 2100 | 1540 | 2.8 |
| CHD-080006-111 | 2 | 20 | 1 | 65 | 21.16 | 9.40 | 8.98 | 13.0 | 0.8 | 0.62 | 2100 | 1570 | 3.0 |
| CHD-080006-109 | 2 | 10 | 1 | 65 | 24.10 | 9.54 | 8.35 | 12.7 | 0.7 | 0.61 | 1590 | 980 | 9.4 |
| CHD-080006-106 | 10 | 10 | 4 | 40 | 23.69 | 12.16 | 8.73 | 15.0 | 0.6 | 0.61 | 1640 | 1040 | 6.4 |
| CHD-080006-110 | 10 | 10 | 1 | 65 | 23.55 | 12.82 | 8.87 | 15.6 | 0.6 | 0.58 | 1930 | 1290 | 5.6 |
| CHD-080006-116 | 10 | 20 | 4 | 65 | 24.49 | 14.60 | 9.19 | 17.3 | 0.6 | 0.46 | 1620 | 1160 | 2.4 |
| CHD-080006-115 | 2 | 20 | 4 | 65 | 23.63 | 8.65 | 8.96 | 12.5 | 0.8 | 0.46 | 1670 | 1140 | 3.8 |
| CHD-080006-113 | 2 | 10 | 4 | 65 | 23.91 | 8.74 | 8.45 | 12.2 | 0.8 | 0.37 | 1500 | 960 | 8.4 |
| CHD-080006-114 | 10 | 10 | 4 | 65 | 23.74 | 12.20 | 8.73 | 15.0 | 0.6 | 0.37 | 1750 | 1170 | 5.8 |

| 1 kg conche | CA (g) A | H₂O (g) B | Time (h) C | T (°C.) D | Colour L | a | b | C | h | Moisture % | Viscosity Lin V | Cas V | Yield v |
|---|---|---|---|---|---|---|---|---|---|---|---|---|---|
| CHD-080006-108 | 10 | 20 | 4 | 40 | 20.85 | 15.24 | 9.66 | 18.0 | 0.6 | 0.69 | 3090 | 2370 | 4.1 |
| CHD-080006-112 | 10 | 20 | 1 | 65 | 22.12 | 15.20 | 9.59 | 18.0 | 0.6 | 0.62 | 2100 | 1540 | 2.8 |
| CHD-080006-111 | 2 | 20 | 1 | 65 | 21.16 | 9.40 | 8.98 | 13.0 | 0.8 | 0.62 | 2100 | 1570 | 3.0 |
| CHD-080006-104 | 10 | 20 | 1 | 40 | 22.95 | 15.92 | 9.95 | 18.8 | 0.6 | 1.10 | 2070 | 1270 | 6.5 |
| CHD-080006-103 | 2 | 20 | 1 | 40 | 23.21 | 10.07 | 9.32 | 13.7 | 0.7 | 1.10 | 1980 | 1140 | 10.7 |
| CHD-080006-110 | 10 | 10 | 1 | 65 | 23.55 | 12.82 | 8.87 | 15.6 | 0.6 | 0.58 | 1930 | 1290 | 5.6 |
| CHD-080006-114 | 10 | 10 | 4 | 65 | 23.74 | 12.20 | 8.73 | 15.0 | 0.6 | 0.37 | 1750 | 1170 | 5.8 |

-continued

| 1 kg conche | CA (g) A | H₂0 (g) B | Time (h) C | T (° C.) D | Colour L | a | b | C | h | Moisture % | Viscosity Lin V | Cas V | Yield v |
|---|---|---|---|---|---|---|---|---|---|---|---|---|---|
| CHD-080006-101 | 2 | 10 | 1 | 40 | 23.01 | 10.57 | 8.69 | 13.7 | 0.7 | 0.84 | 1690 | 1010 | 12.3 |
| CHD-080006-115 | 2 | 20 | 4 | 65 | 23.63 | 8.65 | 8.96 | 12.5 | 0.8 | 0.46 | 1670 | 1140 | 3.8 |
| CHD-080006-107 | 2 | 20 | 4 | 40 | 21.04 | 10.54 | 9.20 | 14.0 | 0.7 | 0.69 | 1670 | 1170 | 3.5 |
| CHD-080006-106 | 10 | 10 | 4 | 40 | 23.69 | 12.16 | 8.73 | 15.0 | 0.6 | 0.61 | 1640 | 1040 | 6.4 |
| CHD-080006-116 | 10 | 20 | 4 | 65 | 24.49 | 14.60 | 9.19 | 17.3 | 0.6 | 0.46 | 1620 | 1160 | 2.4 |
| CHD-080006-109 | 2 | 10 | 1 | 65 | 24.10 | 9.54 | 8.35 | 12.7 | 0.7 | 0.61 | 1590 | 980 | 9.4 |
| CHD-080006-113 | 2 | 10 | 4 | 65 | 23.91 | 8.74 | 8.45 | 12.2 | 0.8 | 0.37 | 1500 | 960 | 8.4 |
| CHD-080006-105 | 2 | 10 | 4 | 40 | 23.91 | 9.97 | 8.29 | 13.0 | 0.7 | 0.62 | 1380 | 862 | 9.4 |
| CHD-080006-102 | 10 | 10 | 1 | 40 | 23.93 | 12.31 | 8.87 | 15.2 | 0.6 | 0.80 | | | |

| 1 kg conche | CA (g) A | H₂0 (g) B | Time (h) C | T (° C.) D | Colour L | a | b | C | h | Moisture % | Viscosity Lin V | Cas V | Yield v |
|---|---|---|---|---|---|---|---|---|---|---|---|---|---|
| CHD-080006-108 | 10 | 20 | 4 | 40 | 20.85 | 15.24 | 9.66 | 18.0 | 0.6 | 0.69 | 3090 | 2370 | 4.1 |
| CHD-080006-111 | 2 | 20 | 1 | 65 | 21.16 | 9.40 | 8.98 | 13.0 | 0.8 | 0.62 | 2100 | 1570 | 3.0 |
| CHD-080006-112 | 10 | 20 | 1 | 65 | 22.12 | 15.20 | 9.59 | 18.0 | 0.6 | 0.62 | 2100 | 1540 | 2.8 |
| CHD-080006-110 | 10 | 10 | 1 | 65 | 23.55 | 12.82 | 8.87 | 15.6 | 0.6 | 0.58 | 1930 | 1290 | 5.6 |
| CHD-080006-104 | 10 | 20 | 1 | 40 | 22.95 | 15.92 | 9.95 | 18.8 | 0.6 | 1.10 | 2070 | 1270 | 6.5 |
| CHD-080006-114 | 10 | 10 | 4 | 65 | 23.74 | 12.20 | 8.73 | 15.0 | 0.6 | 0.37 | 1750 | 1170 | 5.8 |
| CHD-080006-107 | 2 | 20 | 4 | 40 | 21.04 | 10.54 | 9.20 | 14.0 | 0.7 | 0.69 | 1670 | 1170 | 3.5 |
| CHD-080006-116 | 10 | 20 | 4 | 65 | 24.49 | 14.60 | 9.19 | 17.3 | 0.6 | 0.46 | 1620 | 1160 | 2.4 |
| CHD-080006-115 | 2 | 20 | 4 | 65 | 23.63 | 8.65 | 8.96 | 12.5 | 0.8 | 0.46 | 1670 | 1140 | 3.8 |
| CHD-080006-103 | 2 | 20 | 1 | 40 | 23.21 | 10.07 | 9.32 | 13.7 | 0.7 | 1.10 | 1980 | 1140 | 10.7 |
| CHD-080006-106 | 10 | 10 | 4 | 40 | 23.69 | 12.16 | 8.73 | 15.0 | 0.6 | 0.61 | 1640 | 1040 | 6.4 |
| CHD-080006-101 | 2 | 10 | 1 | 40 | 23.01 | 10.57 | 8.69 | 13.7 | 0.7 | 0.84 | 1690 | 1010 | 12.3 |
| CHD-080006-109 | 2 | 10 | 1 | 65 | 24.10 | 9.54 | 8.35 | 12.7 | 0.7 | 0.61 | 1590 | 980 | 9.4 |
| CHD-080006-113 | 2 | 10 | 4 | 65 | 23.91 | 8.74 | 8.45 | 12.2 | 0.8 | 0.37 | 1500 | 960 | 8.4 |
| CHD-080006-105 | 2 | 10 | 4 | 40 | 23.91 | 9.97 | 8.29 | 13.0 | 0.7 | 0.62 | 1380 | 862 | 9.4 |
| CHD-080006-102 | 10 | 10 | 1 | 40 | 23.93 | 12.31 | 8.87 | 15.2 | 0.6 | 0.80 | | | |

| 1 kg conche | CA (g) A | H₂0 (g) B | Time (h) C | T (° C.) D | Colour L | a | b | C | h | Moisture % | Viscosity Lin V | Cas V | Yield v |
|---|---|---|---|---|---|---|---|---|---|---|---|---|---|
| CHD-080006-101 | 2 | 10 | 1 | 40 | 23.01 | 10.57 | 8.69 | 13.7 | 0.7 | 0.84 | 1690 | 1010 | 12.3 |
| CHD-080006-103 | 2 | 20 | 1 | 40 | 23.21 | 10.07 | 9.32 | 13.7 | 0.7 | 1.10 | 1980 | 1140 | 10.7 |
| CHD-080006-109 | 2 | 10 | 1 | 65 | 24.10 | 9.54 | 8.35 | 12.7 | 0.7 | 0.61 | 1590 | 980 | 9.4 |
| CHD-080006-105 | 2 | 10 | 4 | 40 | 23.91 | 9.97 | 8.29 | 13.0 | 0.7 | 0.62 | 1380 | 862 | 9.4 |
| CHD-080006-113 | 2 | 10 | 4 | 65 | 23.91 | 8.74 | 8.45 | 12.2 | 0.8 | 0.37 | 1500 | 960 | 8.4 |
| CHD-080006-104 | 10 | 20 | 1 | 40 | 22.95 | 15.92 | 9.95 | 18.8 | 0.6 | 1.10 | 2070 | 1270 | 6.5 |
| CHD-080006-106 | 10 | 10 | 4 | 40 | 23.69 | 12.16 | 8.73 | 15.0 | 0.6 | 0.61 | 1640 | 1040 | 6.4 |
| CHD-080006-114 | 10 | 10 | 4 | 65 | 23.74 | 12.20 | 8.73 | 15.0 | 0.6 | 0.37 | 1750 | 1170 | 5.8 |
| CHD-080006-110 | 10 | 10 | 1 | 65 | 23.55 | 12.82 | 8.87 | 15.6 | 0.6 | 0.58 | 1930 | 1290 | 5.6 |
| CHD-080006-108 | 10 | 20 | 4 | 40 | 20.85 | 15.24 | 9.66 | 18.0 | 0.6 | 0.69 | 3090 | 2370 | 4.1 |
| CHD-080006-115 | 2 | 20 | 4 | 65 | 23.63 | 8.65 | 8.96 | 12.5 | 0.8 | 0.46 | 1670 | 1140 | 3.8 |
| CHD-080006-107 | 2 | 20 | 4 | 40 | 21.04 | 10.54 | 9.20 | 14.0 | 0.7 | 0.69 | 1670 | 1170 | 3.5 |
| CHD-080006-111 | 2 | 20 | 1 | 65 | 21.16 | 9.40 | 8.98 | 13.0 | 0.8 | 0.62 | 2100 | 1570 | 3.0 |
| CHD-080006-112 | 10 | 20 | 1 | 65 | 22.12 | 15.20 | 9.59 | 18.0 | 0.6 | 0.62 | 2100 | 1540 | 2.8 |
| CHD-080006-116 | 10 | 20 | 4 | 65 | 24.49 | 14.60 | 9.19 | 17.3 | 0.6 | 0.46 | 1620 | 1160 | 2.4 |
| CHD-080006-102 | 10 | 10 | 1 | 40 | 23.93 | 12.31 | 8.87 | 15.2 | 0.6 | 0.80 | | | |

| 1 kg conche | CA (g) A | H₂0 (g) B | Time (h) C | T (° C.) D | Colour L | a | b | C | h | Moisture % |
|---|---|---|---|---|---|---|---|---|---|---|
| CHD-080006-101 | 2 | 10 | 1 | 40 | 23.01 | 10.57 | 8.69 | 13.7 | 0.7 | 0.84 |
| CHD-080006-102 | 10 | 10 | 1 | 40 | 23.93 | 12.31 | 8.87 | 15.2 | 0.6 | 0.80 |
| CHD-080006-103 | 2 | 20 | 1 | 40 | 23.21 | 10.07 | 9.32 | 13.7 | 0.7 | 1.10 |
| CHD-080006-104 | 10 | 20 | 1 | 40 | 22.95 | 15.92 | 9.95 | 18.8 | 0.6 | 1.10 |
| CHD-080006-105 | 2 | 10 | 4 | 40 | 23.91 | 9.97 | 8.29 | 13.0 | 0.7 | 0.62 |
| CHD-080006-106 | 10 | 10 | 4 | 40 | 23.69 | 12.16 | 8.73 | 15.0 | 0.6 | 0.61 |
| CHD-080006-107 | 2 | 20 | 4 | 40 | 21.04 | 10.54 | 9.20 | 14.0 | 0.7 | 0.69 |
| CHD-080006-108 | 10 | 20 | 4 | 40 | 20.85 | 15.24 | 9.66 | 18.0 | 0.6 | 0.69 |
| CHD-080006-109 | 2 | 10 | 1 | 65 | 24.10 | 9.54 | 8.35 | 12.7 | 0.7 | 0.61 |
| CHD-080006-110 | 10 | 10 | 1 | 65 | 23.55 | 12.82 | 8.87 | 15.6 | 0.6 | 0.58 |

-continued

| 1 kg conche | CA (g) A | H₂0 (g) B | Time (h) C | T (° C.) D | Colour L | a | b | C | h | Moisture % |
|---|---|---|---|---|---|---|---|---|---|---|
| CHD-080006-111 | 2 | 20 | 1 | 65 | 21.16 | 9.40 | 8.98 | 13.0 | 0.8 | 0.62 |
| CHD-080006-112 | 10 | 20 | 1 | 65 | 22.12 | 15.20 | 9.59 | 18.0 | 0.6 | 0.62 |
| CHD-080006-113 | 2 | 10 | 4 | 65 | 23.91 | 8.74 | 8.45 | 12.2 | 0.8 | 0.37 |
| CHD-080006-114 | 10 | 10 | 4 | 65 | 23.74 | 12.20 | 8.73 | 15.0 | 0.6 | 0.37 |
| CHD-080006-115 | 2 | 20 | 4 | 65 | 23.63 | 8.65 | 8.96 | 12.5 | 0.8 | 0.46 |
| CHD-080006-116 | 10 | 20 | 4 | 65 | 24.49 | 14.60 | 9.19 | 17.3 | 0.6 | 0.46 |
| CHD-080006-117 | 6 | 15 | 3 | 52.5 | | | | | | |
| CHD-080006-117 | 6 | 15 | 3 | 52.5 | | | | | | |
| CHD-080006-117 | 6 | 15 | 3 | 52.5 | | | | | | |
| CHD-080006-117 | 6 | 15 | 3 | 52.5 | | | | | | |
| CHD-080006-121 | 10 | 0 | 4 | 65.0 | | | | | | |
| CHD-080006-122 | 10 | 20 | 4 | 65 | | | | | | |
| CHD-080006-123 | 6 | 15 | 3 | 52.5 | | | | | | |
| CHD-080006-108 | 10 | 20 | 4 | 40 | | | | | | |

| 1 kg conche | CA (g) A | H₂0 (g) B | Time (h) C | T (° C.) D | Viscosity Lin V | Cas V | Yield v | Fat % | PF's Folin GA (%) | Flavanols DP1-10 (%) |
|---|---|---|---|---|---|---|---|---|---|---|
| CHD-080006-101 | 2 | 10 | 1 | 40 | 1690 | 1010 | 12.3 | 37.5 | 2.6 | 1.7 |
| CHD-080006-102 | 10 | 10 | 1 | 40 | | | | 36.9 | 2.6 | 1.6 |
| CHD-080006-103 | 2 | 20 | 1 | 40 | 1980 | 1140 | 10.7 | 37.1 | 2.7 | 1.7 |
| CHD-080006-104 | 10 | 20 | 1 | 40 | 2070 | 1270 | 6.5 | 37.4 | 2.6 | 1.6 |
| CHD-080006-105 | 2 | 10 | 4 | 40 | 1380 | 862 | 9.4 | 38.0 | 2.6 | 1.7 |
| CHD-080006-106 | 10 | 10 | 4 | 40 | 1640 | 1040 | 6.4 | 37.3 | 2.6 | 1.6 |
| CHD-080006-107 | 2 | 20 | 4 | 40 | 1670 | 1170 | 3.5 | 37.6 | 2.5 | 1.8 |
| CHD-080006-108 | 10 | 20 | 4 | 40 | 3090 | 2370 | 4.1 | 35.0 | 2.7 | 1.7 |
| CHD-080006-109 | 2 | 10 | 1 | 65 | 1590 | 980 | 9.4 | 37.4 | 2.2 | 1.5 |
| CHD-080006-110 | 10 | 10 | 1 | 65 | 1930 | 1290 | 5.6 | 37.6 | 2.0 | 1.2 |
| CHD-080006-111 | 2 | 20 | 1 | 65 | 2100 | 1570 | 3.0 | | | |
| CHD-080006-112 | 10 | 20 | 1 | 65 | 2100 | 1540 | 2.8 | 36.9 | 2.3 | 1.4 |
| CHD-080006-113 | 2 | 10 | 4 | 65 | 1500 | 960 | 8.4 | | | |
| CHD-080006-114 | 10 | 10 | 4 | 65 | 1750 | 1170 | 5.8 | 37.2 | 2.2 | 1.3 |
| CHD-080006-115 | 2 | 20 | 4 | 65 | 1670 | 1140 | 3.8 | | | |
| CHD-080006-116 | 10 | 20 | 4 | 65 | 1620 | 1160 | 2.4 | 38.6 | 2.4 | 1.6 |
| CHD-080006-117 | 6 | 15 | 3 | 52.5 | | | | | | |
| CHD-080006-117 | 6 | 15 | 3 | 52.5 | | | | | | |
| CHD-080006-117 | 6 | 15 | 3 | 52.5 | | | | | | |
| CHD-080006-117 | 6 | 15 | 3 | 52.5 | | | | | | |
| CHD-080006-121 | 10 | 0 | 4 | 65.0 | | | | | | |
| CHD-080006-122 | 10 | 20 | 4 | 65 | | | | | | |
| CHD-080006-123 | 6 | 15 | 3 | 52.5 | | | | | | |

| | CA (g) A | H₂0 (g) B | Time (h) C | T (° C.) D | | 1 kg conche | CA (g) A | H₂0 (g) B | Time (h) C | T (° C.) D |
|---|---|---|---|---|---|---|---|---|---|---|
| trial 1 | −1 | −1 | −1 | −1 | ⇒ | CHD-080006-101 | 2 | 10 | 1 | 40 |
| trial 2 | +1 | −1 | −1 | −1 | | CHD-080006-102 | 10 | 10 | 1 | 40 |
| trial 3 | −1 | +1 | −1 | −1 | | CHD-080006-103 | 2 | 20 | 1 | 40 |
| trial 4 | +1 | +1 | −1 | −1 | | CHD-080006-104 | 10 | 20 | 1 | 40 |
| trial 5 | −1 | −1 | +1 | −1 | | CHD-080006-105 | 2 | 10 | 4 | 40 |
| trial 6 | +1 | −1 | +1 | −1 | | CHD-080006-106 | 10 | 10 | 4 | 40 |
| trial 7 | −1 | +1 | +1 | −1 | | CHD-080006-107 | 2 | 20 | 4 | 40 |
| trial 8 | +1 | +1 | +1 | −1 | | CHD-080006-108 | 10 | 20 | 4 | 40 |
| trial 9 | −1 | −1 | −1 | +1 | | CHD-080006-109 | 2 | 10 | I | 65 |
| trial 10 | +1 | −1 | −1 | +1 | | CHD-080006-110 | 10 | 10 | I | 65 |
| trial 11 | −1 | +1 | −1 | +1 | | CHD-080006-111 | 2 | 20 | 1 | 65 |
| trial 12 | +1 | +1 | −1 | +1 | | CHD-080006-112 | 10 | 20 | 1 | 65 |
| trial 13 | −1 | −1 | +1 | +1 | | CHD-080006-113 | 2 | 10 | 4 | 65 |
| trial 14 | −1 | −1 | +1 | +1 | | CHD-080006-114 | 10 | 10 | 4 | 65 |
| trial 15 | −1 | +1 | +1 | +1 | | CHD-080006-115 | 2 | 20 | 4 | 65 |
| trial 16 | +1 | +1 | +1 | +1 | | CHD-080006-116 | 10 | 20 | 4 | 65 |
| | | | | | CP | CHD-080006-117 | 6 | 15 | 3 | 52.5 |
| | | | | | CP | CHD-080006-117 | 6 | 15 | 3 | 52.5 |
| | | | | | CP | CHD-080006-117 | 6 | 15 | 3 | 52.5 |
| | | | | | CP | CHD-080006-117 | 6 | 15 | 3 | 52.5 |
| | | | | | | CHD-080006-121 | 10 | 0 | 4 | 65.0 |

-continued

| | | CA (g) A | H₂0 (g) B | Time (h) C | T (°C.) D |
|---|---|---|---|---|---|
| CFL | CHD-080006-122 | 10 | 20 | 4 | 65 |
| CFL | CHD-080006-123 | 6 | 15 | 3 | 52.5 |
| bis | CHD-080006-108 | 10 | 20 | 4 | 40 |

The invention claimed is:

1. A process for producing red or purple cocoa-derived material, comprising the step of: treating cocoa-derived material obtained from beans or seeds which have a higher polyphenol content than fermented cocoa beans with an acid for a sufficient time to produce red or purple cocoa-derived material, wherein the process is non-enzymatic and wherein the red or purple cocoa-derived material comprises at least 20 mg/g of polyphenols, wherein the cocoa-derived material is cocoa liquor, unfermented or underfermented, acidified directly in the conche.

2. The process according to claim 1 wherein the cocoa-derived material produced is red.

3. The process according to claim 1, wherein the cocoa-derived material is not treated with alkali prior to acid treatment.

4. The process according to claim 1, wherein the acid does not comprise an alcohol.

* * * * *